(12) United States Patent
Gagne

(10) Patent No.: US 6,745,088 B2
(45) Date of Patent: Jun. 1, 2004

(54) MULTI-VARIABLE MATRIX PROCESS CONTROL

(75) Inventor: Ronald A. Gagne, Lake Jackson, TX (US)

(73) Assignee: The Dow Chemical Company, Midland, MI (US)

( * ) Notice: Subject to any disclaimer, the term of this patent is extended or adjusted under 35 U.S.C. 154(b) by 381 days.

(21) Appl. No.: 09/878,711

(22) Filed: Jun. 11, 2001

(65) Prior Publication Data

US 2002/0016640 A1 Feb. 7, 2002

Related U.S. Application Data

(60) Provisional application No. 60/215,453, filed on Jun. 30, 2000.

(51) Int. Cl.⁷ .............................................. G05B 13/02
(52) U.S. Cl. .......................... 700/29; 700/28; 700/31; 700/34; 700/46; 700/67; 700/71; 703/2; 318/561
(58) Field of Search ........................ 700/28, 29, 30, 700/31, 34, 46, 54, 67, 68, 71, 73–74, 262; 703/2; 318/561; 345/440, 440.1, 440.2; 702/127, 128

(56) References Cited

U.S. PATENT DOCUMENTS

| | | | | |
|---|---|---|---|---|
| 4,349,869 A | | 9/1982 | Prett et al. ................. 364/159 |
| 4,698,745 A | * | 10/1987 | Hiroi et al. .................... 700/45 |
| 5,394,322 A | * | 2/1995 | Hansen ......................... 700/37 |
| 5,432,885 A | * | 7/1995 | Nomoto et al. ............... 706/52 |
| 6,253,113 B1 | * | 6/2001 | Lu ............................... 700/28 |
| 6,278,899 B1 | * | 8/2001 | Piche et al. ................... 700/44 |
| 6,381,504 B1 | * | 4/2002 | Havener et al. .............. 700/44 |
| 6,438,532 B1 | * | 8/2002 | Kiji ............................. 706/45 |
| 6,529,814 B2 | * | 3/2003 | Ishizu et al. ................. 701/96 |
| 6,587,108 B1 | * | 7/2003 | Guerlain et al. ............ 345/440 |

OTHER PUBLICATIONS

U.S. Provisional application No. 60/215,453, filed Jun. 30, 2000.

U.S. Patent Ser. No. 09/482,386, filed Jan. 12, 2000.

* cited by examiner

*Primary Examiner*—Ramesh Patel

(57) ABSTRACT

Computer-implemented system and method for controlling a processing apparatus having at least one independently controlled manipulated variable and at least one controlled variable responsive to the manipulated variable, using a robust multi-variable controller which defines an expected variation in magnitude for each controlled variable as a respective function of each manipulated variable via use of a set of at least two models. The model set has a dynamic response inertial characteristic. The two models are derived from a Reference Model (the traditional model defined in Dynamic Matrix Control). The multi-model set further enables adaptation of the models and gains during real-time use.

26 Claims, 37 Drawing Sheets cv1 versus mv1 cv2 versus mv2 cv3 versus mv3 cv1 versus mv1 cv2 versus mv2 cv3 versus mv3

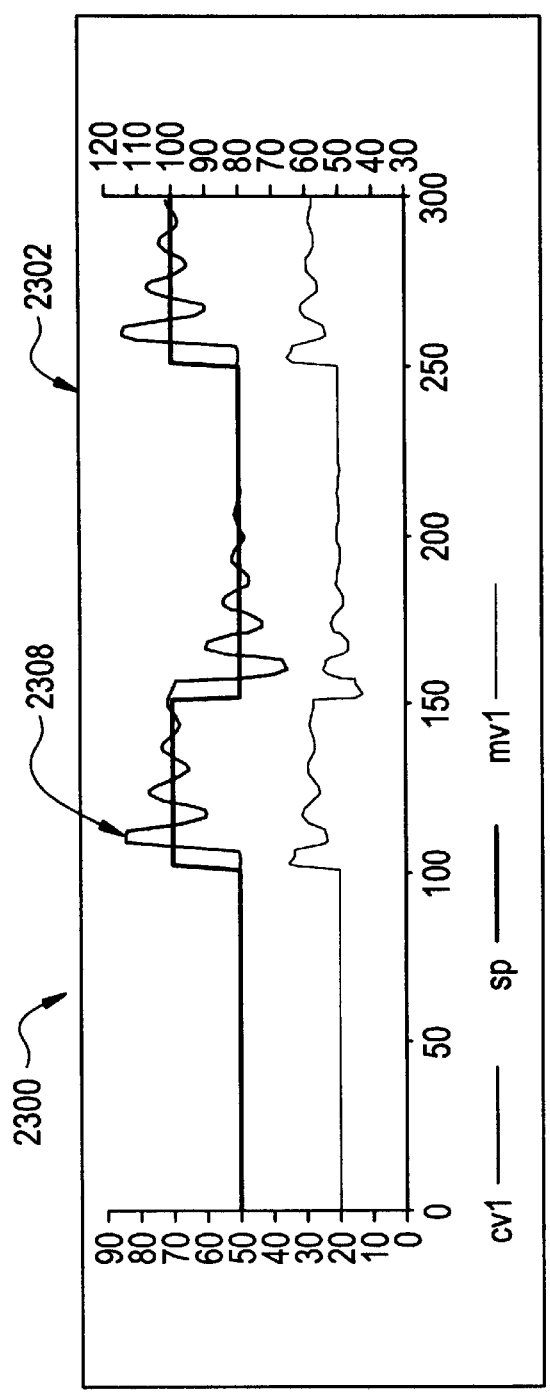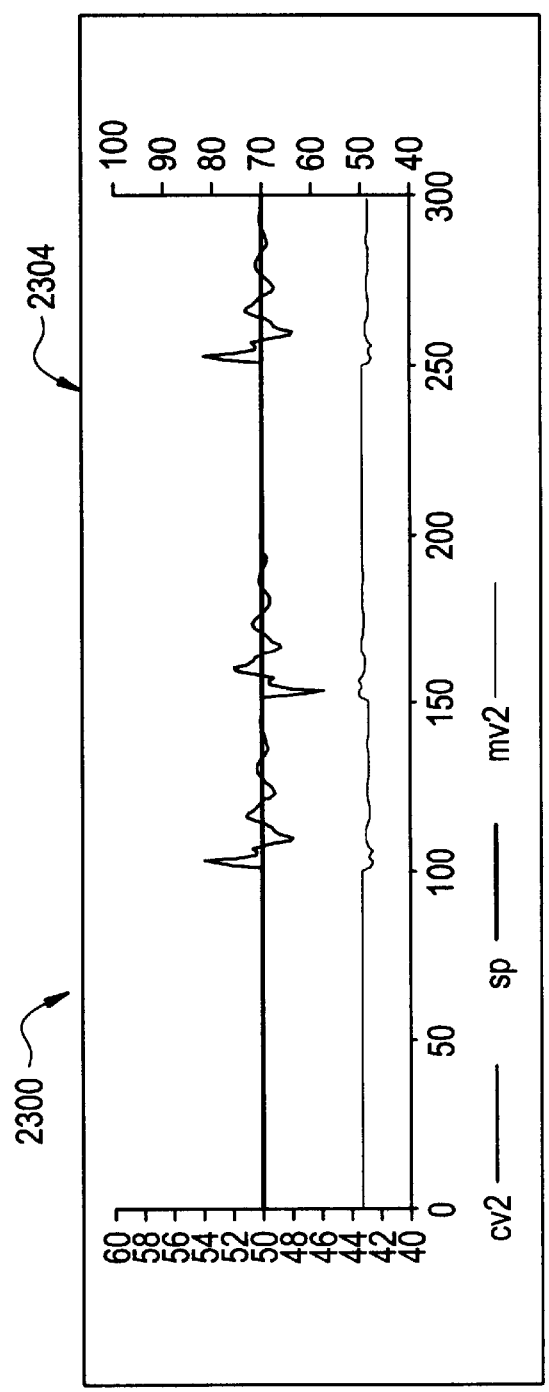
FIG. 23A
cv1 versus mv1
FIG. 23B
cv2 versus mv2 cv3 versus mv3 cv1 versus mv1 cv2 versus mv2 cv3 versus mv3 cv1 versus mv1 cv2 versus mv2 cv3 versus mv3 cv1 versus mv1 cv2 versus mv2 cv3 versus mv3

MULTI-VARIABLE MATRIX PROCESS CONTROL

CROSS REFERENCE

This application claims the benefit of U.S. Provisional Application No. 60/215,453 filed Jun. 30, 2000.

FIELD OF THE INVENTION

This invention relates to a computer-implemented method and computer-based apparatus for adaptive control via a matrix of feed-forward relationships respective to a process or series of processes implemented in an apparatus such as a chemical manufacturing plant.

BACKGROUND

Optimized operation of manufacturing systems is valued for providing benefits in profitability, productivity, environmental impact, and high product quality. The increasing capability of low cost computers to deliver resolution of complex control approaches has advanced optimized operation to incorporate techniques which could not have been economically explored even a few years ago. One of the techniques enabled at a relatively early stage of computer use in control was Dynamic Matrix Control, a form of feed-forward control based upon a method where outputs, or controlled variables, are predicted to move in the context of known control settings and current data. Feed-forward methodologies are, in many cases, superior to feedback methodologies which wait until process disturbances have actually changed the controlled variables before controller action is taken. Indeed, an ideal controller provides both feed-forward and feedback action in sufficient capability to achieve optimal operation.

Dynamic Matrix Control is discussed in U.S. Pat. No. 4,349,869 for a DYNAMIC MATRIX CONTROL METHOD which issued on Sep. 14, 1982 to David M. Prett, Brian L. Ramaker, and Charles R. Cutler. This patent is incorporated herein by reference. Dynamic Matrix Control has helped in solving control issues related to limitations in future controller response in the context of a decision at a particular time, accommodation of the full set of conditions in a system being controlled, complexity in multiple influences, and non-linear impacts respective to disturbance.

But, in its classic form, Dynamic Matrix Control (DMC) also has presented challenges in dealing with process stability during transients or at different turndowns or deviations from the fluid flow throughput used in model definition and tuning. The need for stability in use of DMC in all operational contexts has been a driving force in the development of the present invention, which provides beneficial features in stability, robustness, and adaptability to substantially enhance the traditional DMC approach.

SUMMARY OF THE INVENTION

The invention provides a method for computer-implemented controlling of a processing apparatus having at least one independently controlled manipulated variable and at least one controlled variable responsive to the manipulated variable, comprising the steps of:

defining an expected variation in magnitude for each controlled variable as a respective function of each manipulated variable from a set of at least two models, the model set having a dynamic response inertial characteristic; and implementing a change defined from the model set to modify the manipulated variable in the processing apparatus.

Further details, objects, features, and advantages of the invention are appreciated from consideration of the figures and detailed description.

BRIEF DESCRIPTION OF THE FIGURES

FIGS. 23A–23C presents output from a simulator for a regular DMC operating in a situation of model mismatch in gains.

DETAILED DISCUSSION OF THE PREFERRED EMBODIMENTS

Figure 1:
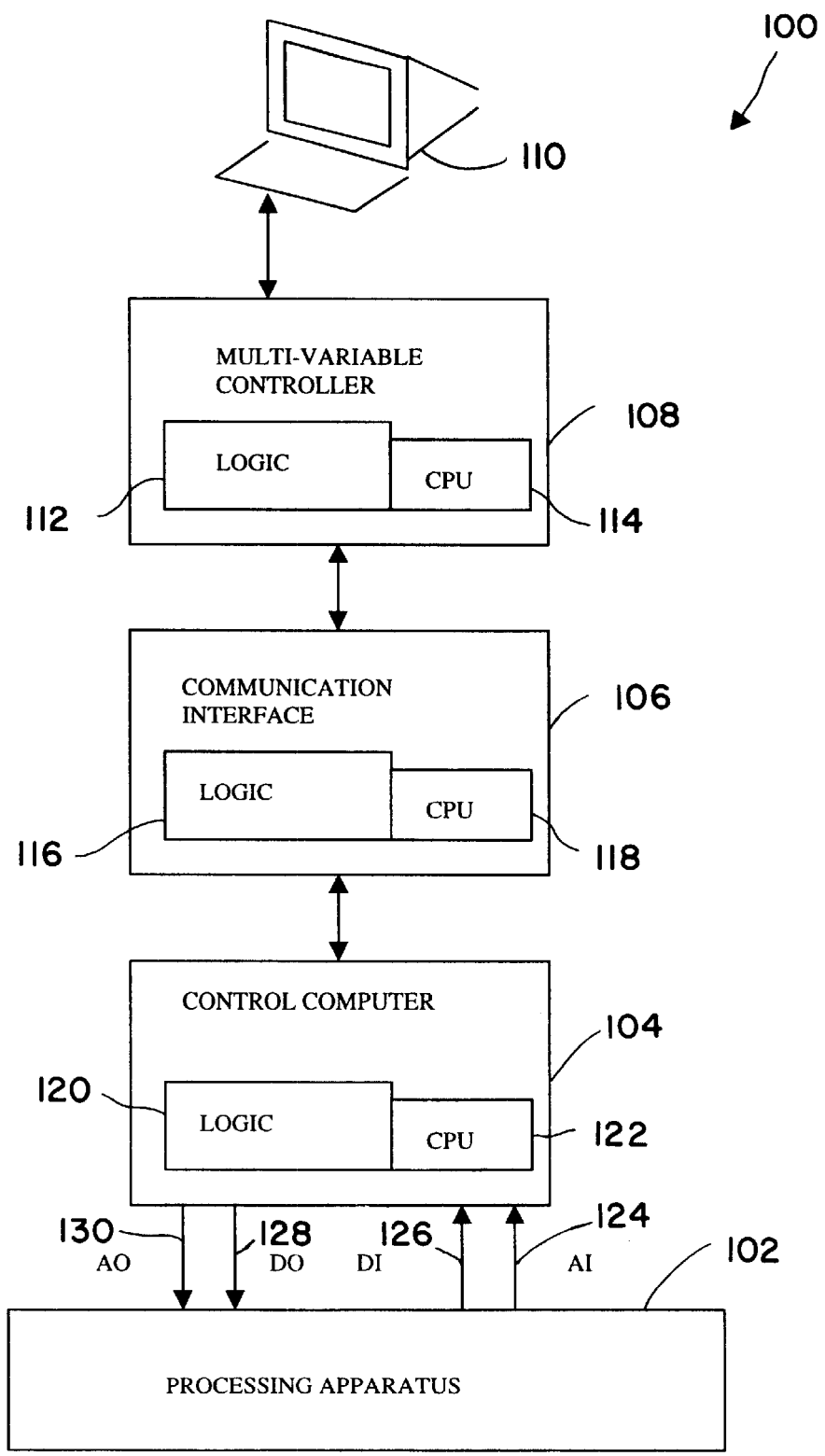
FIG. 1 presents a system overview.

In describing the preferred embodiments, reference is made to "logic" and to "logical portions" which are in data communication with each other. In this regard, computer-implemented logic generally references virtual functional elements of computer-implemented machine code which primarily perform tasks such as reading data, writing data, calculating data, performing decision operations related to data, and storing data. As a design consideration, the discussion of these elements as logical subportions enables a useful separation of the overall logical system into focal abstracted subcomponents which can each be efficiently considered, designed, studied, and enhanced within a separately focused and distinctively particularized context. As should be apparent, some of these subcomponents represent distinctive areas of specialty in their own right, even as they are incorporated into the comprehensive and holistic system of the described embodiments. The specification also references the term "Real-Time" (real-time, real time, Real-time); to facilitate clarity, the following paragraph presents a discussion of the Real-Time concept.

Real-time computer processing is generically defined as a method of computer processing in which an event causes a given reaction within an actual time limit and wherein computer actions are specifically controlled within the context of and by external conditions and actual times. As an associated clarification in the realm of process control, real-time computer-controlled processing relates to the performance of associated process control logical, decision, and quantitative operations intrinsic to a process control decision program functioning to monitor and modify a controlled apparatus implementing a real-time process wherein the process control decision program is periodically executed with fairly high frequency usually having a period of between 10 ms and 2 seconds, although other time periods are also utilized. In the case of "advanced" control routines (such as the controller of the described embodiments) where a single solution instance requires more extended computational time, a larger period is essentially necessary (frequency in determination of changes in control element settings should be executed at a frequency equal-to-or-less-than the frequency of relevant variable measurement); however, an extended period for resolution of a particular value used in control is still determined in real-time if its period of determination is repetitive on a reasonably predicable basis and is sufficient for utility in adaptive control of the operating mechanical assembly.

The specification also references the term "Steady-State" (steady-state, steady state, Steady-state); to facilitate clarity, the following paragraph presents a discussion of the Steady-State concept.

The solution method of the present invention also includes a general reference to the concept of "steady state operation". "Steady state operation" is essentially a situation where (1) a process is dynamically regular and uniform in its operation over a time interval, (2) momentum, mass, and energy entities flowing into the process are essentially equal to the momentum, mass, and energy entities flowing out of the process, and (3) accumulations of momentum, mass, and energy within the process are essentially not occurring unless they are explicitly expected and factored into the relevant dynamic model. Solutions of the mathematical balances with respect to the status of steady state operation need to also accommodate expected chemical reactions. A system in "steady state" is, therefore, characterized by dynamic balance, stability, steadiness, and equilibrium.

The preferred embodiments provide a computer-implemented system for controlling the operation of a processing apparatus having at least one independently controlled Manipulated Variable (MV) and at least one Controlled Variable (CV) responsive to the Manipulated Variable (further responsive to process disturbances originating independently of the Manipulated Variable).

In defining models, circuitry and logic are provided for defining a set of consecutive discrete intervals of time in a time-dependent function. A "classic" DMC (Dynamic Matrix Control) model (a Primary Model) is a beginning point for defining an expected variation in magnitude for each Controlled Variable as a respective function of a Manipulated Variable disturbance instance in each Manipulated Variable. Computer circuitry and logic are then used in determining, from the model, an error value in interaction of one Controlled Variable with all the defined Manipulated Variables in achieving a Manipulated Variable modification. Computer circuitry and logic are also provided for defining a desired change in the present value of at least one Manipulated Variable from the error value. Computer circuitry and logic then use the Primary Model (also denoted as a Reference Model) in defining a set of at least two models (a Fast Model and a Slow Model) for establishing an expected variation in magnitude for each Controlled Variable as a respective function of a Manipulated Variable disturbance instance in each Manipulated Variable; the model set (the Primary Model, the Slow Model, and the Fast Model collectively) also has a dynamic response inertial characteristic for each of the "Slow" and "Fast" "sides" of the Primary (Reference) Model. The Reference Model, Fast Model, and Slow Model are also respectively referenced as the REFERENCE Model, the FAST Model, and the SLOW Model herein.

In greater detail, the multi-variable controller of the preferred embodiments has, respective to each response case, at least one time-dependent functional characterization of the Controlled Variable magnitude over the set of consecutive discrete intervals of time on a time-axis, the functional characterization having a zero-time time-axis attribute, a maximum-time time-axis attribute, a dead-time time-axis attribute, a response gain attribute, a ramp-rate attribute, a steady-state time-axis attribute, a curvilinear portion disposed between the time-axis position of the dead-time time-axis attribute and the time-axis position of the steady-state time-axis attribute, a ramped portion disposed between the time-axis position of the dead-time time-axis attribute and the time-axis position of the maximum-time time-axis attribute, and a homaloidal portion disposed between the time-axis position of the steady-state attribute and the time-axis position of the maximum-time time-axis attribute, each discrete time interval for one response case having the same time duration, the homaloidal portion having a zero value for an integrating Controlled Variable response, the ramped portion having a zero value for a non-integrating Controlled Variable response, and each functional characterization for one response case having identically valued zero-time time-axis attributes, response gain attributes, ramp-rate attributes, and maximum-time time-axis attributes.

The first time-dependent functional characterization respective to the response (the Primary Model) is derived from measuring an effected change in the magnitude of a Controlled Variable after introducing the disturbance instance. The first functional characterization has a first dead-time time-axis attribute, a first steady-state time-axis attribute, a first curvilinear portion, a first homaloidal portion, and a first ramped portion having its functional derivative equivalent to the ramp-rate attribute at the maximum-time time-axis attribute.

The second time-dependent functional characterization (the Fast Model) is derived from the first time-dependent functional characterization, the second functional characterization having a second dead-time attribute in first predefined diminishing offset from the first dead-time attribute, a second steady-state attribute in second predefined diminishing offset from the first steady-state attribute, a second curvilinear portion in first predefined functional offset from the first curvilinear portion, a second homaloidal portion in extrapolation of the first homaloidal portion, and a second ramped portion in extrapolation of the first ramped portion.

The third time-dependent functional characterization (the Slow Model) is also derived from the first time-dependent functional characterization, the third functional characterization having a third dead-time attribute in first predefined super-additive offset from the first dead-time attribute, a third steady-state attribute in second predefined super-additive offset from the first steady-state attribute, a third curvilinear portion in second predefined functional offset from the first curvilinear portion, a third homaloidal portion in truncation of the first homaloidal portion, and a third ramped portion in truncation of the first ramped portion.

The Controller for the multi-variable controller is defined by essentially inverting the first time-dependent functional characterization (the Primary Model).

In implementing the models, an inertial characteristic value is input into the database of the model-variable controller so that the dynamic response inertial characteristics are achieved in the model set. The inertial characteristics (establishing robustness in response) are (a) different for the "Slow side" of the Primary Model and for the "Fast side" of the Primary Model, or (b) the two inertial characteristics are identical. In this regard, the first, second, and third time-dependent functional characterizations define three models in a model set, the model set incorporating a first dynamic response inertial characteristic between the first and second time-dependent functional characterizations and a second dynamic response inertial characteristic between the first and third time-dependent functional characterizations.

After the inertial characteristics have been input, the Primary Models are defined by introducing, in each independently controlled Manipulated Variable, a Manipulated Variable disturbance instance of predefined magnitude, the disturbance instance prompting a response in each Controlled Variable. The magnitude of each Controlled Variable is then measured, retained, and used in definition of the Primary Model according to traditional DMC practice (reference previously discussed U.S. Pat. No. 4,349,869).

In implementing use of the multivariable controller, a number of different approaches are possible.

In one approach, a change is defined from the model set to modify each Manipulated Variable in the processing apparatus; in achieving this definition, a desired change is determined for the value of a Manipulated Variable in real-time from the second time-dependent functional characterization, the third time-dependent functional characterization, and the magnitude of at least one Controlled Variable.

Alternatively, a desired change is determined for the value of a Manipulated Variable in real-time from the first time-dependent functional characterization, the second time-dependent functional characterization, the third time-dependent functional characterization, and the magnitude of at least one Controlled Variable.

In a further embodiment, an estimated modeling error value in interaction of one Controlled Variable with all the Manipulated Variables is determined in achieving a Manipulated Variable modification. An estimated process disturbance value is then determined from the Controlled Variable magnitude and the estimated modeling error value; and a first portion of desired change in the present value of at least one Manipulated Variable is determined from the estimated modeling error value. Then a second portion of desired change in the present value of at least one Manipulated Variable is determined from the estimated process disturbance value. The first and second desired change portions are finally effectively combined to modify each Manipulated Variable.

A basis for adaptation of the models in real-time operation is also enabled in the described embodiments. In this regard, the modeling error value and process disturbance values are used in decisions to adapt the controller in the context of the inertial characteristics of the model set. Furthermore, determination and counteraction respective to divergent response behavior in the controlling operation are implemented to provide strategic robustness via (a) the adaptive process and (b) ongoing use of the models which have been adaptively modified in the controller.

A formalized characterization of the multi-variable controller is set forth in the following section. The discussion will be divided into six subsections: a first subsection describing the models of the robust multi-variable controller; a second subsection discussing the controller definition in the robust multi-variable controller; a third subsection discussing determination of the process in the robust multi-variable controller; a fourth subsection discussing the adaptive process in the robust multi-variable controller; a fifth subsection discussing the decision to adapt in the robust multi-variable controller; and a sixth subsection discussing determination of divergence and adaptation to divergence in the robust multi-variable controller.

The following first subsection of the formalized characterization discusses the models of the robust multi-variable controller.

The robust matrix process control method of the preferred embodiments requires sets of numerical values, which explicitly define the relationship between (a) input variables, including feedforward variables (denoted as manipulated variables, MV), and (b) output variables (denoted as controlled variables, CV). Each data set is referred to as a "model". Each data set is expressed as a vector in which the entries are the values of the data set in ordered relation to time. Note that the input variables to the model (MV) are the output signals from the control system (MV) and that output variables from the model (CV) are input signals to the control system (CV).

These data sets (expressed as vectors) are processed by computer-implemented procedures to (a) produce the mathematical datalogical objects (scalars, vectors, and matrices) and (b) to achieve engine-solved computations (implementation and manipulation in computer logic of sets of scalars, vectors, matrices, and mathematical operations which are arranged in such an order as to perform a non-trivial mathematical calculation) to achieve robust control of the controlled apparatus.

As noted previously, the term "model" references a set of time stamped values defined as a vector:

$$M(t)=\{a_{(t)}\}, \text{ where } t=0, 1*\Delta t, 2*\Delta t, 3*\Delta, \ldots np*\Delta t \quad \text{Equation 1}$$

where "np" is the model size—therefore, there are "np" $a_{(t)}$ values.

Each value $a_{(t)}$ is obtained through regular model identification techniques. This usually involves plant testing and data collection techniques along with subsequent analysis and processing. M(t) is alternatively a step model, an impulse model, or a parametric model. The description below refers to step models, but an equivalent exists for either an impulse model (an impulse model is readily transformed into a step model by a summation process) or a parametric model (transformed to either a step model or impulse model).

Figure 5:
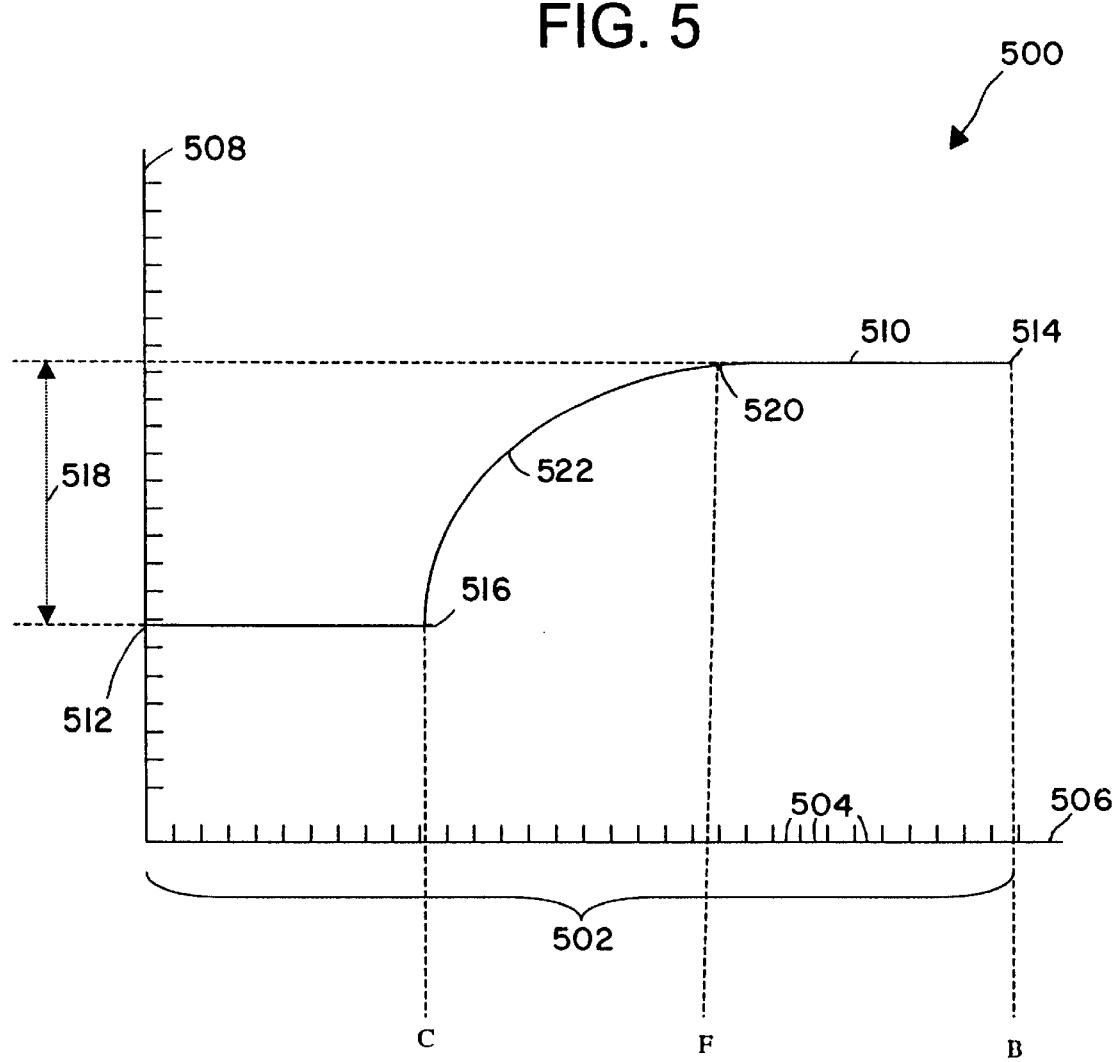
FIG. 5 presents a time-dependent non-integrating-model characterization.

There is always a model M(t) for each pair of MV and CV. The trivial model M(t)={0} from t=0 to np*Δt, indicates that no physical relation exists between the two elements of the pair, but this model exists nonetheless. Usually the model is represented after smoothing of the sampled data (i.e. each $a_{(t)}$) to obtain a continuous curve; the smoothed sampled data is shown in FIG. 5 and discussed in the specification respective to FIG. 5.

A set of models is used to define the matrix A, where each column of the matrix refers to a specific predicted future CV value. It should be noted that the "A" matrix is apparent to those of skill in Dynamic Matrix Control, and is normally used in descriptions of the technology.

This first set of models obtained by plant testing is denoted herein as the "Reference Model". Since the "Reference Model" is time dependent, the time ("t") is defined as the "Reference Time". "Reference Time" goes from zero to $t_{final}$. The definition of a Reference Time is important in deriving two other models from the Reference Model. In this regard, the preferred embodiments are based in part upon defining a set of consecutive discrete intervals of time in related time-dependent models where each discrete time interval for each related model has the same time duration and each related model also has identically valued zero-time time-axis attributes and maximum-time time-axis attributes. The Reference Model and the two additional models (further described herein) therefore all have a time axis with a time span from t=0 to the same $t_{final}$. A fundamental idea in the preferred embodiments is to define and use an "envelope" derived-from and respective-to the "Reference Model". The "envelope" is defined such that it delimits a zone of uncertainty where the real model is trusted (a) to exist and, further, (b) to evolve with time and process conditions.

Thus, the "envelope" has an "upper" boundary and a "lower" boundary (respective to the time axis); these boundaries require definition. For simplicity, assume that each model M(t) has a continuous mathematical equivalent. That is: M(t) is a z-transform of M*(t)(M* being continuous). Thus:

$$M(t)=Z(M^*(t))=a0+a1^*z^{-1}+a2^*z^{-2}+\text{etc.} \quad \text{Equation 2}$$

Each model exhibits dead time. Therefore, M*(t) is written as M*(t−d). M* is zero when t≦d.

Each model has a final steady-state gain or a final constant ramp rate; these are denoted as G or R, respectively. The time of steady-state (or final constant ramp rate) initiation is defined as $t_{ss}$. The last value of the model occurs at time $t_{last}$.

The envelope boundaries are the lower limit model and the upper limit model for a positive gain model. The lower limit model is denoted as the "Slow Model" and, respective to the Reference Model, has the physical significance of a process (a) having more dead time and (b) reaching steady state "later". The upper limit model is denoted as the "Fast Model" and, respective to the Reference Model, has the physical significance of a process (a) having less dead time and (b) reaching steady state "sooner". The fundamental idea of this robust controller is that, as long as the controlled process exhibits a behavior that "lies" between the "Slow Model" and the "Fast Model", then it is possible for a controller to behave like a perfect controller in the sense that there will be no model mismatch for which a compensation must be calculated and implemented.

In defining the "Fast Model" and the "Slow Model", substitutions of the time variable into M*(t) are performed; the aim of the substitution is to contract (Fast Model) or expand (Slow Model) the function of the Reference Model along the time axis.

The "Fast Model" is obtained by the following substitution of the time variable into M*(t):

For time before Dead Time:

$$t=t_{fast}/(1.0-F_{r1}) \text{ yielding } t_{fast}=(1.0-F_{r1})^*t. \quad \text{Equation 3}$$

For time after Dead Time:

$$t_{fast}=(1.0-F_{r1})^*t_d+(1.0-F_{r2})^*(t-t_d). \quad \text{Equation 4}$$

For a ramp model, $F_{r2}$ is zero.

The portion after $t_{fast}>t_{ss}$ is filled with the model value at steady-state up to $t_{final}$. In the case of a ramp, the ramp is extended at the constant rate R.

The "Slow Model" is obtained by the following substitution of the time variable into M*(t):

For time before Dead Time:

$$t_{slow}=(1.0+F_{r3})^*t. \quad \text{Equation 5}$$

For time after Dead Time:

$$t_{slow}=(1.0+F_{r3})^*t_d+(1.0+F_{r4})^*(t-t_d). \quad \text{Equation 6}$$

For a ramp model, $F_{r4}$ is zero.

The portion after $t_{slow}>t_{final}$ is dropped.

$F_{r1}$, $F_{r2}$, $F_{r3}$, and $F_{r4}$ are robustness factors. The robustness factors are positive adjustable values usually in the numeric range of 0–0.5, but they can be of greater magnitude. The fact that the time-referenced model contraction and expansion are treated differently before and after dead time allows for more flexibility in building the limit models (the "Slow Model" and the "Fast Model" are collectively "limit models" defining the "envelope" around the "Reference Model"). In this regard, (a) the veritable dead-time of the operational apparatus being controlled and (b) the veritable transient trajectory of the operational apparatus being controlled (as characterized in each model with a "curvilinear portion" as further described herein) both are subject to time-variance and/or to measurement error; the flexibility afforded by the independent methods (1) in "Reference Model" expansion to the "Slow Model" and (2) in "Reference Model" contraction to the "Fast Model" facilitates the robust operational response enabled by the preferred embodiments. Furthermore, the "Slow" and "Fast" Models need this flexibility when either of these limit models solves to be essentially proximate to the Reference Model.

At the end of the above substitution processes, all time in the Reference and limit models will have the same equivalence, with each model providing a time axis of a set of consecutive discrete intervals of time where each discrete time interval for each related model has the same time duration and each related model also has identically valued zero-time time-axis attributes and maximum-time time-axis attributes, as previously noted.

That is:

$$t=t_{fast}=t_{slow}. \quad \text{Equation 7}$$

As should be appreciated, before processing all the models in the dynamic control matrix to produce all the affiliated envelopes, some or all of the Reference Models are optionally extended with a higher magnitude of $t_{last}$ to ensure that the last operation keeps unchanged (a) the gain of any non-integrating process model or (b) the ramp rate of any integrating process model.

The values of $F_{r1}$, $F_{r2}$, $F_{r3}$, and $F_{r4}$ belong to a model and are intra-functional. It should be noted that it is possible (even desirable) to have fewer values to adjust than represented by the full number of robust factors. In this regard, note that the mathematics herein described allow for any set of $F_r$ factors to be grouped and assigned a single value through use of ratios and user-defined functions. These $F_r$ values are local to each controlled variable and/or each manipulated variable; it is therefore possible to provide a single $F_r$ for adjustment respective to the whole controller. This feature does not prevent local adjustment if desired; therefore, each $F_{rk}$ applied to each model is decomposed as:

$$F_{rk}(i,j)=F_r(\text{global})+F_r(\text{whole } MV_i)+F_r(\text{whole } CV_i)+F_{rk}(\text{specific to a Reference Model instance}). \quad \text{Equation 8}$$

The requirement that each $F_{rk}(i,j)$ be a positive number is still valid, but this does not prevent other components in the above equation from having a negative value. In this regard, a local $F_r$ may be negative with the effect that the net $F_{rk}(i,j)$ is of lower magnitude than $F_r(\text{global})$ even as $F_{rk}(i,j)$ is positive (or even zero).

Figure 16:
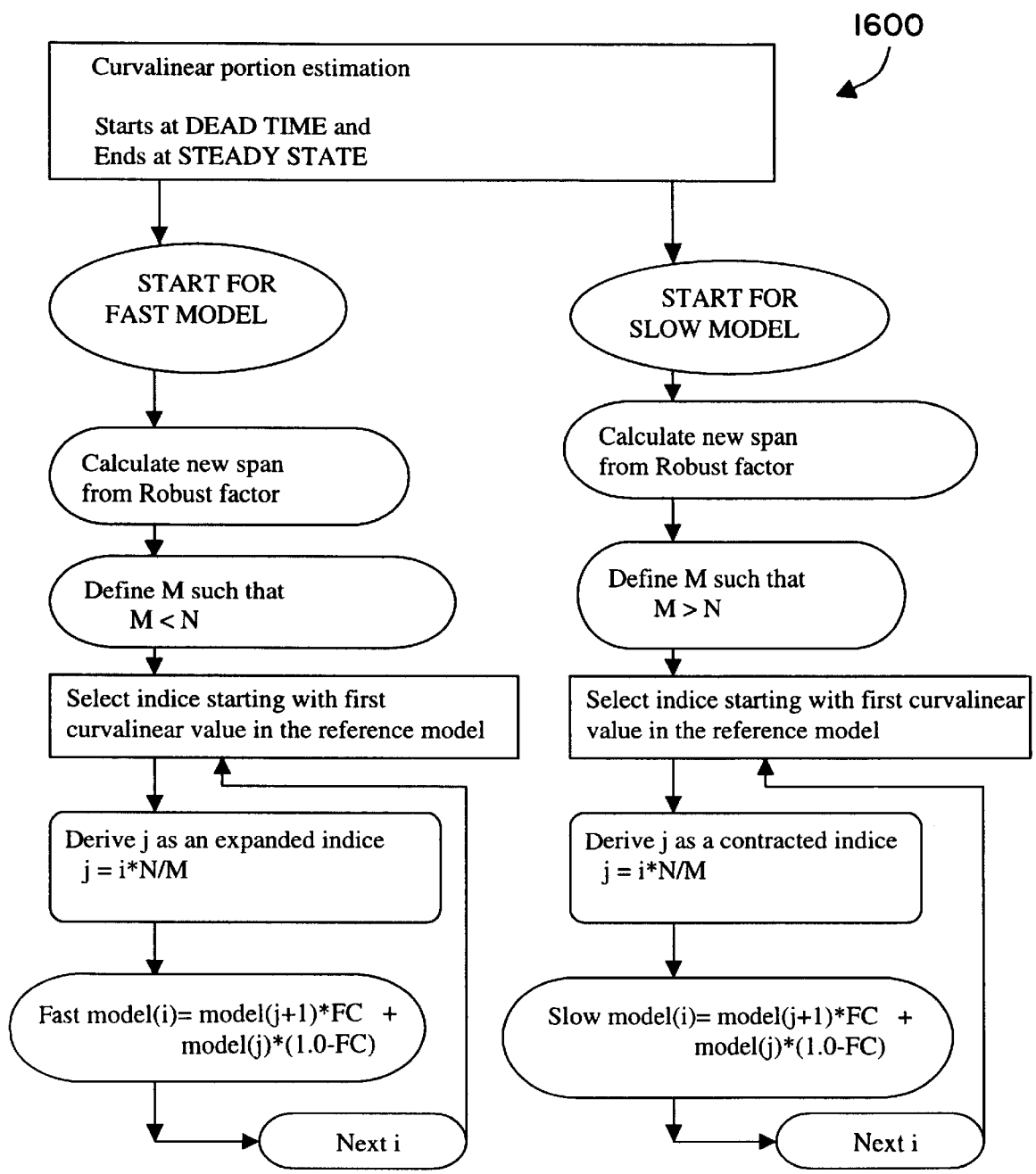
FIG. 16 presents curvalinear-portion determination detail in a model.

When all instances of $F_r(i,j)$ have been chosen, the models have been properly extended (if necessary), and $M^*_{fast}$ and $M^*_{slow}$ have been calculated, then $M^*_{fast}$ and $M^*_{slow}$ are written into sampled form (or Z-transform form). The diagram and discussion respective to FIG. 16 illustrates a computer-implemented approximative process which yields equivalent results to the above formalized models. The process involves interpolation of the Reference Model M (already in z-transform form).

In vector form an example result is:

Reference Model $(0,0,0,0,0,0,a_1,a_2,a_3,a_4,a_5, \ldots a_{ss}, \ldots a_{ss})$ Slow Model $(0,0,0,0,0,0,0,b_1,b_2,b_3,b_4,b_5, \ldots a_{ss}, \ldots a_{ss})$ Fast Model $(0,0,0,0,c_1,c_2,c_3,c_4,c_5, \ldots a_{ss}, \ldots a_{ss})$ where $b_i$ and $c_i$ are interpolated from $a_i$ with the rule:

$$x_i = f^* a_i + (1.0-f)^* a_{i+1} \quad \text{Equation 9}$$

and f is calculated from each $F_{rk}$ and current time t in the models.

It should be emphasized that there are user choices in defining and calculating limit models because these models are directed to defining the boundary (limits) of controlled process response (behavior) where the boundary separates (a) an operational zone of predicted behavior where the model is trusted to be exact from (b) a complimentary operational zone where the model is trusted to have detected a disturbance in the process. Therefore, a benefit of the described embodiments is realized insofar as imprecision in the Reference Model does not diminish robustness to the degree that similar imprecision in the Reference Model diminishes robustness when there is not a defined envelope around the Reference Model (i.e. as in traditional DMC). Also noteworthy is the fact that the proposed transformation touches only (a) the dead time and (b) the process model trajectory; the gains of the model are unchanged. Adaptation for the gain is added later; but adaptation is not required to achieve robustness in the face of (a) model imprecision, (b) (more importantly) dead time uncertainties, and/or (c) dead time variations respective to either (1) time or (2) process conditions.

The following second subsection of the formalized characterization discusses the controller definition in the robust multi-variable controller.

The overall structure of the controller proper is the same as for a regular DMC (Dynamic Matrix Controller). In this regard, the controller proper has three blocks: the predictor block, the optimizer block, and the move calculator block. However, as will be further discussed in the discussion of the preferred embodiments, the predictor and the move calculator blocks differ from traditionally deployed DMC. The optimizer block is a conventional LP solver or any other commercially available steady-state optimizer.

The predictor block of the preferred embodiments differs from traditional DMC in using the Slow and Fast Models with the optional use of the Reference Model. In this regard, the important element of difference relates to the prediction of at least two limit behaviors of the process.

The controller block uses the usual least-squares equation of traditional DMC to evaluate the final moves in the manipulated variables; but, in the preferred embodiments, the calculation of E(i) is different from the previous art in DMC—in this regard, the traditional calculation is:

$$\Delta U = (A^t W A)^{-1} \cdot A^t W \cdot E \quad \text{Equation 10}$$

where $\Delta U = MV_{t+1} - MV_t$.

$(A^t W A)^{-1}$ is also denoted as the "ATA" matrix herein and $A^t W \cdot E$ is also denoted as the "ATE" matrix herein.

As in the case of traditional DMC, "move suppression factor", "equal concern error", and "constraints handling" are calculated and processed in the preferred embodiments when solving this least-squares equation. These are independent of the vector E. In traditional DMC, robustness is substantively achieved with "move suppression commissioning" under the assumption that the best possible (Reference) model was obtained. This is implemented, however, at the expense of suppressing the reactive movement of the manipulated variables. Consequently, the controller may have diminished responsiveness to disturbances and set point changes respective to fully desired responsiveness.

But controller robustness can be obtained as long as the controlled process exhibits the predicted process behavior. Since exact prediction of the controlled process is impossible, the determination of the process is the location where robustness is "found". So, for a controller to behave like a perfect controller in the sense that there will be no model mismatch to compensate-for, the model mismatch has to be minimized by a modification of the process determination. The above control equation is therefore modified in the preferred embodiments to be:

$$\Delta U = (A^t W A)^{-1} \cdot A^t W \cdot F(\text{models}, Y, \ldots) \quad \text{Equation 11}$$

where F is a function dependant of process measurements Y, and errors based on limits models are used. In this regard, $F(\text{models}, Y, \ldots)$ has replaced E in the $\Delta U = (A^t W A)^{-1} \cdot A^t W \cdot E$ equation.

The following third subsection of the formalized characterization discusses determination of the process for the robust multi-variable controller.

For each CV there are at least two predictions: the one from the Fast Model $CV_{fast}$ and the one from the Slow Model $CV_{slow}$. Optionally, the prediction from the Reference Model is used along with at least one limit model. The predictions are obtained as in traditional DMC practice with:

$$CV(i,k) = \sum_{j=1}^{N} \sum_{l=1}^{np} (a(i,j,l) * \Delta U(j, k+l-1)). \quad \text{Equation 12}$$

However, in the preferred embodiments, there are at least two prediction blocks: one for the Slow Model and one for the Fast Model. It is also preferable to maintain the prediction from the Reference Model, but, again, this is optional.

The measured output Y is compared to these predictions through an ad-hoc function. The function is designed to generate a modified measured output Y*. Then the "error to correct" is a function of at least these three elements and, optionally, the Reference Model prediction:

$$Y^* = f(CV_{fast}(t), CV_{slow}(t), Y, \text{etc.}). \quad \text{Equation 13}$$

In example, the function is defined as:

$CV_{max} = \text{Max}(CV_{fast}(t-k), CV_{slow}(t-k))$ $\{\forall k | -d < k < +d\}$ $CV_{min} = \text{Min}(CV_{fast}(t-k), CV_{slow}(t-k))$ $d=0,1,2$ or $3$ (chosen)

$CV_{mean} = (CV_{fast} + CV_{slow})/2.0$ $\quad$ Equations 14–16 or alternatively:

$CV_{mean} = CV_{reference}$ at the expense of more computing, but it might be preferred insofar as a better estimate is achieved. $\quad$ Equation 17

The extension $\{\forall k | -d < k < +d\}$ within the predicted values expands the choice of predicting models to those having less and more dead time. So, if $d=3$, for example, then this function actually uses at least 14 different models, with each model generating different responsive behavior:

If $Y > CV_{fast}$ then $Y^* = Y - CV_{fast} + CV_{fast} + CV_{slow}$

If $Y < CV_{fast}$ then $Y^* = Y - CV_{fast} + CV_{slow}$

Otherwise $Y^* = CV_{mean}$. $\quad$ Equations 18–20

Another possible function (that has the benefit of being continuous) is the following as obtained by defining a function $\phi$ to normalize variations in the predicted CV's:

$$\Phi = \frac{Y - \frac{(CV_{fast} + CV_{slow})}{2}}{|CV_{fast} - CV_{slow}|}; \quad \text{Equation 21}$$

it is possible to calculate the desired Y* according to $$Y^* = \frac{CV_{fast} + CV_{slow}}{2} + \left(Y - \left(\frac{CV_{fast} + CV_{slow}}{2}\right)\right) * \left(1 - \frac{1}{1+a\Phi^n}\right). \quad \text{Equation 22}$$

The value of "a" and "n" are adjusted to provide a behavior that fits statistical expectation. For example, $a=1.5$ and $n=4$ produces a function that has desirable effects:

it returns Y* equal to the $CV_{mean}$ when Y is within $CV_{fast}$ and $CV_{slow}$;

it returns Y* equal to the measured CV when far away from $CV_{fast}$ or $CV_{slow}$; and it returns Y* equal to the measured $CV_{mean}$ plus a small correction when close to $CV_{fast}$ or $CV_{slow}$.

The function term $$\left(1 - \frac{1}{1+a\Phi^n}\right) \quad \text{Equation 23}$$

is a confidence function that is zero (or close to zero) when the measured output is within the Slow and Fast predictions. In the first example, the confidence interval is defined by $CV_{max}$ and $CV_{min}$. In both cases, the function is a scaling sensitivity factor. The function also jumps (increases) toward unity when the measured output moves away from the predictions; this indicates a confidence that the measured output indicates a strong deviation in the plant (apparatus in operation) needing correction. Also, $CV_{mean}$ (i.e., $(CV_{fast} + CV_{slow})/2$) is optionally replaced by $CV_{reference}$ (if available).

The error to compensate-for is now estimated from $Y^* - CV_{mean}$ for each CV. This formulation now contains the process information from the Slow and Fast Models, and it generates a controller using at least 2 models simultaneously (and, optionally, more models as previously indicated):

$$\Delta U = (A^t W A)^{-1} \cdot A^t W (Y^* - CV_{mean}). \quad \text{Equation 24}$$

The following fourth subsection of the formalized characterization discusses the adaptive process in the robust multi-variable controller.

Further robustness can be added to the controller. Since the robust controller is presumably stable "in the face of" (when dealing with or when subject to coping with) process variation caused by dead time change and overall model change, then the (remaining) gain element is now adapted on-line (during real-time operational use of the preferred embodiments) with better efficiency respective to traditional DMC practice since the overall control process of the described embodiments presumably provides relatively improved stability. This adaptive process is perhaps more precisely denoted as "semi-adaptive" insofar as (a) only the gain is adapted and also (b) because some discrepancy is inherently accepted in model shape and model dead time by the robust controller structure described by Equation 11. The information derived from using two limit predictions is further used for estimating (on-line) improved gains for all the models (Reference, Slow, and Fast Models). By guiding the adaptation process to operational zones where maximum stable information is available, the adaptive algorithm is fed with reliable and non-disruptive data. This enables the gain estimation algorithm to proceed smoothly.

The process of gain adaptation involves comparing past prediction of the Reference Model with historical data from the process. Then multiplicative correction factors are estimated by the least-squares method.

The model prediction based on the Reference Model at time $t_k$ for each CV(i) can be written as:

$$CV(i,k) = \sum_{j=1}^{N} \sum_{l=1}^{np} (a(i,j,l) * \Delta U(j, k+l-1)) \quad \text{Equation 25}$$

and this is transformed into a larger sampled time interval and into a difference equation:

$$\Delta CV_s(i,k) = \sum_{j=1}^{N} \sum_{l=1}^{r} (a(i,j,s*l) - a(i,j,s*(l-1))) * \quad \text{Equation 26}$$

-continued $$\Delta U_s(j, k+l-1)$$

where: N is the number of MV's and FF's

"np" being the model size; then there are "r" divisions of equal size "s" in the model such that there are np=r*s values in the model.

$\Delta CV_s(i,k)$ and $\Delta U_s(i,k)$ are taken as the time difference of their values separated by a time interval equal to $s*\Delta t$. Usually, "s" is chosen such that effect of dead time is minimized; this generates stability in the adaptation process.

The $\Delta CV_s(i,k)$ values are weighted according to their age and reliability. Age is discounted by weighting $\Delta CV_s(i,k)$ with $\lambda(t)$ so that recent values have more weight in the adaptation calculation than relatively older data:

$$\lambda_{(k)} = \lambda_0^{(k-1)} \qquad \text{Equation 27}$$

where $\lambda_0$ is adjusted to lie usually between 0.9 and 1.0.

The reliability is related to the model predictions and, therefore, involves the predicted values obtained by the Slow and Fast Models as well as the type of MV movements. It also uses on-line process value Y. Since a Fast Model and a Slow Model each define a zone of uncertainty respective to the Reference Model, this overall information is used to determine readiness of the data for adaptation use:

$$V_{(i,k)} = f(CV_{slow}, CV_{fast}, CV_{reference}, MV, Y) \text{ and } 0.0 < V_{(i,k)} < 1.0, \qquad \text{Equation 28}$$

i.e.,:

If $CV_{slow} \neq CV_{fast}$ if $Y > CV_{slow}$ and $Y > CV_{fast}$ then $V(i,k) = 0.0$, if $Y < CV_{slow}$ and $Y < CV_{fast}$ then $V(i,k) = 0.0$, otherwise $$V(i,k) = \text{Min}(|Y - CV_{fast}|, |Y - CV_{slow}|)/|CV_{fast} - CV_{slow}|,$$

otherwise $$V(i,k) = 1.0$$

Finally, if $\Delta U_s(j,k)$ is not monotonic within its "s" time interval according to its historical record, then $V(i,k) = 0.0$.

The monotonicity of U is evaluated by:

$$|\Delta U_s| < \Sigma k_i |\Delta U_{t+i}| \qquad \text{Equation 34}$$

with $\Sigma k_i = 1.0$ with each $k_i > 0$ (chosen to preferentially weight the effect of first $\Delta U_{t+i}$ values in the historical data series).

Optionally, a part of the proposed scaling sensitivity factor determines the V function:

$$V(i,k) = \left(\frac{1}{1 + a\Phi^n}\right). \qquad \text{Equation 35}$$

Whatever the choice, this function is chosen by the user to eliminate (or minimize) the effect of model mismatch caused by model parameters other than gain by using the predictions obtained from at least two limit models. The selected function varies according to the characteristics of the process such as (a) a deterministic process with few disturbances or (b) a process characterized by strong stochastic disturbances. The function V has the effect of (a) screening data containing the most valuable information for adapting the process gains and (b) rejecting some of the transients and disturbances introducing errors in the adaptation process.

Continuing, each $\Delta CV_s(i,k)$ is modified by the weighting equation:

$$\Delta CV_s(i,k) = \Delta CV_s(i,k) * (\lambda_{(k)} * V_{(i,k)}). \qquad \text{Equation 36}$$

This forms the matrix "C" used to solve the following minimization of sum-of-squared error:

$$S(i) = \sum_k (\lambda_{(k)} * V(i,k)) * E(i,k)^2 \qquad \text{Equation 37}$$

$$= \sum_k H(k) * E(i,k)^2,$$

the summation being done on available historical data $$E(i,k) = \Delta Y_s(i,k) - \Delta CV_s(i,k) \qquad \text{Equations 38-39}$$

$$= \Delta Y_s(i,k) - \sum_{j=1}^{N} \sum_{l=1}^{r} \Delta G(i,j) *$$

$$(a(i,j,l) - a(i,j,l-1)) * \Delta U_s(j, k+l-1).$$

To minimize S(i), a set of changes in gain is introduced to provide multipliers of the actual "a" values of each model. These are the $\Delta G(i,j)$ multiplying each term of the summation (Equation 39). Therefore, there are as many $\Delta G$ as there are models. For future reference, $\Delta U$ and $\Delta CV$ quantities are collectively denoted as "delta-s quantities".

Continuing, the changes in gain are computed from the least-squares equation:

$$\Delta G(i) = (C^t H C)^{-1} \cdot C^t H \Delta Y(i) \text{ (repeated for each } CV_i\text{)}. \qquad \text{Equation 40}$$

The resulting individual $\Delta G(j)$ multipliers are validated and relaxed (filtered) so that smooth changes are implemented. In some cases, the validation process results in the rejection of the entire vector estimate. Note that, in this case, the validation process adds robustness to the adaptation.

Continuing, each Model (Slow, Fast and Reference) is updated by the matrix $\Delta G(i)$:

$$M = M \cdot \Delta G(i). \qquad \text{Equation 41}$$

This is repeated for each selected CV(i). Each CV(i) does not necessarily need adaptation in this regard; this is a choice (a) defined at controller commissioning or (b) implemented in real-time operation by being either "turned on" or "turned off" respective to each individual CV.

The following fifth subsection of the formalized characterization discusses the decision to adapt in the robust multi-variable controller.

The implementation of the results of adaptation:

$$\Delta G = (C^t H C)^{-1} \cdot C^t H \Delta Y \qquad \text{Equation 42}$$

affects all models and may produce either an ill-conditioned matrix or a singular matrix. As should be apparent, a singular matrix or an ill-conditioned matrix should not be implemented for control. Therefore, the gains are validated by analyzing the consequences of any gain change. This adds further robustness into the adaptation process.

The initial model is used to generate a set of characteristic values such as eigenvalues or singular values. The calculation is usually performed with a commercial package. Therefore, only the resulting vector and matrices from the decomposition calculation process are important here.

These characteristic values will be used to validate future changes and they serve as reference values.

The following assumes that the gains have been normalized to compensate for scale and physical unit effects. The gain matrix is made a-dimensional.

Since the matrix of the process gain is the target of the adaptation, the characteristic values are obtained from $G_{reference}$.

For eigenvalues: $G_{reference} = T^{-1} \cdot \lambda \cdot T$;  Equation 43

For singular values: $G_{reference} = U \cdot \Sigma \cdot V$.  Equation 44

The matrix $\lambda$ or $\Sigma$ contains the characteristic values to monitor. For an ill-conditioned matrix, it is necessary (a) to detect a change of sign in one characteristic value of the process and then (b) to responsively implement the equivalent change of sign in the model gains to produce the same sign in all the characteristic values and add to the controller stability.

The vectors T and/or U,V are maintained as constant, and only the characteristic values are updated. Then, as the adaptation calculates changes in model gains G(i,j), new corresponding $\lambda$ or $\Sigma$ are determined and validated to produced $\lambda^*$ or $\Sigma^*$. The validated characteristic values are then used in back-calculating the final gains:

For eigenvalues: $G^*_{ref,slow,fast} = T^{-1} \cdot \lambda^* \cdot T$;  Equation 45

For singular values: $G^*_{ref,slow,fast} = U \cdot \Sigma^* \cdot V$.  Equation 46

It should be noted that some safeguards are preferably introduced to prevent abrupt changes. In this regard, large characteristic values (greater than or equal to threshold $\epsilon$) and small characteristic values (less than threshold $\epsilon$) are handled in different ways. The small values are associated with instabilities and potential divergence because the likelihood of having sign difference between the controlled process and the model is greater. The small characteristic values are accordingly not allowed to decrease in magnitude. The threshold is defined (denoted $\epsilon$) to prevent any magnitude change from crossing a limit where the change can induce divergence in the controller (i.e. inverted gain). The divergence problem is not solved by the adaptation mechanism. A different mechanism is described in subsection 6.

If any characteristic value exhibits a sign change and (at the same time) is a large value, then the adaptation for the gain related to that CV will be rejected as unreliable. Otherwise, the characteristic values are validated and relaxed according to:

$\lambda^*_{i,t} = \max(\epsilon, (0.1-h)^* \lambda_{reference}, \min(\epsilon, (1.0+h)^* \lambda_{reference}, \lambda^*_{i,t}))$ $\lambda^*_{i,t} = \lambda^*_{i,t} + f^*(\lambda^*_{i,t} - \lambda^*_{i,t-1})$ with $f$ chosen $0.0 < f < 1.0$  Equations 47 and 48 where "h" defines clamping limits respect to the initial characteristic values and "f" limits speed of changes. Optionally, "f" is adjusted based on historical data:

$f = g(\text{statistics of past } \lambda)$.  Equation 49

The unfiltered characteristic values are maintained in history (a) for future use when "f" depends on the statistics of past calculated characteristic values or (b) to assess the stability of the adaptation process.

The following sixth subsection of the formalized characterization discusses determination of divergence and adaptation to divergence in the robust multi-variable controller.

As mentioned before, the initial Reference Model is used to calculate characteristic values such as eigenvalues and eigenvectors, or the singular value decomposition $\Sigma$.

The calculation is performed with a commercial package such as "Recipes in C" by Cambridge University Press.

The process of adaptation to divergence does not depend on the semi-adaptative mechanism of the prior two subsections and runs independently.

The set of eigenvectors or the vectors of V (in the singular value decomposition) constitutes a mapping of the current MV's into a space where effects are decoupled.

The vectors T and/or U,V (kept constant) are used to transform the $\Delta CV(i)$ and the $\Delta MV(i)$. The evaluation of these last two quantities is performed by using the "delta-s quantities":

$\Delta CV_s(i,k)$ and $\Delta MV_s(i,k)$  Equation 50

(once again) to minimize effect of dead time. This produces stability in the divergence detection mechanism.

Then each $\Delta MV_s(i,k)$ and $\Delta CV_s(i,k)$ is validated by the validity factor V(i,k). This uses the information coming from the Slow and Fast Models indicating the transient nature of the changes in the manipulated variables and controlled variables:

$\Delta MV_s(i,k) = \Delta MV_s(i,k) * V_{(i,k)}$;

$\Delta CV_s(i,k) = \Delta CV_s(i,k) * V_{(i,k)}$.  Equations 51 and 52

Finally a transformation is done by:

For eigenvalues: $A = T \cdot \Delta CV_s$ and $B = T \cdot \Delta MV_s$;  Equation 53

For singular values: $A = U^{-1} \cdot \Delta CV_s$ and $B = V \cdot \Delta MV_s$.  Equation 54

The elements of A are the transformed CV and the elements of B are the transformed MV. This introduces a decoupling of effects.

Continuing, an estimate of the sign of the characteristic values is obtained by a ratio of the non-zero elements and/or sufficiently large elements of B to the elements of A. A "too-small" value of any element of A indicates, obviously, that the corresponding MVs (a) did not move or (b) did not move in concert to act on the corresponding transformed CV. In that case, no conclusion is reached regarding the corresponding characteristic value and, accordingly, nothing is changed.

The known small characteristic values are tracked in the historian, and a persistent sign change triggers a positive divergence detection signal. The logic here is primarily based on a user chosen algorithm that uses statistics such as those derived from a CUSUM algorithm.

When divergence is detected, changes in the model gains G(i,j) (corresponding to the value of $\lambda$ or $\Sigma$, but with the sign inverted) are introduced to produced $\lambda^d$ or $\Sigma^d$. This means that (for eigenvalues) the following transformation is accomplished for any small eigenvalues (other eigenvalues may have been adapted as well):

$$\begin{pmatrix} \lambda \\ \lambda \\ \cdots \\ +\varepsilon \\ \cdots \\ \lambda \end{pmatrix} \Rightarrow \begin{pmatrix} \lambda \\ \lambda \\ \cdots \\ -\varepsilon \\ \cdots \\ \lambda \end{pmatrix}.$$  Equation 55

The new vector, denoted as $\lambda^d$ with inverted characteristic values, is then used to back-calculate the final gains:

For eigenvalues: $G^d_{ref,slow,fast}=T^{-1}\cdot\lambda^d T$;  Equation 56

For singular values: $G^d_{ref,slow,fast}=U\cdot\Sigma^d\cdot V$.  Equation 57

The new gains are then inserted into the Reference Model and any other model previously derived from it (e.g., the Fast and Slow Models). It is important to maintain the same gains for all corresponding parts of all models.

Further details in the preferred embodiments are appreciated from consideration of the figures and their description. Turning now to the figures and FIG. 1, System Overview 100 presents an overview of the physical components in an applied described embodiment.

Control Computer 104 incorporates Control Computer CPU 122 for execution of Control Computer Logic 120 in real-time operational monitoring and control of Operated Apparatus 102. Operated Apparatus 102 is alternatively, in example and without limitation, a steam turbine, a gas turbine, a chemical process, an internal combustion engine, or a furnace.

Communication Interface 106 incorporates Communication Interface CPU 118 for execution of Communication Interface Logic 116 in facilitating bilateral data communication between Control Computer 104 and Multi-Variable Controller 108.

Figure 2:
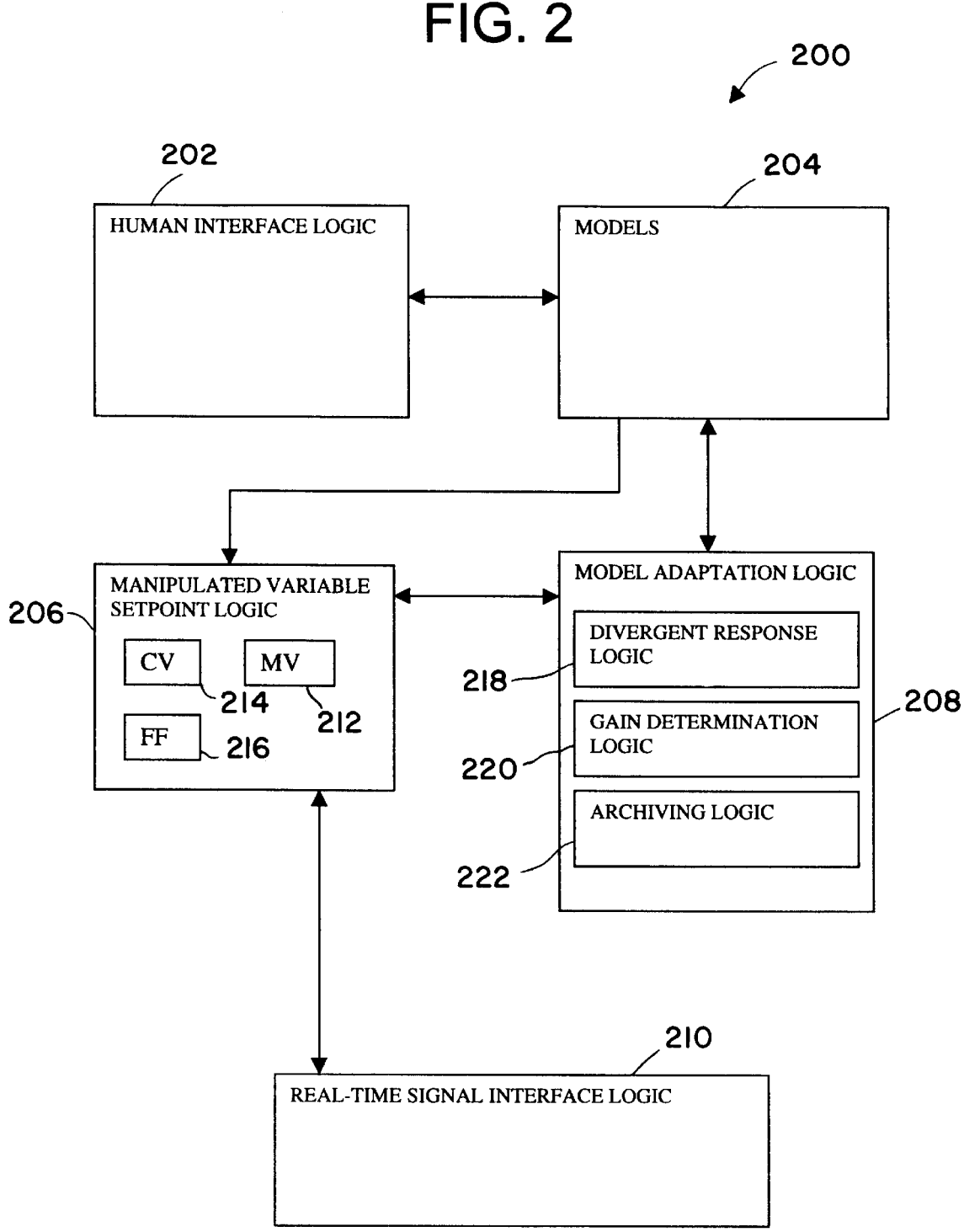
FIG. 2 exhibits multi-variable controller logical detail.

Multi-Variable Controller 108 incorporates Multi-Variable Controller CPU 114 for execution of Multi-Variable Controller Logic 112 in the methodology of the preferred embodiments; Multi-Variable Controller Logical Detail 200 of FIG. 2 shows further detail in Multi-Variable Controller Logic 112. Monitor and Keyboard 110 provides a monitor for human viewing of information and data.

Analog Input Signal 124 provides an analog input signal from Operated Apparatus 102 as an electrical voltage input to Control Computer 104 and is responsive to an attribute (e.g. a temperature or a pressure) within of Operated Apparatus 102. After conversion into a datalogical entity within Control Computer 104, Analog Input Signal 124 is denoted as a Controlled Variable (CV) insofar as the control of measured attributes of Real-time Interface Logic 210 is the goal of a controller deployed in either Control Computer 104 or Multi-Variable Controller 108.

Digital Input Signal 126 provides an digital input signal from Operated Apparatus 102 as an electrical voltage input to Control Computer 104 and is responsive to an attribute (e.g. a valve being either open or not open) within Operated Apparatus 102. After conversion into a datalogical entity within Control Computer 104, Digital Input Signal 126 is denoted as a Controlled Variable (CV) insofar as the control of measured attributes of Real-time Interface Logic 210 is the goal of a controller deployed in either Control Computer 104 or Multi-Variable Controller 108.

Digital Output Signal 128 provides an digital output signal from Control Computer 104 as an electrical voltage input to modify and manipulate the position of a control element in Operated Apparatus 102. In so doing, Digital Output Signal 128 modifies attributes (e.g., the kinetic energy available for transfer to a fluid in enabling fluid transport through a pump) of Operated Apparatus 102. Accordingly, a datalogical entity within Control Computer Logic 120, Communication Interface Logic 116, and Multi-Variable Controller Logic 112 whose value is represented in the voltage of Digital Output Signal 128 is denoted as a Manipulated Variable (MV).

Analog Output Signal 130 provides an analog output signal from Control Computer 104 as an electrical voltage input to modify and manipulate the position of a control element in Operated Apparatus 102. In so doing, Analog Output Signal 130 modifies attributes (i.e. the cross sectional area available for fluid flow within a pipe) of Operated Apparatus 102. Accordingly, a datalogical entity within Control Computer Logic 120, Communication Interface Logic 116, and Multi-Variable Controller Logic 112 whose value is represented in the voltage of Analog Output Signal 130 is denoted as a Manipulated Variable (MV).

The natures of Operated Apparatus 102, Control Computer 104, and Communication Interface 106 are presumed to be apparent to those of skill and are presented here to enable an overall understanding of the preferred described embodiments and their use. Details in Multi-Variable Controller 108 are focal in most subsequent discussion in this specification. An example of Control Computer 104 is given in U.S. patent Ser. No. 09/482,386, filed Jan. 12, 2000, entitled "PROCESS CONTROL SYSTEM WITH INTEGRATED SAFETY CONTROL SYSTEM", which is incorporated herein by reference.

Turning now to FIG. 2, Multi-Variable Controller Logical Detail 200 shows detail in Multi-Variable Controller Logic 112. Human Interface Logic 202 provides data output for viewing on the screen of Monitor and Keyboard 110 and data input from the keyboard and affiliated input devices (e.g. trackball, mouse) from Monitor and Keyboard 110. Details in Models 204 are shown in Time-Dependent Non-Integrating Characterization 500, Multiple Non-Integrating Model Characterization 600, Non-Integrating Model Inertial Characteristics 700, Time-Dependent Integrating Functional Characterization 800, Multiple Integrating Model Characterization 900, and Integrating Model Inertial Characteristics 1000 of FIGS. 5–10. MV Determination Logic 206 executes the responsive control logic to determine Manipulated Variable 212 in the context of Controlled Variable 214 and Feed Forward Variable 216 values. Adaptation Logic 208 provides logic for adapting the control-related values within Models 204 and MV Determination Logic 206. Adaptation Logic 208 has Divergent Response Logic 218, Gain Determination Logic 220, and Archival Logic 222 logical portions. Real-time Interface Logic 210 reads Feed Forward Variable 216 and Manipulated Variable 212 variables from Control Computer Logic 120 (from data communication enabled by Communication Interface 106) and communicates these variables to MV Determination Logic 206. Real-time Interface Logic 210 also reads Manipulated Variable 212 variables from MV Determination Logic 206 and communicates these variables to Control Computer Logic 120 (through data communication enabled by Communication Interface 106).

Figure 3:
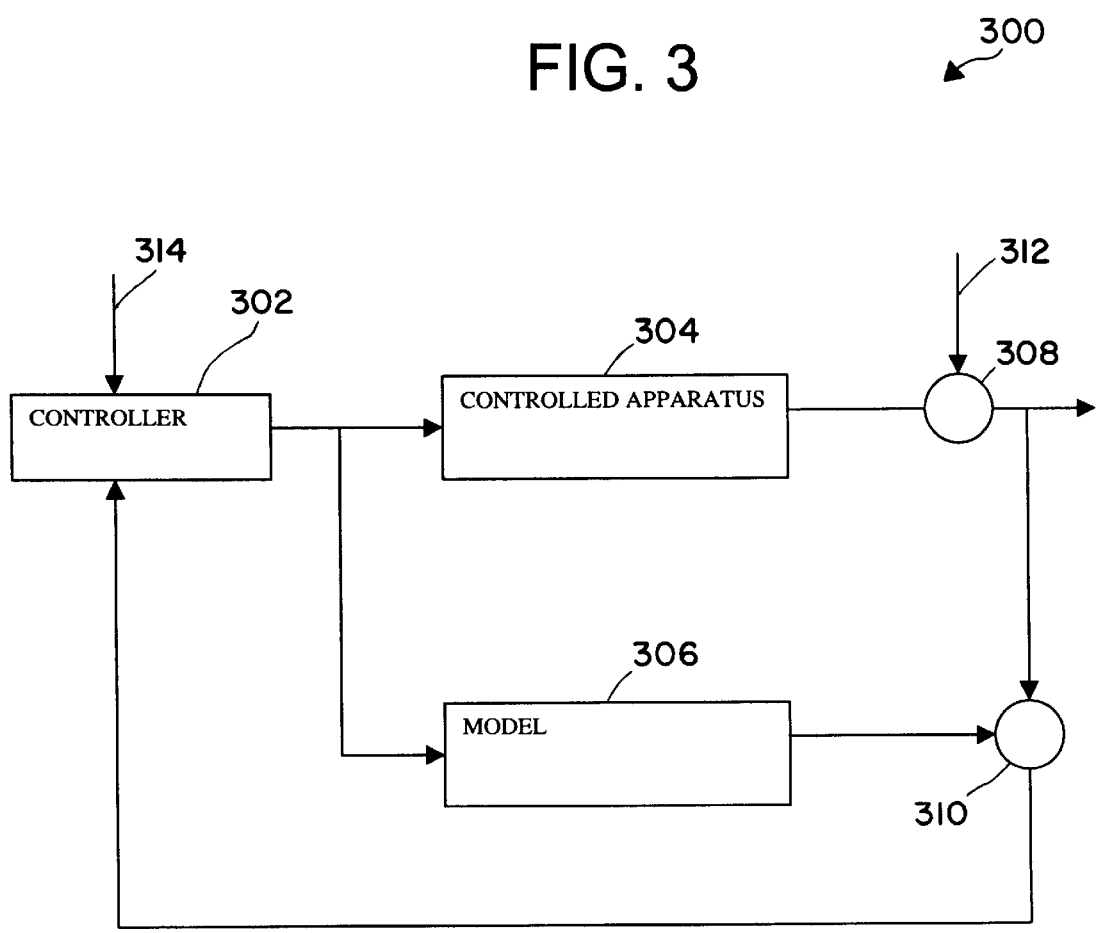
FIG. 3 shows a basic control system block diagram.

Continuing with attention now to FIG. 3, Basic Control System Block Diagram 300 shows a traditional control system diagram for a controller scheme incorporating a model. Controller 302 is the controller (frequently determined as an effective inversion of Model 306). Controlled Apparatus 304 is the controller block representation of Operated Apparatus 102. Model 306 is a computer-implemented model of aspects of Controlled Apparatus 304 under control. Disturbance/CV Summing Point 308 is a summing point for Disturbance 312 and output (Controlled Variable) from Controlled Apparatus 304. Model/CV Summing Point 310 is a summing point for Model 306 output (a model-determined value of a Controlled Variable) and output from Disturbance/CV Summing Point 308 (Controlled Variable actual value including the influence of any Disturbance 312). Disturbance 312 is any influence on a Controlled Variable not established by Controller 402. Setpoint 314 represents determinations of either (a) an operating technician or (b) an automated setpoint determination system as to the desired value of a Controlled Variable.

Figure 4:
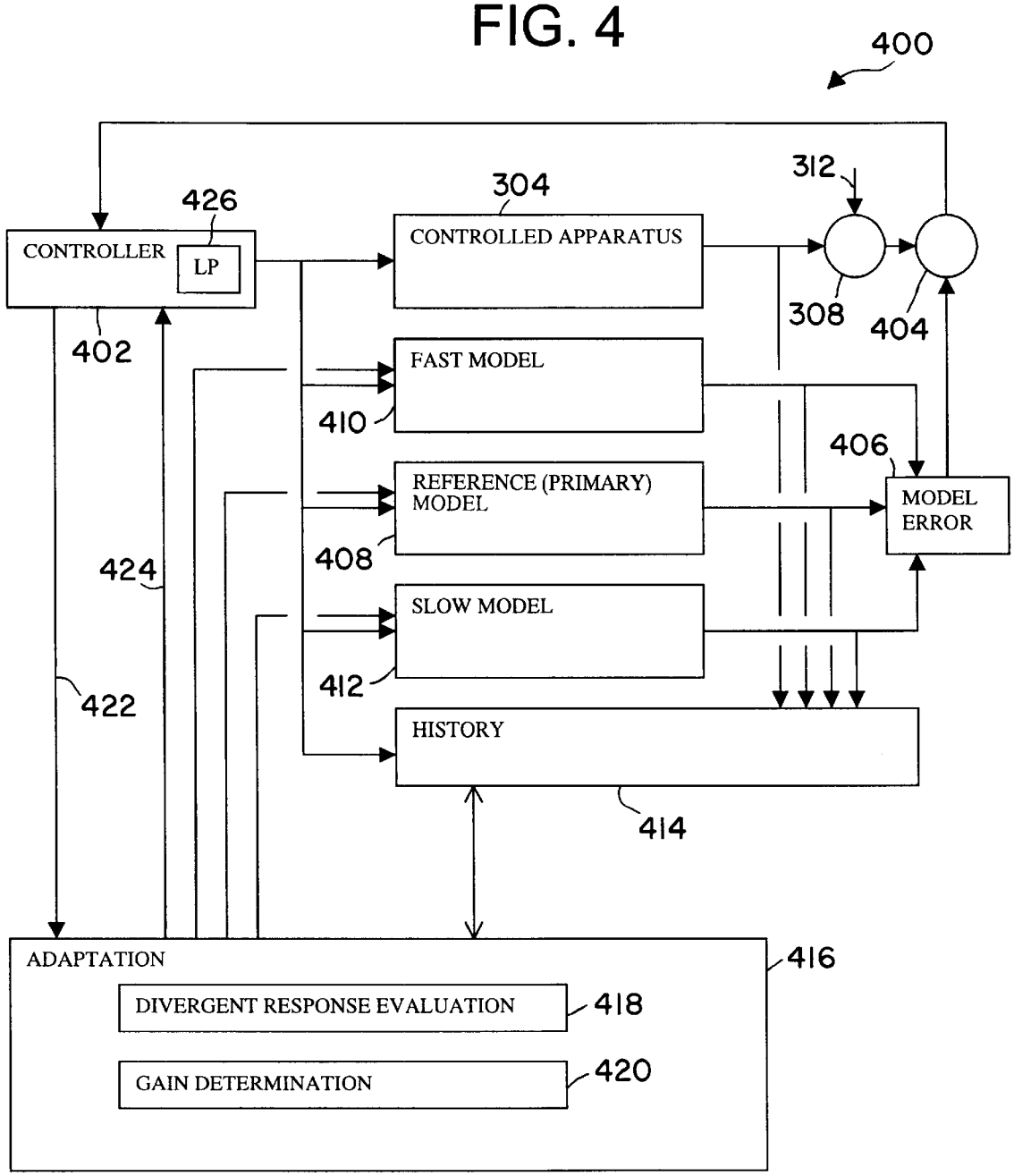
FIG. 4 demonstrates a multi-variable control system block diagram.
Figure 17A:
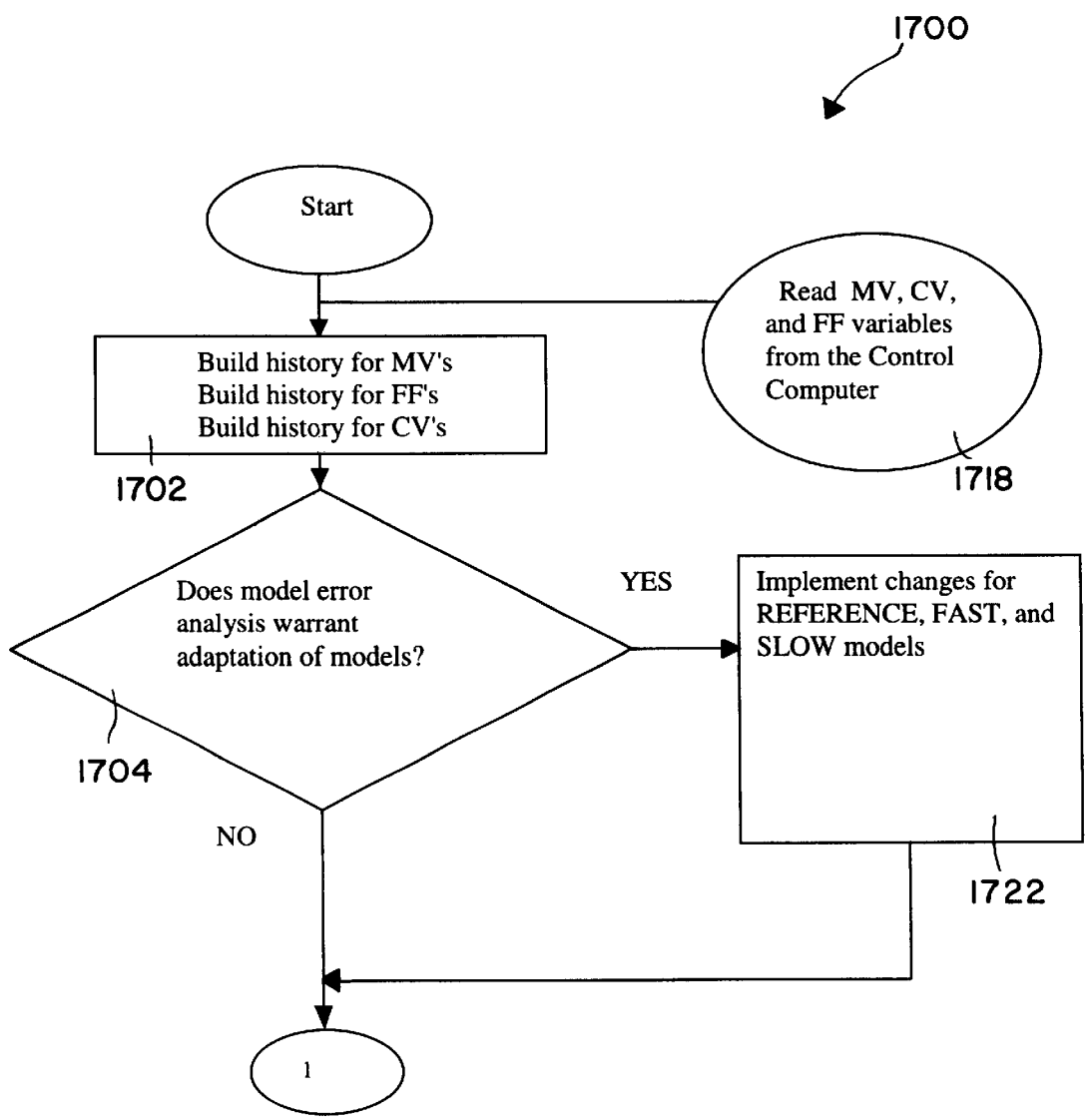
FIGS. 17A and 17B presents controller operation detail.
Figure 17B:
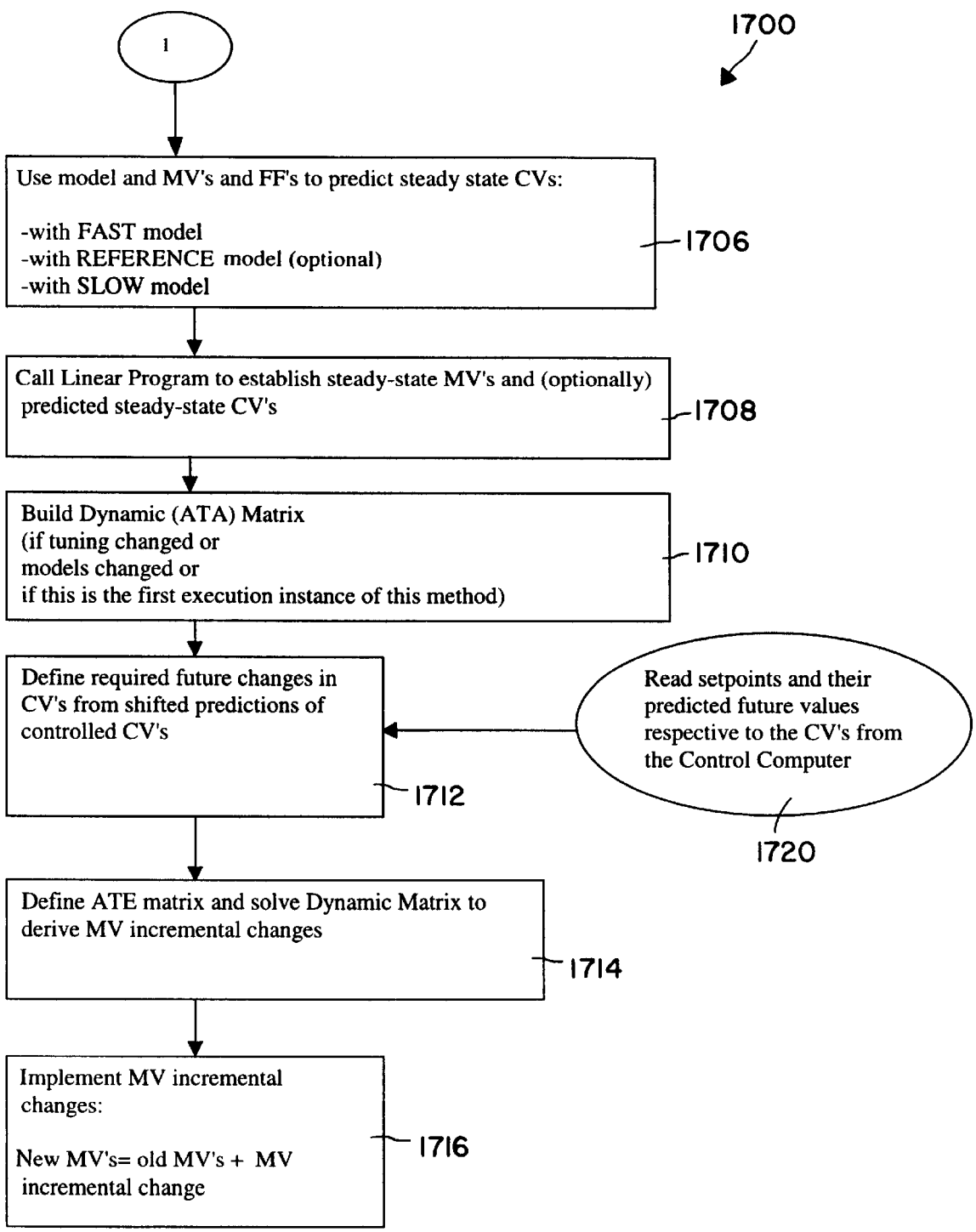
Figure 18A:
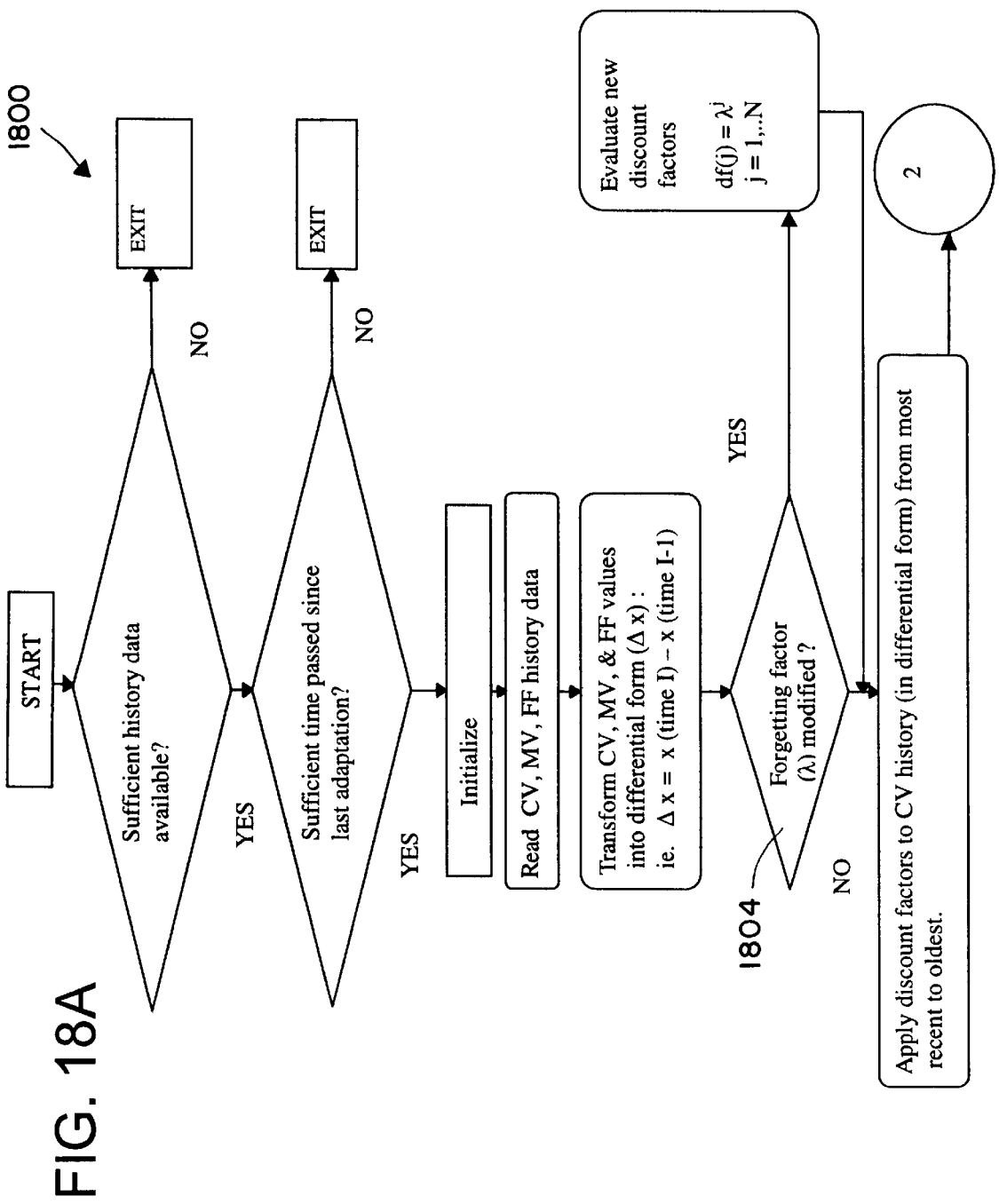
FIGS. 18A–18E exhibits adaptation methodology detail.
Figure 18B:
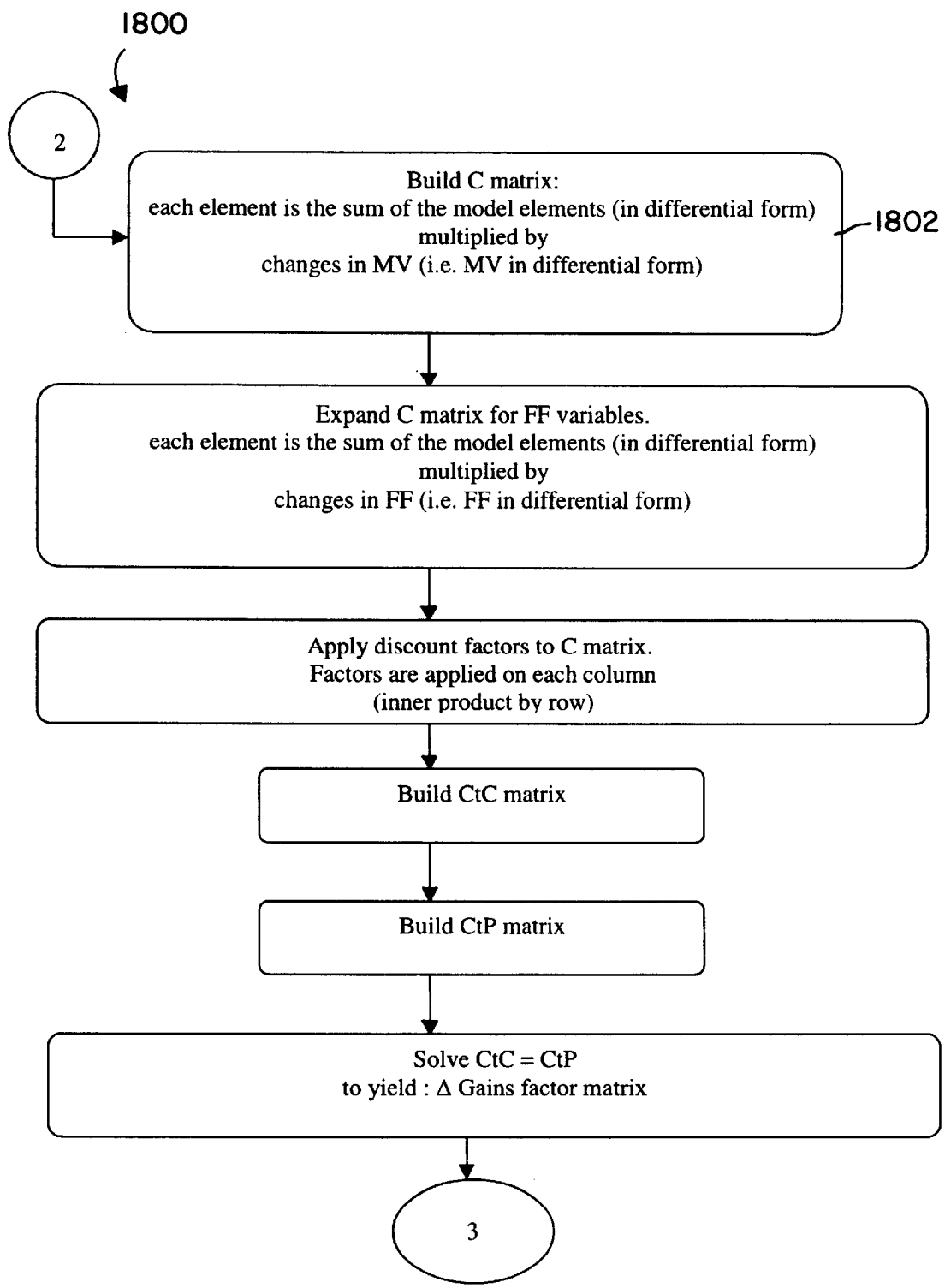
Figure 18C:
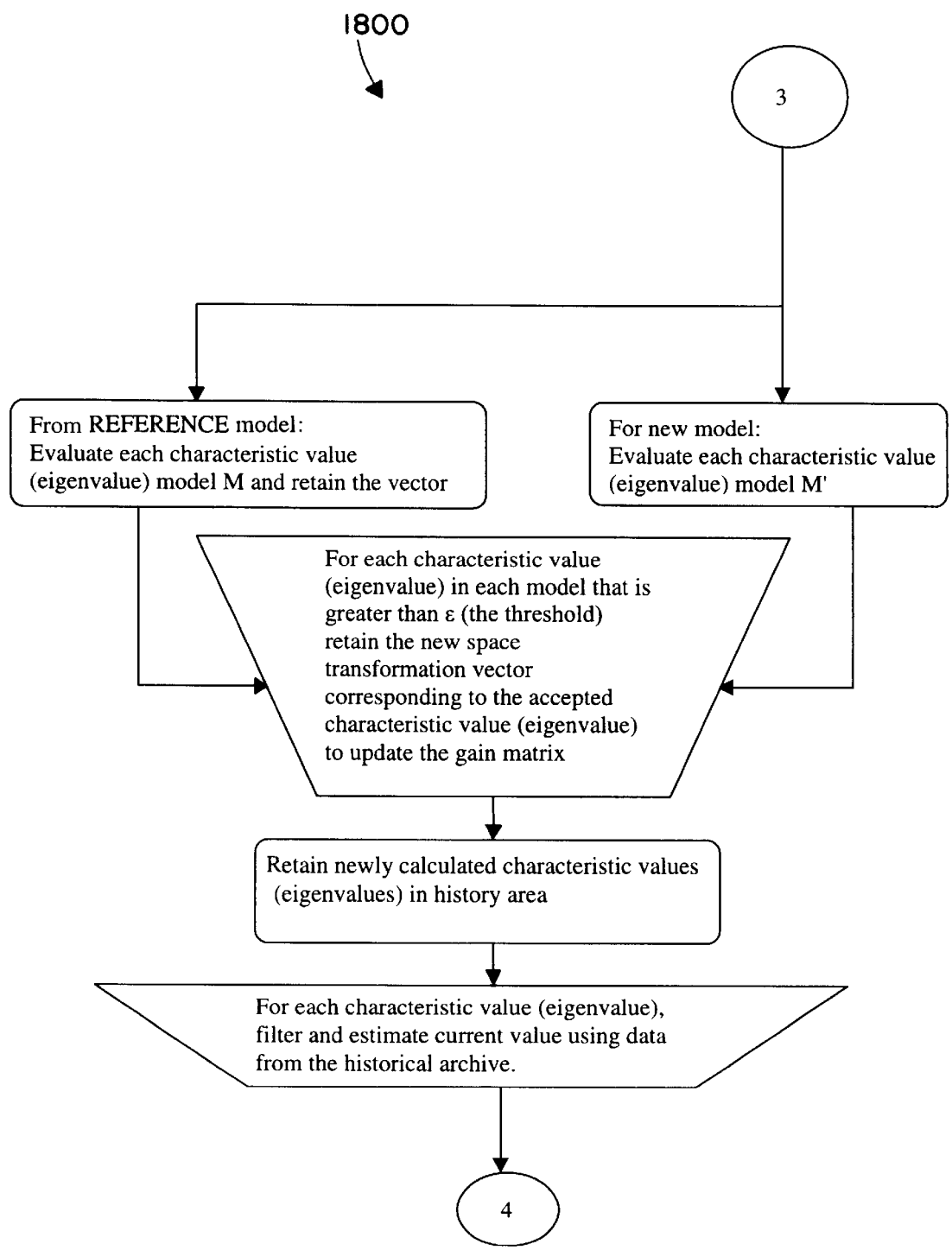
Figure 18D:
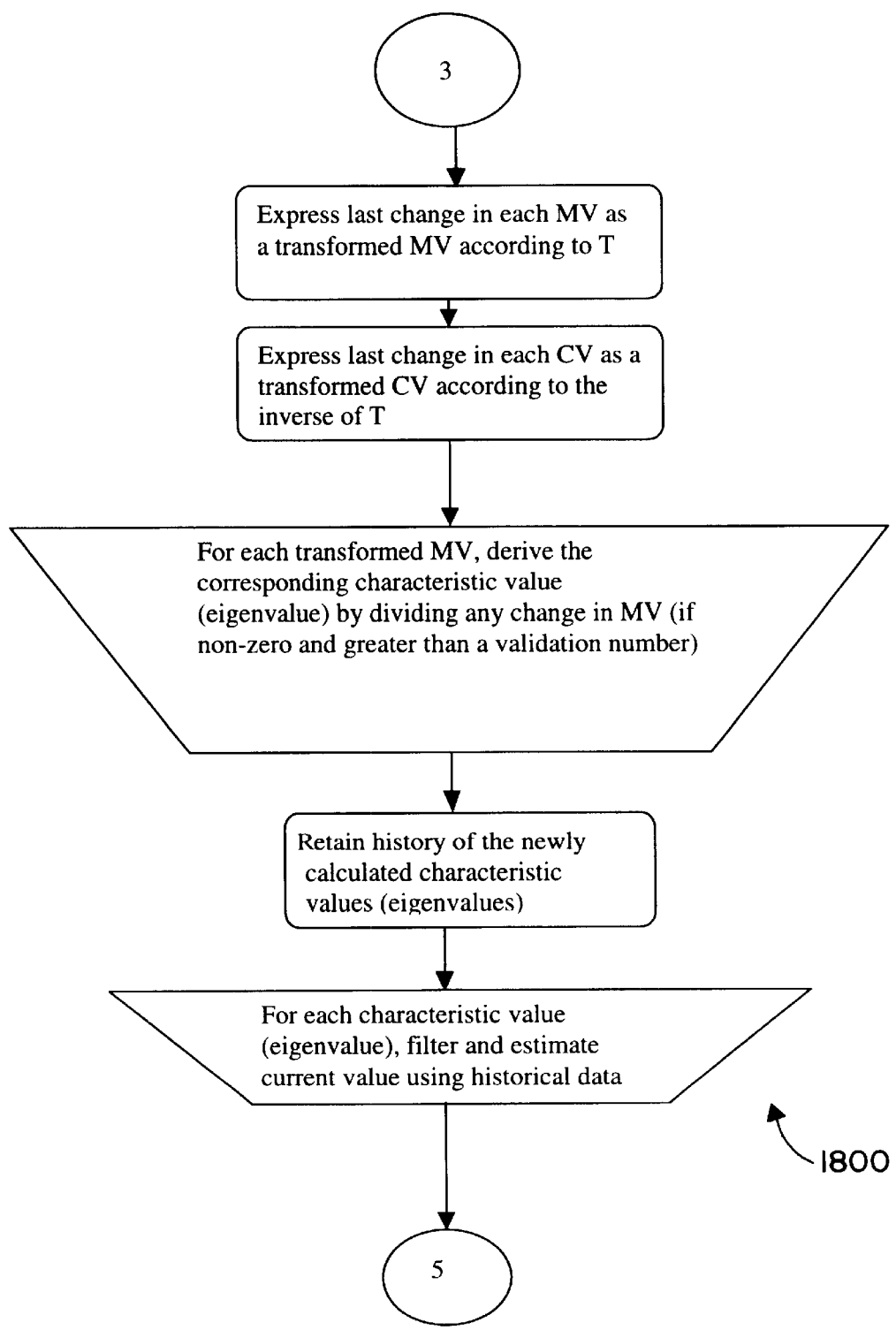
Figure 18E:
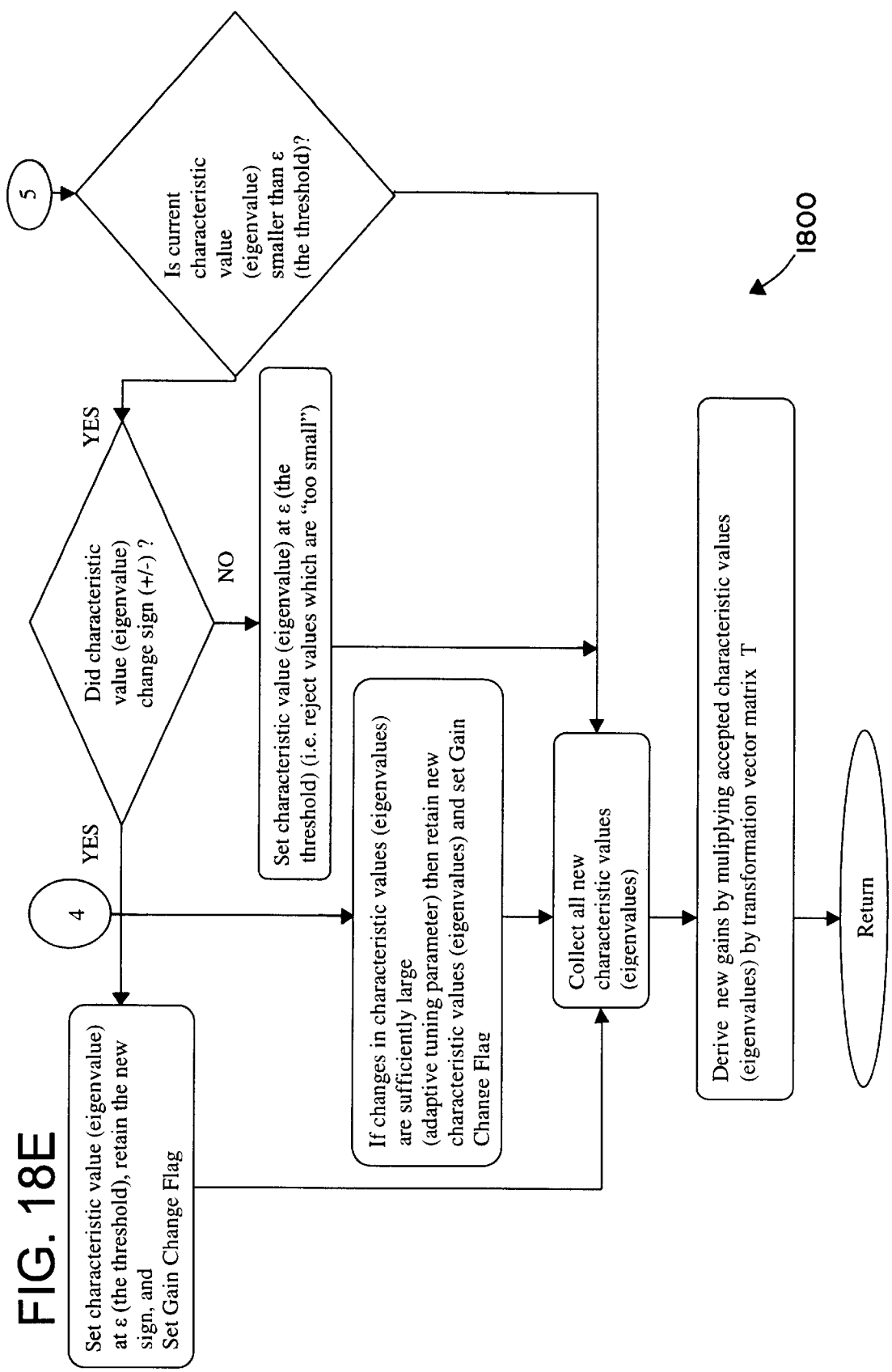

In FIG. 4, Multi-Variable Controller Control System Block Diagram 400 shows a control system diagram for a controller scheme incorporating a model scheme according to the preferred embodiments. Controller 402 is closely affiliated with Controller 302 respective to abstracted functionality in Multi-Variable Controller Control System Block Diagram 400. Controller 402 incorporates Linear Program 426. Controlled Apparatus 304, Disturbance/CV Summing Point 308, and Disturbance 312 are reprised from Controlled Apparatus 304. Further detail in Controller 402 is described in Controller Operation 1700 of FIG. 17. Process Disturbance Value Summing Point 404 is a summing point for Modeling Error Calculation Block 406 output and Disturbance/CV Summing Point 308 output. Output from Process Disturbance Value Summing Point 404 is input to Controller 402. Modeling Error Calculation Block 406 determines the degree of error in model-determination of a Controlled Variable respective to the separate model-determination instances of the Controlled Variable through use of Fast Model 410, Reference Model 408, and Slow Model 412. Reference Model 408 is abstractly equivalent to Model 306 except that the model of Reference Model 408 can be modified in use via input from Adaptation Block 416. Models of Fast Model 410 and Slow Model 412 are determined from the model of Reference Model 408 as further described in Time-Dependent Non-Integrating Characterization 500, Multiple Non-Integrating Model Characterization 600, Non-Integrating Model Inertial Characteristics 700, Time-Dependent Integrating Functional Characterization 800, Multiple Integrating Model Characterization 900, and Integrating Model Inertial Characteristics 1000 of FIGS. 5–10 and in Model Construction Step 1200, Dead-Time Time-Axis Attribute Determination 1300, Steady-State Time-Axis Attribute Determination 1400, Ramp Portion Determination Detail 1500, and Curvalinear Portion Determination Detail 1600 of FIGS. 12–16.

History Block 414 shows Archival Logic 222 in Multi-Variable Controller Control System Block Diagram 400. History Block 414 is in data read communication with (a) Controlled Variables sent to Controlled Apparatus 304, (b) Manipulated Variables from Controller 402, and (c) output-model-determined values of the Controlled Variable from Fast Model 410, Reference Model 408, and Slow Model 412; data received from these control block elements is archived for use by Adaptation Block 416 in adapting Fast Model 410, Reference Model 408, Slow Model 412 and Controller 402 as needed. Adaptation Block 416 is in bilateral data communication with History Block 414 to use the archived values in adapting Fast Model 410, Reference Model 408, Slow Model 412, and Controller 402 as needed. Divergent Response Routine 418 is a logical portion of Adaptation Block 416 for determining control gains for use in Controller 402, Reference Model 408, Fast Model 410, and Slow Model 412. Gain Determination Routine 420 is a logical portion of Adaptation Block 416 for determining if candidate modification data for use in Controller 402, Reference Model 408, Fast Model 410, and Slow Model 412 would configure the system according to Multi-Variable Controller Control System Block Diagram 400 to provide undesirable divergent control of Operated Apparatus 102. Adaptation Block 416 inputs adaptive information to Fast Model 410, Reference Model 408, Slow Model 412, and Controller 402. In one embodiment, Controller-Adapter Data Path 422 facilitates operation of Adaptation Block 416 logic under the direction of Controller 402, and Adaptation Block 416 provides inputs via Adapter-Controller Data Path 424. In an alternative embodiment, Adaptation Block 416 operates in parallel with Controller 402 without benefit of Controller 402 direction via Controller-Adapter Data Path 422 and provides input to Controller 402 via Adapter-Controller Data Path 424.

Turning now to FIG. 5, Time-Dependent Non-Integrating Characterization 500 is useful in understanding the preferred embodiment modeling approach and shows a depiction of a traditional non-integrating response model (a Primary Model) of a Controlled Variable change respective to a unit step change in a respective Manipulated Variable such as used in defining Model 306. Time-Dependent Non-Integrating Characterization 500 is also the depiction of the response model used in defining Reference Model 408. The Set Of Discrete Intervals Of Time 502 are shown on Time Axis 506 with each Discrete Interval Of Time 504 being of identical time duration.

An axis for Controlled Variable Magnitude 508 is depicted in orthogonal intersection to Time Axis 506 and shows Zero-Time Time-Axis Attribute 512, at the moment (time axis zero value) of a unit step change in the respective Manipulated Variable. The function between Zero-Time Time-Axis Attribute 512 and Primary Model Dead-Time Time-Axis Attribute 516 (Axis 506 locator reference C in FIGS. 5–10) is usually termed "Dead Time" in the response model. The model initiates response according to Primary Model Curvilinear Portion 522 at Primary Model Dead-Time Time-Axis Attribute 516 (Axis 506 locator reference C) which continues in time until Primary Model Steady-State Time-Axis Attribute 520 (Axis 506 locator reference F in FIGS. 5–8). From Primary Model Steady-State Time-Axis Attribute 520 to Maximum-Time Time-Axis Attribute 514 (Axis 506 locator reference B in FIGS. 5–10), the Model shows constant response in Primary Model Homaloidal Portion 510 after achieving the modification in the Controlled Variable according to Response Gain Attribute 518.

Figure 6:
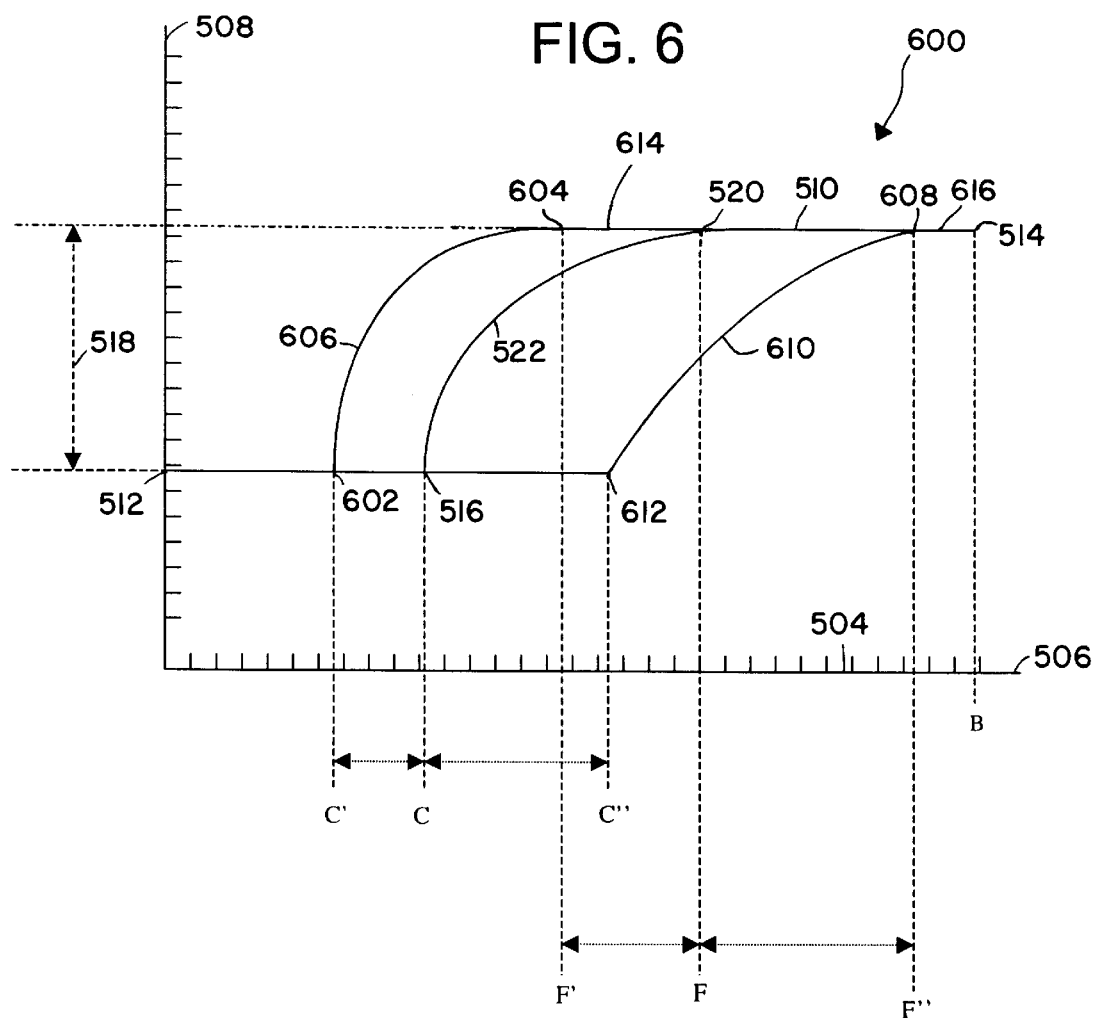
FIG. 6 presents a multiple-model non-integrating-model characterization.

Turning now to FIG. 6, Multiple Non-Integrating Model Characterization 600 reprises Discrete Intervals Of Time 504, Time Axis 506, Controlled Variable Magnitude 508, Primary Model Homaloidal Portion 510, Zero-Time Time-Axis Attribute 512, Maximum-Time Time-Axis Attribute 514 (Axis 506 locator reference B), Primary Model Dead-Time Time-Axis Attribute 516 (Axis 506 locator reference C), Response Gain Attribute 518, Primary Model Steady-State Time-Axis Attribute 520 (Axis 506 locator reference F), and Primary Model Curvilinear Portion 522 and then shows a Fast (FAST) Model according to a function defined by Zero-Time Time-Axis Attribute 512 to Fast Model Dead-Time Time-Axis Attribute 602 (Axis 506 locator reference C') to Fast Model Steady-State Time-Axis Attribute 604 (Axis 506 locator reference F') to Maximum-Time Time-Axis Attribute 514 (Axis 506 locator reference B) having Fast Model Curvilinear Portion 606 (disposed between Fast Model Dead-Time Time-Axis Attribute 602 and Fast Model Steady-State Time-Axis Attribute 604) and Fast Model Homaloidal Portion 614 (disposed between Fast Model Steady-State Time-Axis Attribute 604 and Maximum-Time Time-Axis Attribute 514). A Slow SLOW) Model is also shown according to a function defined by Zero-Time Time-Axis Attribute 512 to Slow Model Dead-Time Time-Axis Attribute 612 (Axis 506 locator reference C") to Slow Model Steady-State Time-Axis Attribute 608 (Axis 506 locator reference F") to Maximum-Time Time-Axis Attribute 514 having Slow Model Curvilinear Portion 610 (disposed between Slow Model Dead-Time Time-Axis Attribute 612 and Slow Model Steady-State Time-Axis Attribute 608) and Slow Model Homaloidal Portion 616 (disposed between Slow Model Steady-State Time-Axis Attribute 608 and Maximum-Time Time-Axis Attribute 514). The Slow (SLOW) Model and the Fast (FAST) Model are both derived from the Primary (REFERENCE) Model according to Time-Dependent Non-Integrating Characterization 500.

Figure 7:
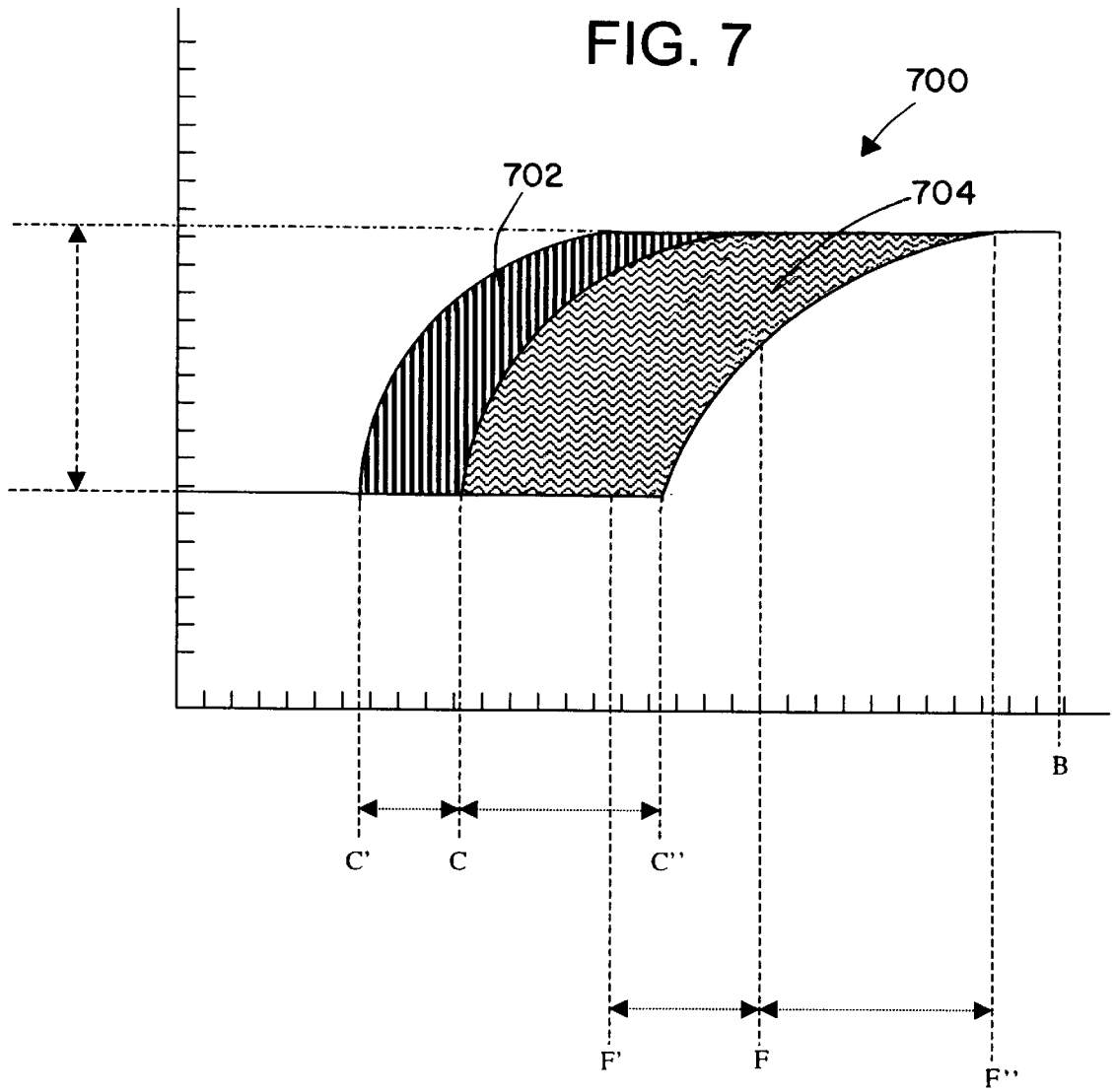
FIG. 7 shows non-integrating-model set inertial characteristics.

Continuing with attention now to FIG. 7, Non-Integrating Model Inertial Characteristics 700 shows Multiple Non-Integrating Model Characterization 600 with further identification of Fast Dynamic Response Inertial Characteristic 702 between the Fast Model and the Primary Model and of Slow Dynamic Response Inertial Characteristic 704 between the Primary Model and the Slow Model.

Figure 8:
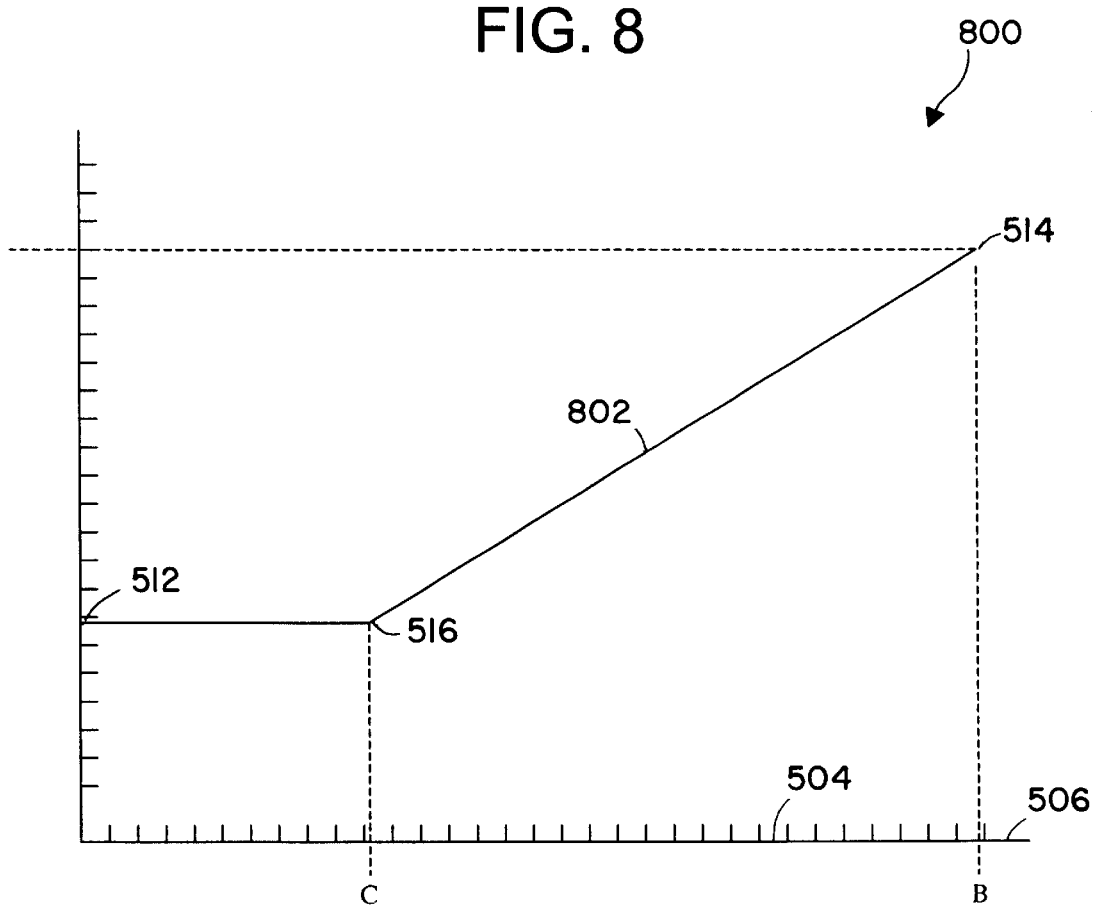
FIG. 8 exhibits a time-dependent integrating-model functional characterization.

Turning now to FIG. 8, a Primary (REFERENCE) Model according to Time-Dependent Integrating Functional Characterization 800 shows a depiction of a traditional integrating response model (a Primary Model) of a Controlled Variable change respective to a unit step change in a respective Manipulated Variable such as used in defining Model 306. Time Axis 506, Discrete Interval Of Time 504, Zero-Time Time-Axis Attribute 512, Maximum-Time Time-Axis Attribute 514 (along with respective Time Axis 506 reference locator B), and Primary Model Dead-Time Time-Axis Attribute 516 (along with respective Time Axis 506 reference locator C) are reprised to show dimensional alignment with the reference-frame of Time-Dependent Non-Integrating Characterization 500. Primary Model Ramped Portion 802 differentiates the Primary Model from that depicted in Time-Dependent Non-Integrating Characterization 500 and has an attribute of a Ramp Rate as the slope of the response as a function of time.

Figure 9:
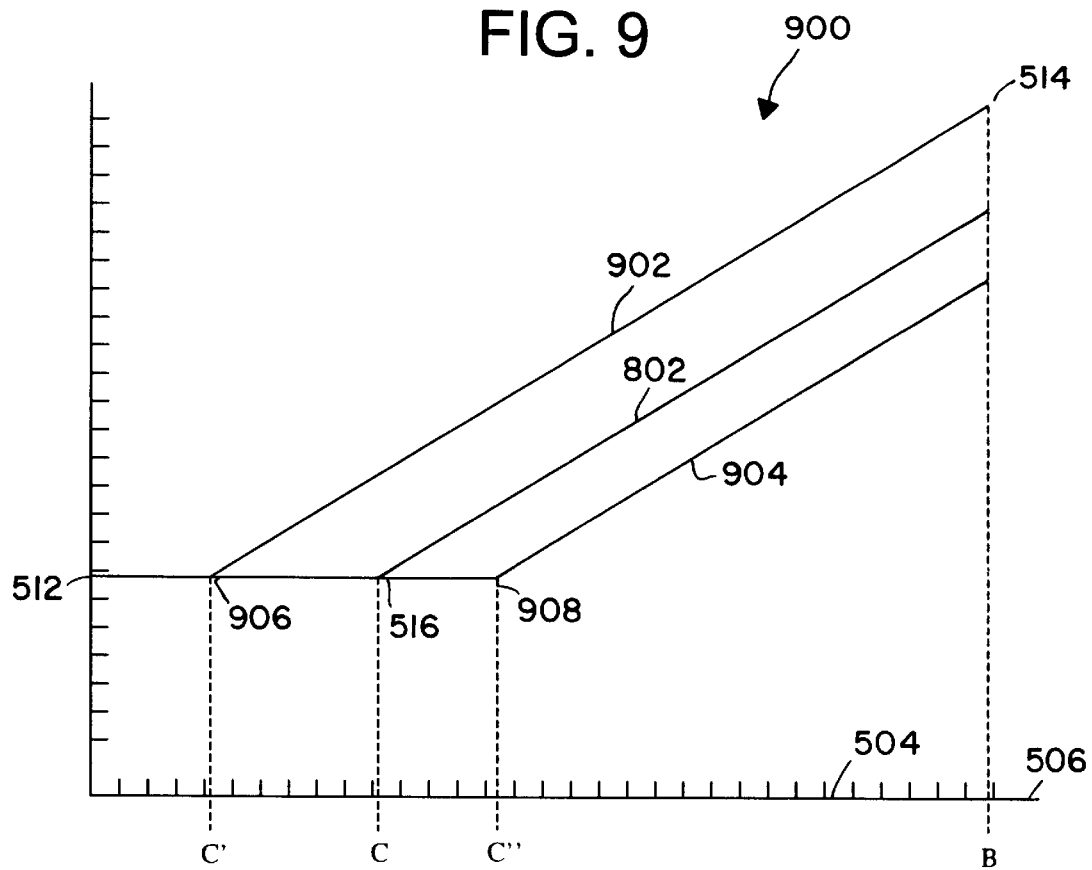
FIG. 9 demonstrates a multiple-model integrating-model characterization.

In FIG. 9, Multiple Integrating Model Characterization 900 shows the integrating response model equivalents of a Fast (FAST) Model in the function defined by points Zero-Time Time-Axis Attribute 512, Fast Model Dead-Time Time-Axis Attribute 906 (Time Axis 506 reference locator C'), and Maximum-Time Time-Axis Attribute 514 and a Slow (SLOW) Model in the function defined by Zero-Time Time-Axis Attribute 512, Slow Model Dead-Time Time-Axis Attribute 908 (Time Axis 506 reference locator C"), and Maximum-Time Time-Axis Attribute 514 (note that Maximum-Time Time-Axis Attribute 514 is a singularity "point" respective to point B in all models Time-Dependent Non-Integrating Characterization 500, Multiple Non-Integrating Model Characterization 600, Non-Integrating Model Inertial Characteristics 700, Time-Dependent Integrating Functional Characterization 800, Multiple Integrating Model Characterization 900, and Integrating Model Inertial Characteristics 1000). Primary Model Ramped Portion 802 is reprised from the Primary Model along with reference points Discrete Interval Of Time 504, Time Axis 506, Zero-Time Time-Axis Attribute 512, Maximum-Time Time-Axis Attribute 514, and Primary Model Dead-Time Time-Axis Attribute 516 (Time Axis 506 reference locator C). The Fast Model has Fast Model Ramped Portion 902 defined by the functional portion connected to Fast Model Dead-Time Time-Axis Attribute 906 and Maximum-Time Time-Axis Attribute 514. The Slow Model has Slow Model Ramped Portion 904 defined by the functional portion connected to Slow Model Dead-Time Time-Axis Attribute 908 and (at the singularity point denoted by Time Axis 506 reference locator B) Maximum-Time Time-Axis Attribute 514.

Figure 10:
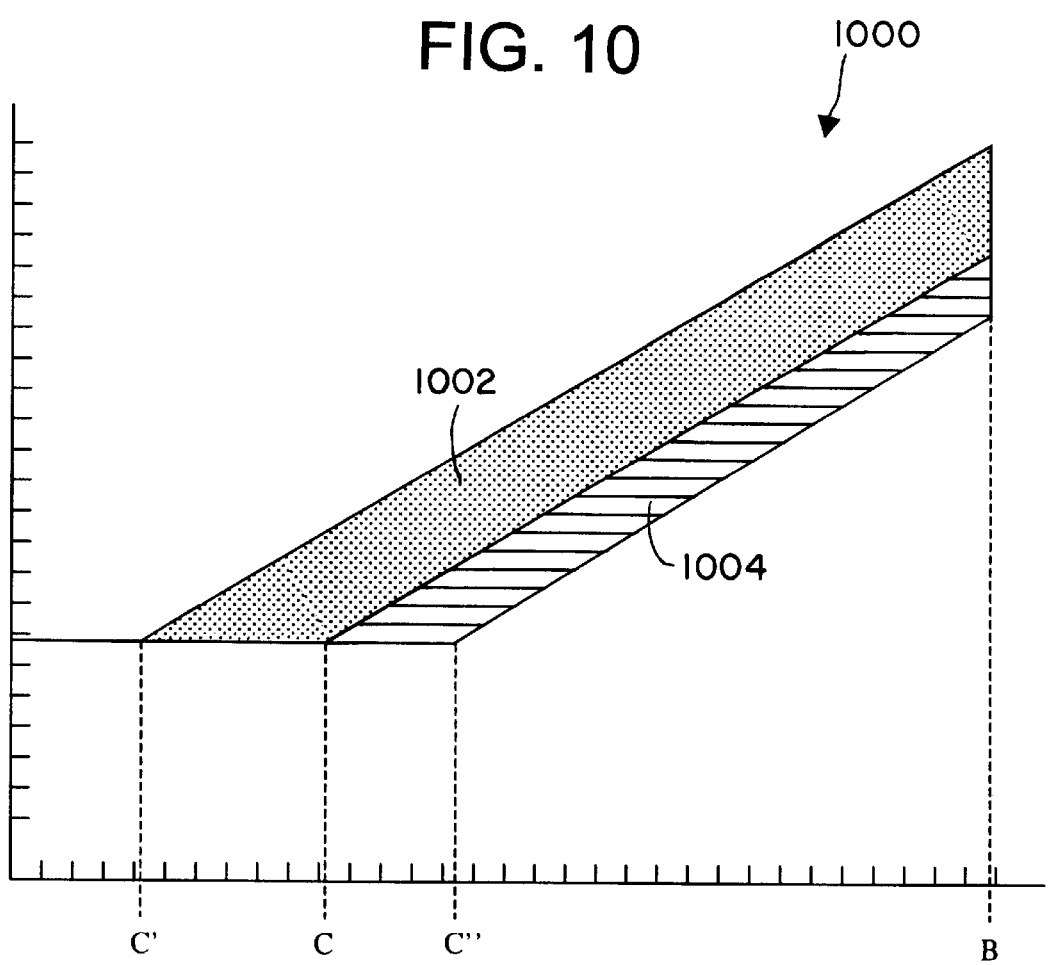
FIG. 10 presents integrating-model set inertial characteristics.

Turning now to FIG. 10, Integrating Model Inertial Characteristics 1000 shows Multiple Integrating Model Characterization 900 with further identification of Fast Dynamic Response Inertial Characteristic 1002 between the Fast (FAST) Model and the Primary (REFERENCE) Model and of Slow Dynamic Response Inertial Characteristic 1004 between the Primary (REFERENCE) Model and the Slow (SLOW) Model.

Figure 11:
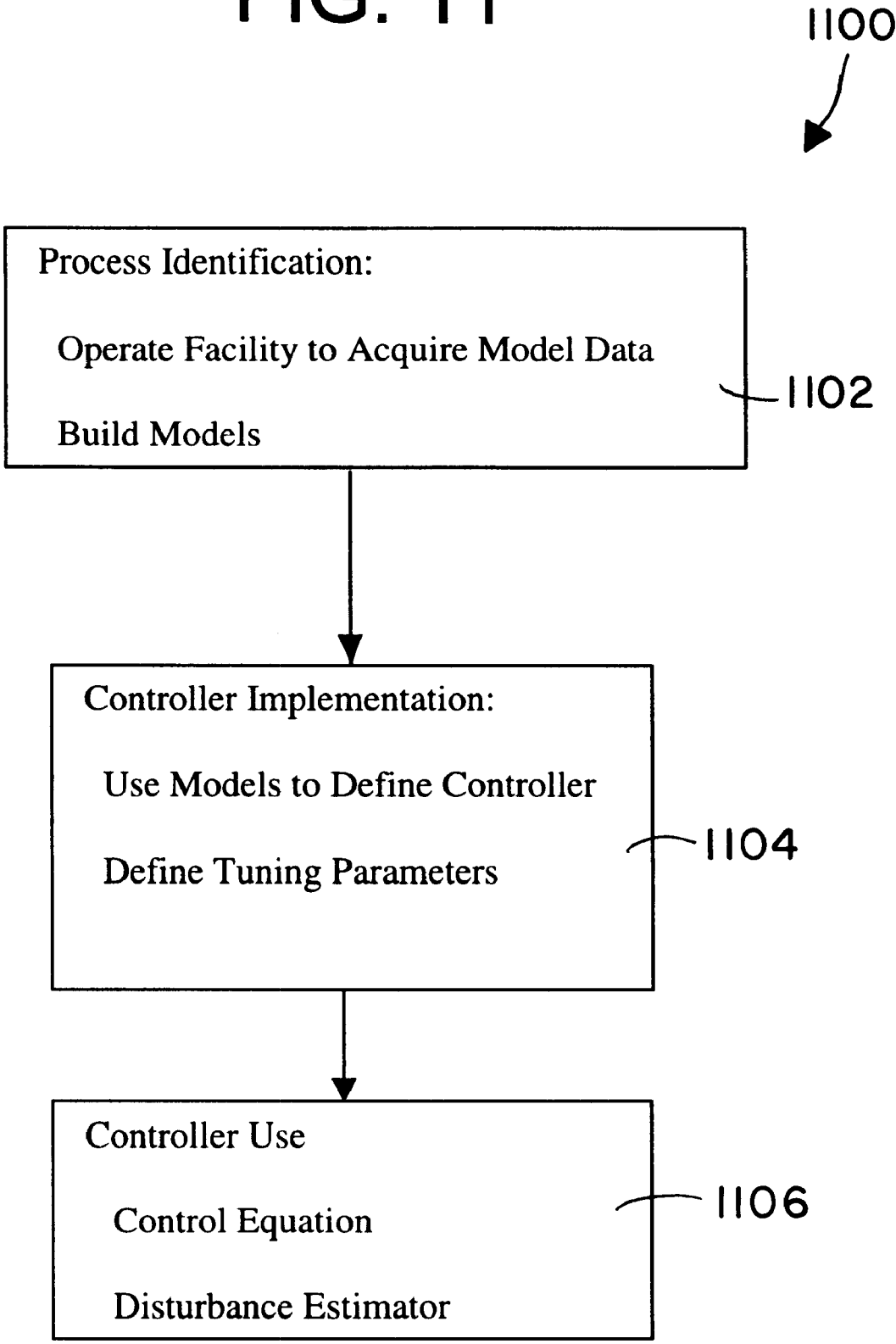
FIG. 11 shows multi-variable control general actions in deploying a multi-model system.

Continuing with attention now to FIG. 11, a consideration of details in methods respective to the preferred embodiments, Multi-Variable Controller General Deployment Actions 1100 presents a broad overview of steps in using the Model Variable Controller. In Model Configuration Step 1102, Operated Apparatus 102 is operated and data is acquired to build the Primary Model and the Primary Model is constructed for use in Reference Model 408. A DMC (Dynamic Matrix Controller) model is characteristic of the initial Primary Model. The Fast and Slow Models of Fast Model 410 and Slow Model 412 (and Multiple Non-Integrating Model Characterization 600, Non-Integrating Model Inertial Characteristics 700, Multiple Integrating Model Characterization 900, and Integrating Model Inertial Characteristics 1000) are also built according to further detail of Model Construction Step 1200, Dead-Time Time-Axis Attribute Determination 1300, Steady-State Time-Axis Attribute Determination 1400, Ramp Portion Determination Detail 1500, and Curvalinear Portion Determination Detail 1600 of FIGS. 12–16. The Primary Model is also inverted to provide the response of Controller 402. In Initial Tuning Step 1104, Multi-Variable Controller Control System Block Diagram 400 is further configured as a control engineer defines tuning parameters. In Operational Step 1106, Multi-Variable Controller Control System Block Diagram 400 is used to control Operated Apparatus 102 according to Controller Operation 1700 of FIGS. 17A and 17B; in executing this step, disturbance estimation operates within the logic of MV Determination Logic 206 to establish, from the set of models, an estimated modeling error value in interaction of one Controlled Variable with all the Manipulated Variables. An estimated process disturbance value from the Controlled Variable magnitude and the estimated modeling error value is also calculated. The estimated model error value and the estimated process disturbance error value are then used to determine the need for further adaptation of either tuning data or model data.

In providing a discussion of the methods used in the described embodiments, FIGS. 12 to 20 present useful sets of key virtual steps showing ordered progressions within the general motif of a flowchart; as should be apparent however, especially in view of certain parallel and alternative paths which are presented without protocol for branching, these flowcharts are not meant to rigorously depict a design level template for computer logic coding. A conversion from the methods and processes depicted in the figures to a coding flowsheet and thence to executable code should be apparent and straightforward given the figures and discussion.

Figure 12:
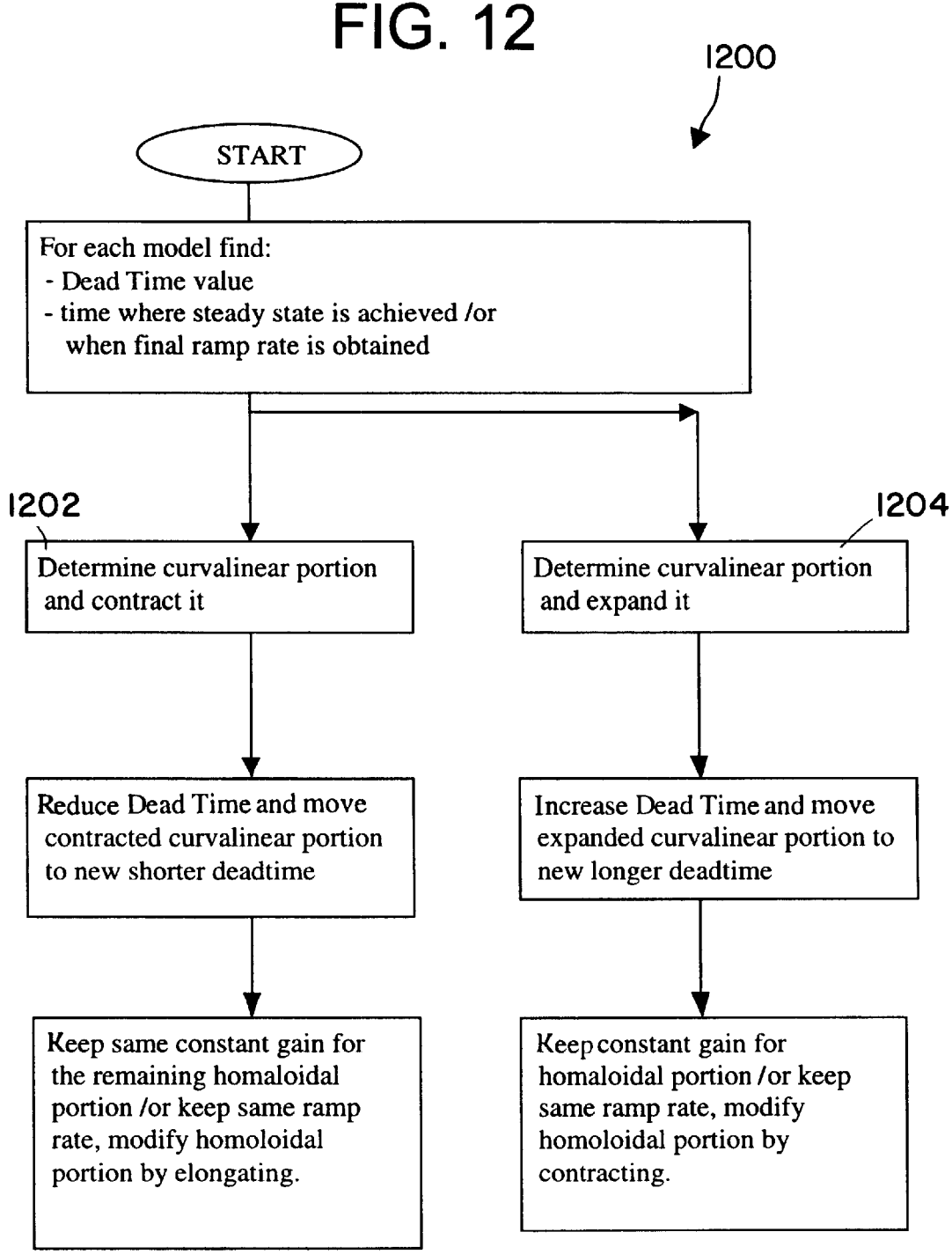
FIG. 12 presents model construction steps.

Turning now to FIG. 12, Model Construction Step 1200 shows a first level of Model Configuration Step 1102 detail in the modification of each Primary Model to a respective Fast Model and to a respective Slow Model. Fast Model Curvalinear Portion Modification Step 1202 initiates the path for Fast Model Curvilinear Portion 606 definition; and Slow Model Curvalinear Portion Modification Step 1204 initiates the path for Slow Model Curvilinear Portion 610 definition.

Figure 13:
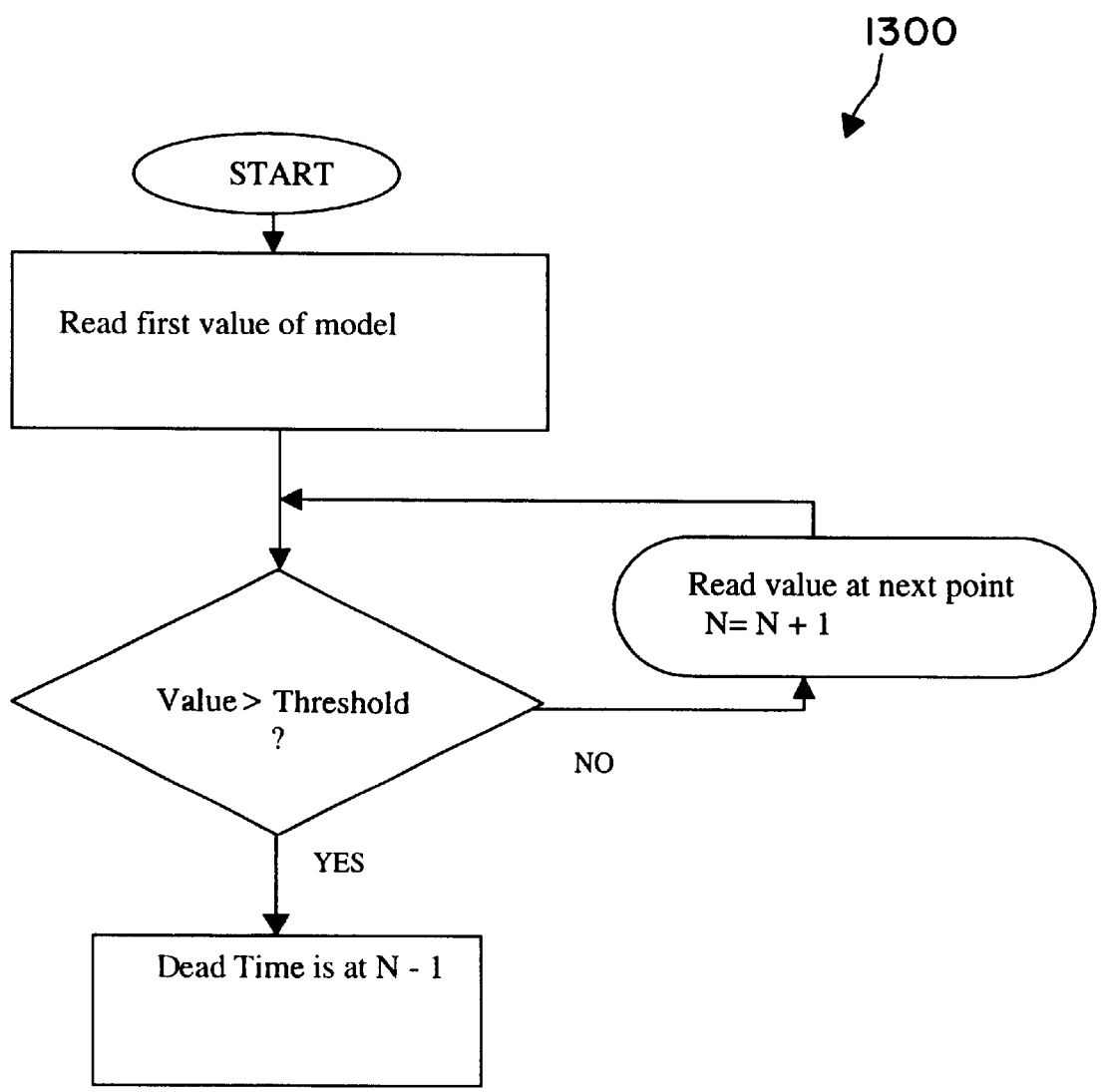
FIG. 13 exhibits dead-time time-axis attribute determination in a model.

FIGS. 13–16 show further details in specific considerations of the models and the overview depiction of Model Construction Step 1200. Dead-Time Time-Axis Attribute Determination 1300 of FIG. 13 shows detail in Primary Model Dead-Time Time-Axis Attribute 516 definition.

Figure 14:
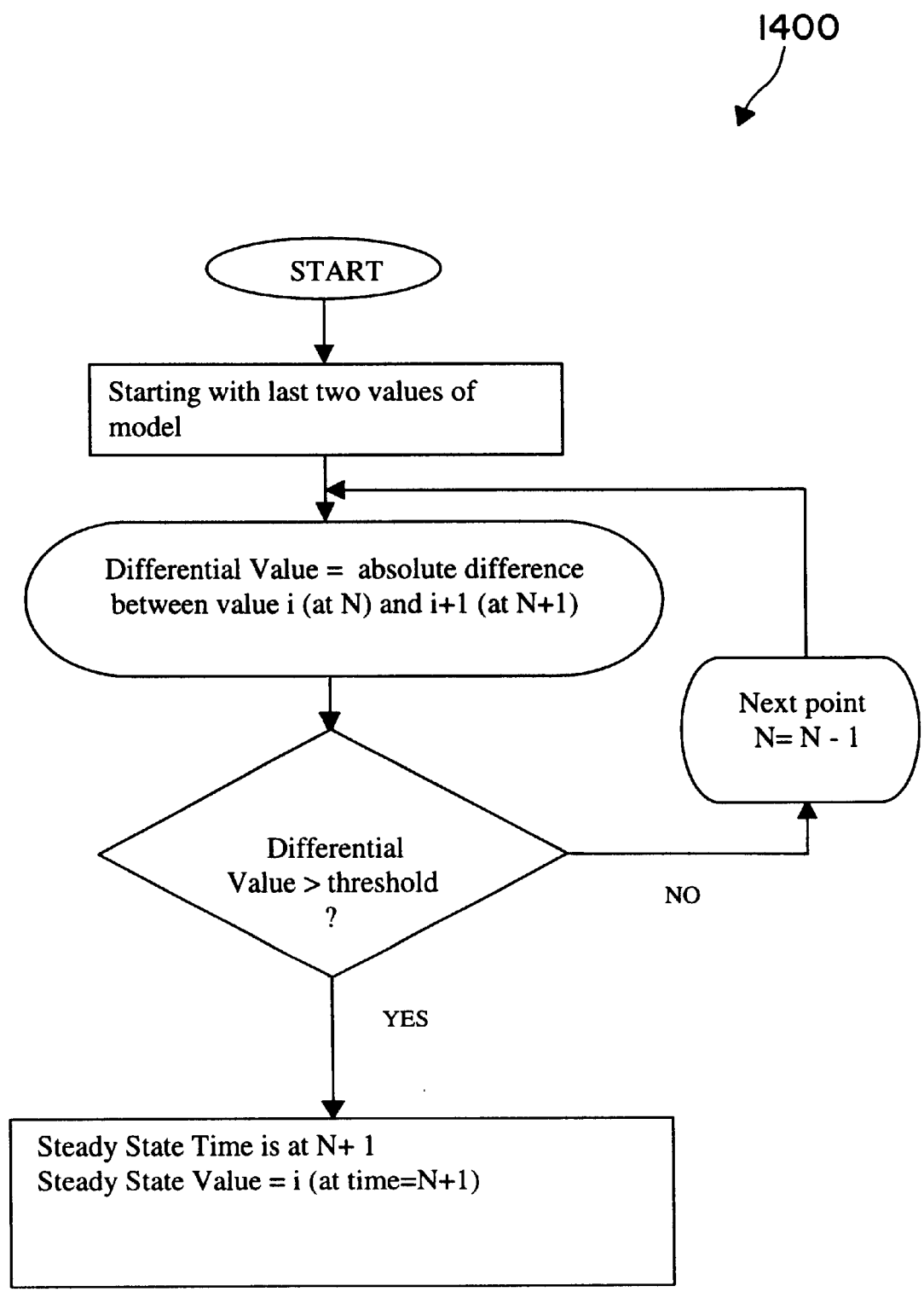
FIG. 14 demonstrates Steady-state time-axis attribute determination in a model.
Figure 15:
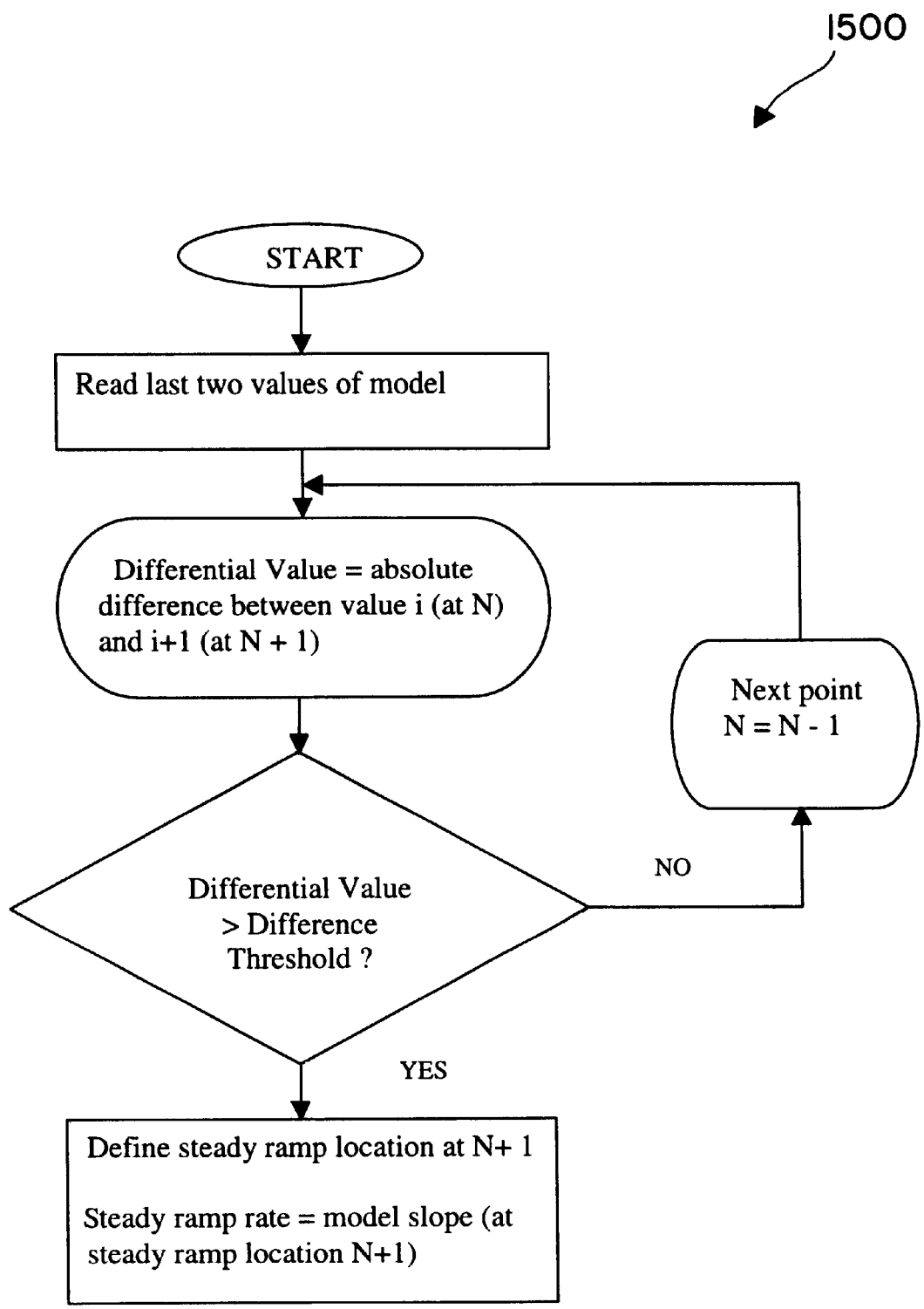
FIG. 15 shows ramp-portion determination detail in a model.

Steady-State Time-Axis Attribute Determination 1400 of FIG. 14 shows detail in Primary Model Steady-State Time-Axis Attribute 520 definition. Ramp Portion Determination Detail 1500 of FIG. 15 shows detail in Primary Model Dead-Time Time-Axis Attribute 516 and Primary Model Ramped Portion 802 attribute determination in Time-Dependent Integrating Functional Characterization 800 and Multiple Integrating Model Characterization 900. Curvalinear Portion Determination Detail 1600 of FIG. 16 shows detail in Fast Model Curvilinear Portion 606 and Slow Model Curvilinear Portion 610 determination from Primary Model Curvilinear Portion 522.

Turning now to FIG. 17, Controller Operation 1700 shows the operational process of MV Determination Logic 206 and Controller 402. In History Update Step 1702, data for existing MV, FF, and CV variables is transmitted to History Block 414 for archival and use in Adaptation Block 416. The history is built for N input (CV) variables, L feed-forward (FF) variables, and M output (MV) variables. In Adaptation Decision Step 1704, an estimated process disturbance value (from the Controlled Variable magnitude) and the estimated modeling error value are calculated. The estimated model error value and the estimated process disturbance error value are then used to determine the need for further adaptation of either tuning data or model data. Details in Model Adaptation Step 1722 (given a YES answer from Adaptation Decision Step 1704) are discussed in Adaptation Methodology Detail 1800 of FIGS. 18A–18E. In CV Prediction Step 1706, the Primary (Reference), Slow, and Fast Models are used to predict steady-state Controlled Variable values. The predictions are done for N input (CV) variables, L feed-forward (FF) variables, and M output (MV) variables. Further detail in this is shown in Future CV Requirement Definition Detail 1900 of FIG. 19. In Steady-State MV Definition Step 1708, Linear Program 426 is called to define steady-state Manipulated Variable values. These values are defined for N input (CV) variables and M output (MV) variables. In Dynamic Matrix Build Step 1710, the Dynamic (ATA) Matrix is rebuilt if tuning is to be changed, if the models are to be changed, or if this is the first execution instance of the process of Controller 402. The ATA Matrix has a dimension of M×M, where M=N (CV variables) multiplied by the number of future MV moves for each MV. In Future CV Requirement Definition Step 1712, necessary future shifts in Controlled Variable values are determined from setpoints and other predicted future values as acquired from the database of Control Computer Logic 120 in CV Data Acquisition Step 1720. Further detail in Future CV Requirement Definition Step 1712 is shown in CV Prediction Detail 2000 of FIG. 20. The shifts are determined for M output variables. In MV Change Definition Step 1714, the ATE matrix and Dynamic Matrix are solved to define incremental changes in Manipulated Variables. In MV Implementation Step 1716, the incremental Manipulated Variable changes are implemented and the process returns to Data Acquisition Step 1718; this affects each of N input variables. In Data Acquisition Step 1718, MV, CV, and FF variables are read from Control Computer Logic 120 (via Communication Interface 106). In CV Data Acquisition Step 1720, setpoints and other predicted future values are acquired from the database of Control Computer Logic 120 along with necessary future shifts in Controlled Variable values.

In FIG. 18, Adaptation Methodology Detail 1800 shows specifics in Model Adaptation Step 1722 (given a YES answer from Adaptation Decision Step 1704). In Forgetting Factor Modification Decision 1804, the "forgetting factor" is applied to the most senescent data in Archival Logic 222 via use in determining individual discount factors. In C Matrix Build Step 1802 and other steps of Adaptation Methodology Detail 1800, "differential form" is sometimes also termed "difference form". The C Matrix is dimensioned as M×N where N is the number of MV and FF variables and M is the number of increments in time horizon used.

Figure 19:
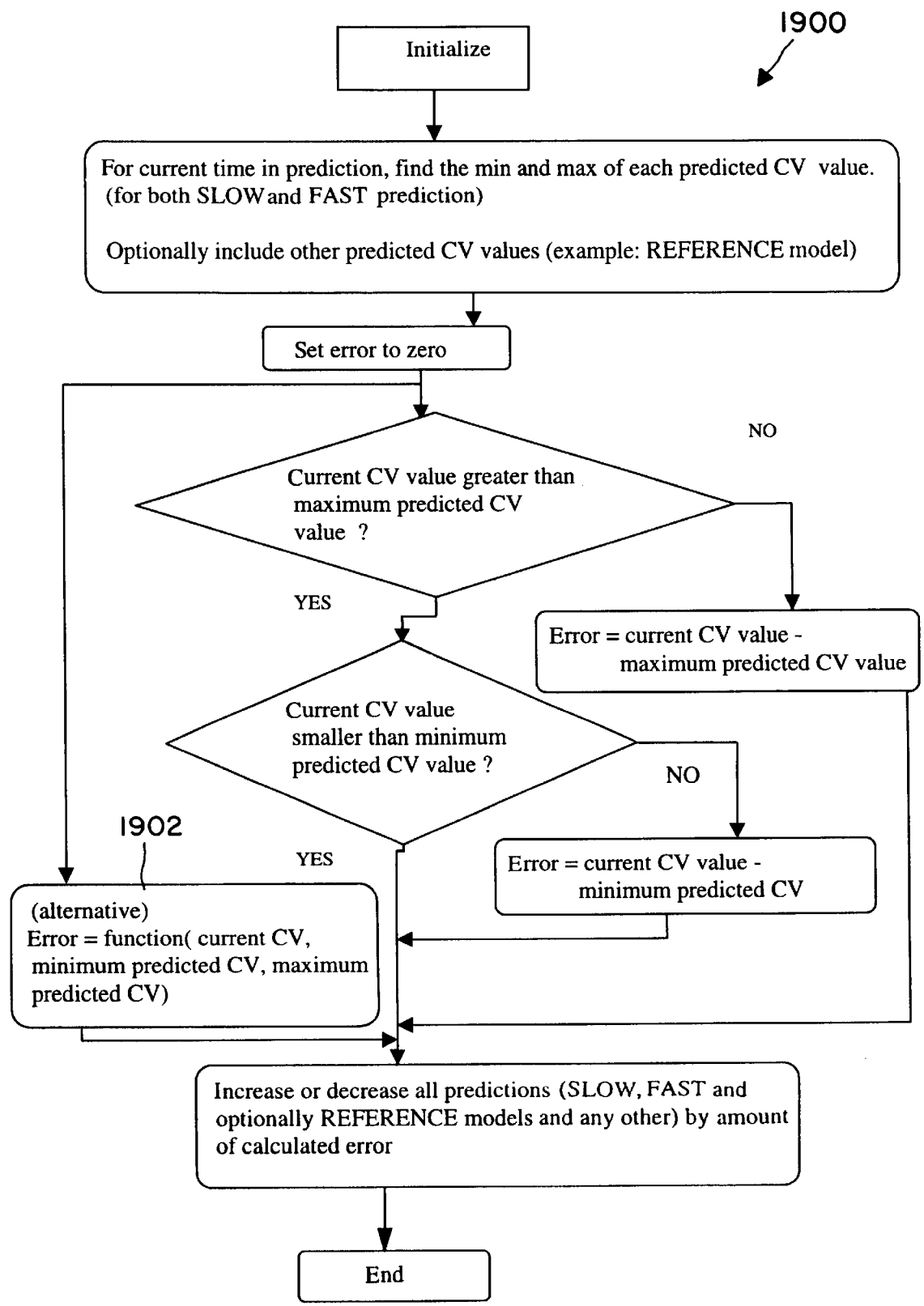
FIG. 19 shows future controlled variable requirement definition detail.

Continuing with attention now to FIG. 19, Future CV Requirement Definition Detail 1900 shows process detail in Future CV Requirement Definition Step 1712 of Controller Operation 1700. In Alternative CV Error Determination Step 1902, an alternative error value is determined for the current and predicted CV values. In example:

$$L = \text{maximum predicted } CV - \text{minimum predicted } V \quad \text{Equations 58–60}$$

X=current CV/L error=x*(1.0−exp(−x*x)) OR error=x*(1.0−1.0/(1+a*x^n))

where "a" is defined to enable robust tuning (note that "a" is, in one embodiment, a function of constraint proximity).

Figure 20:
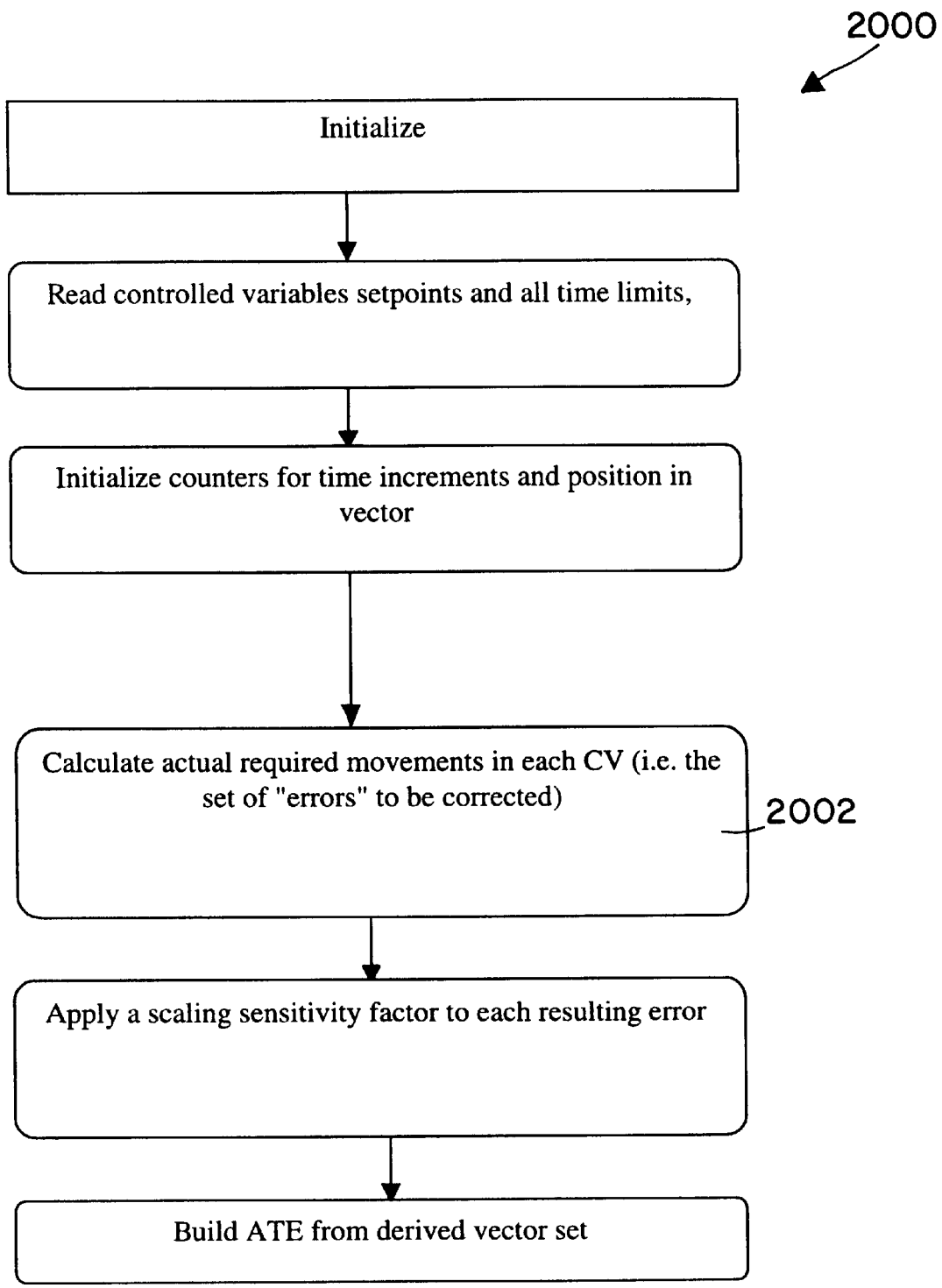
FIG. 20 demonstrates controlled variable prediction detail.

In FIG. 20, CV Prediction Detail 2000 presents further detail in Future CV Requirement Definition Step 1712. In CV Error Correction Step 2002, each error for each Controlled Variable is evaluated via the relationship:

$$\text{Error} = \text{setpoint} - \text{function}(\text{Fast predicted } CV, \text{Slow predicted } CV) \quad \text{Equation 61}$$

where the function is a straightforward arithmetic mean or, alternatively, the function is based upon constraint proximity in the CV.

The benefit of the multi-variable controller when compared to a traditional DMC controller is demonstrated in the following Examples from simulation in conjunction with FIGS. 21 to 26.

Figure 21A:
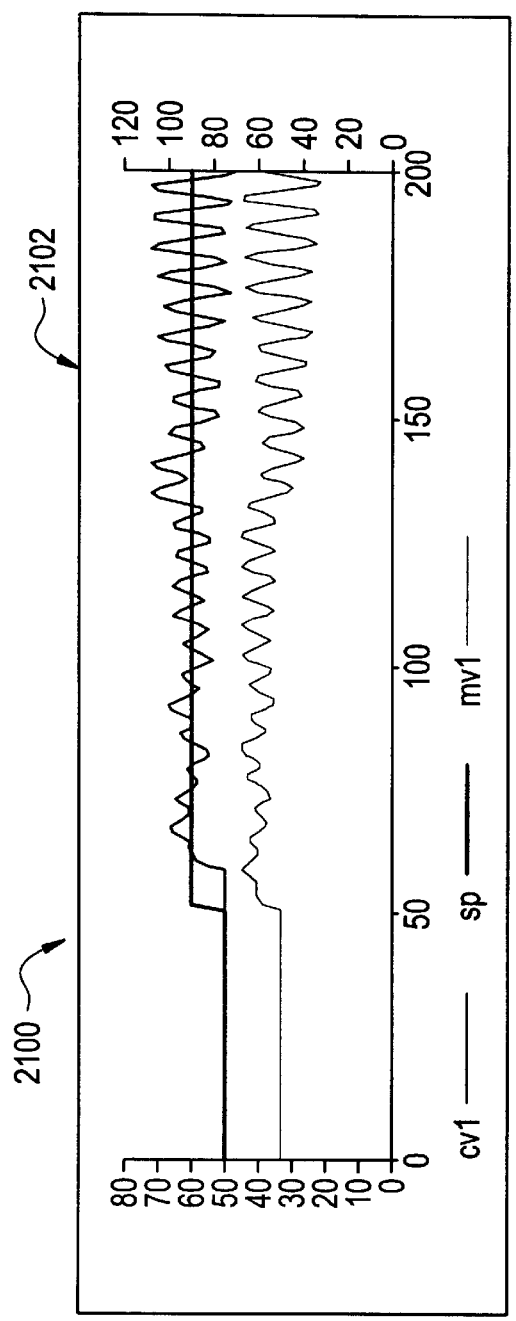
FIGS. 21A–21C presents output from a simulator for a regular DMC operating in a situation of model mismatch in modeling parameters.
Figure 21B:
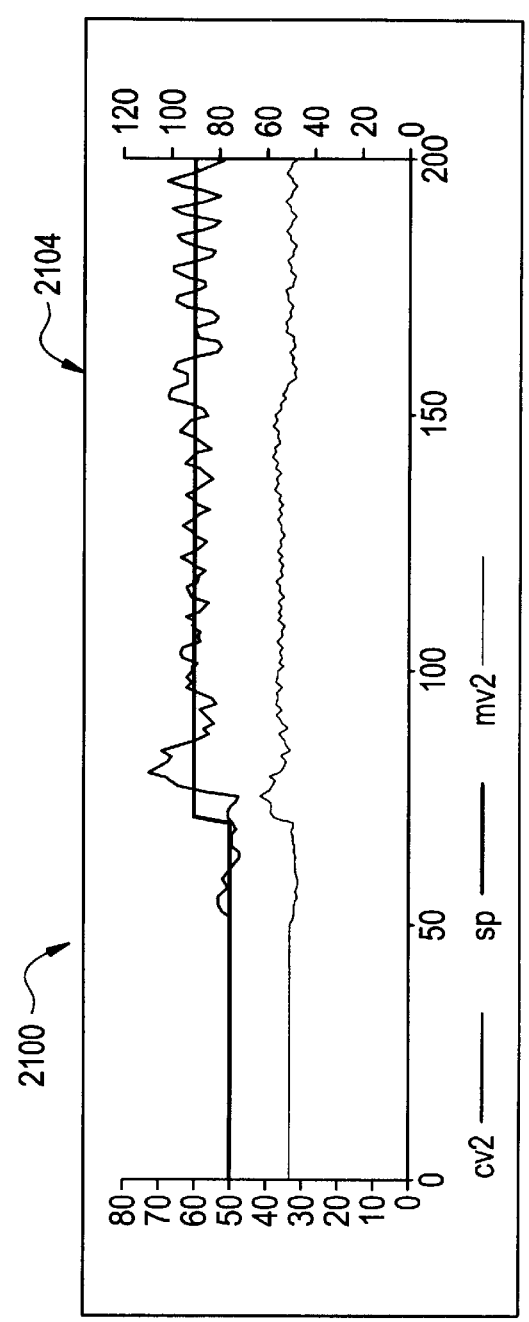
Figure 21C:
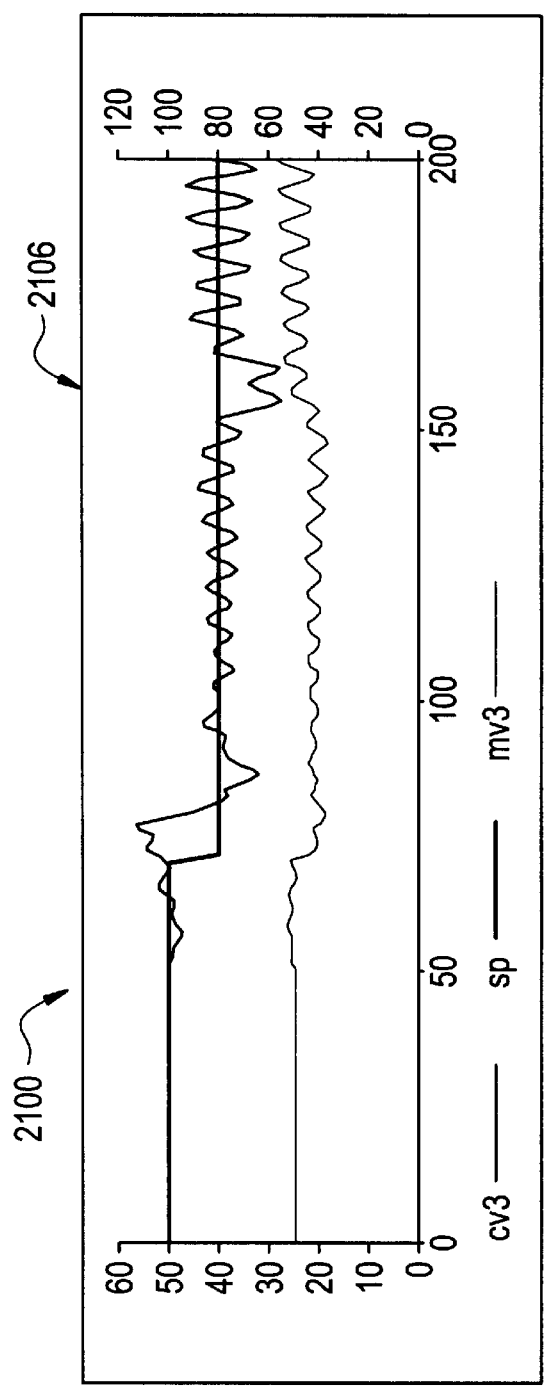
Figures 22A, 22B:
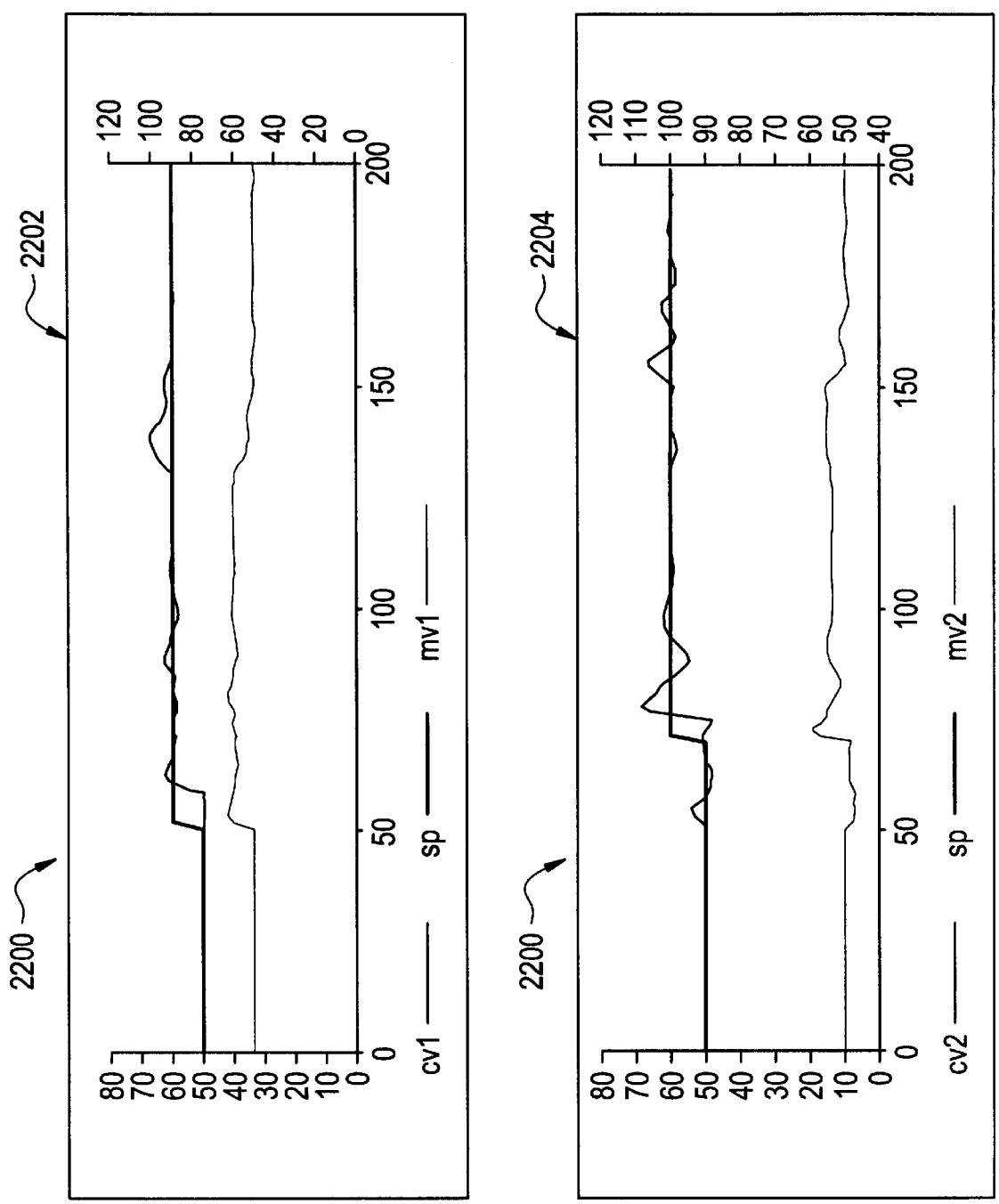
FIGS. 22A–22C presents output from a simulator for the robust controller of the preferred embodiments operating in the situation of model mismatch of FIG. 21.
Figure 22C:
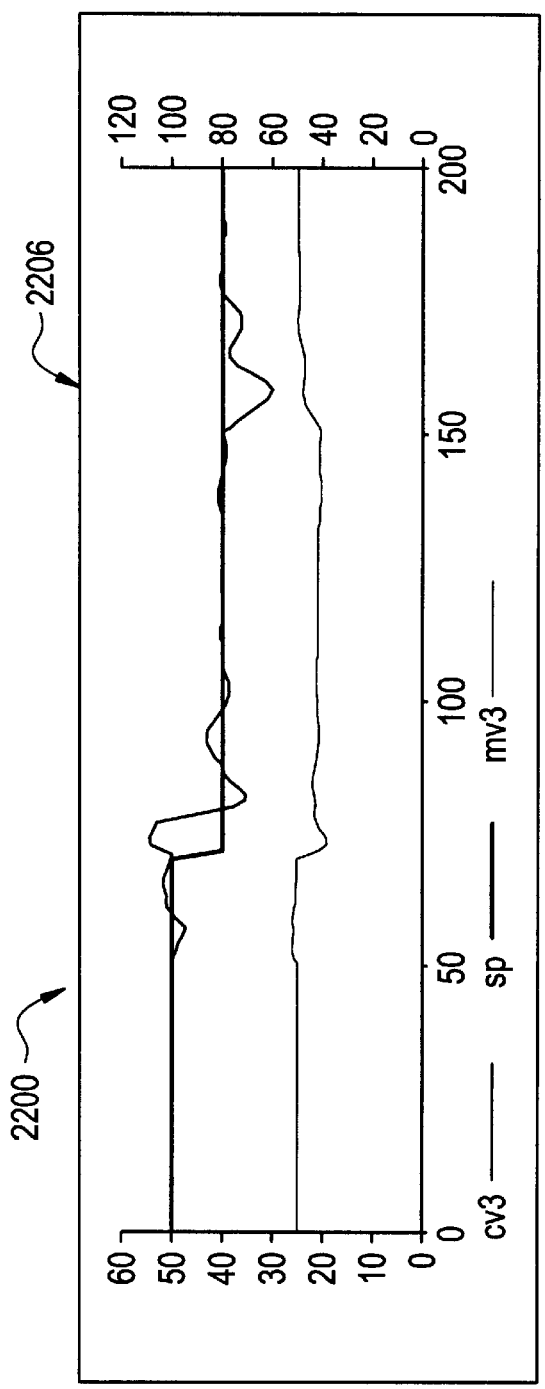
Figure 23C:
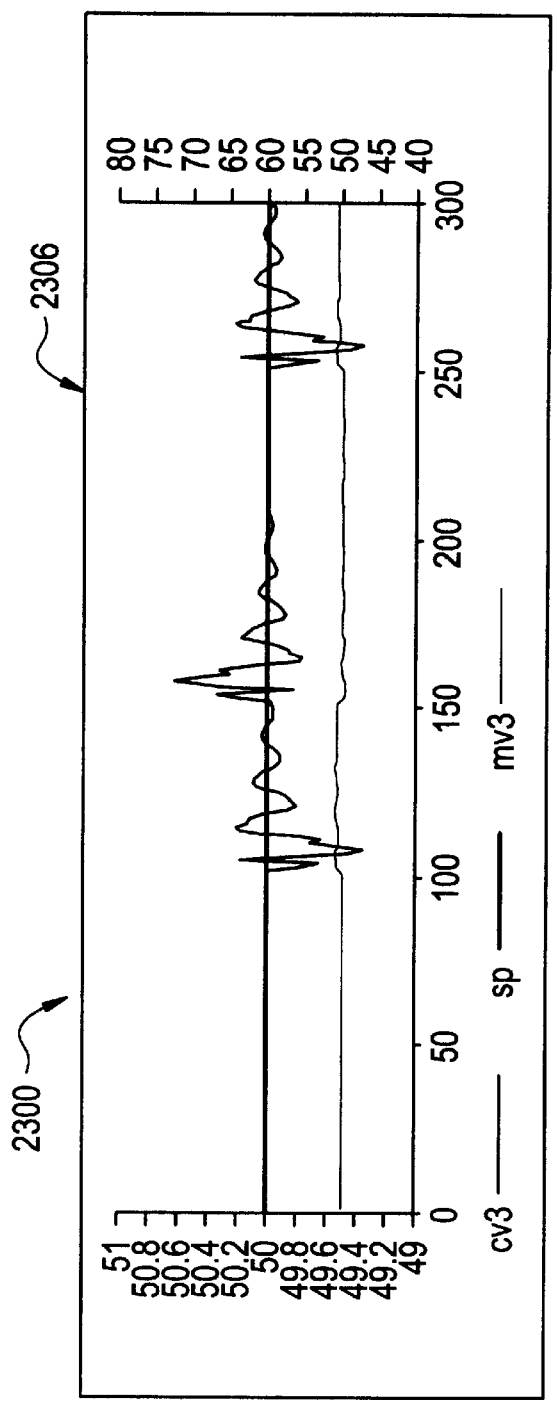
Figures 24A, 24B:
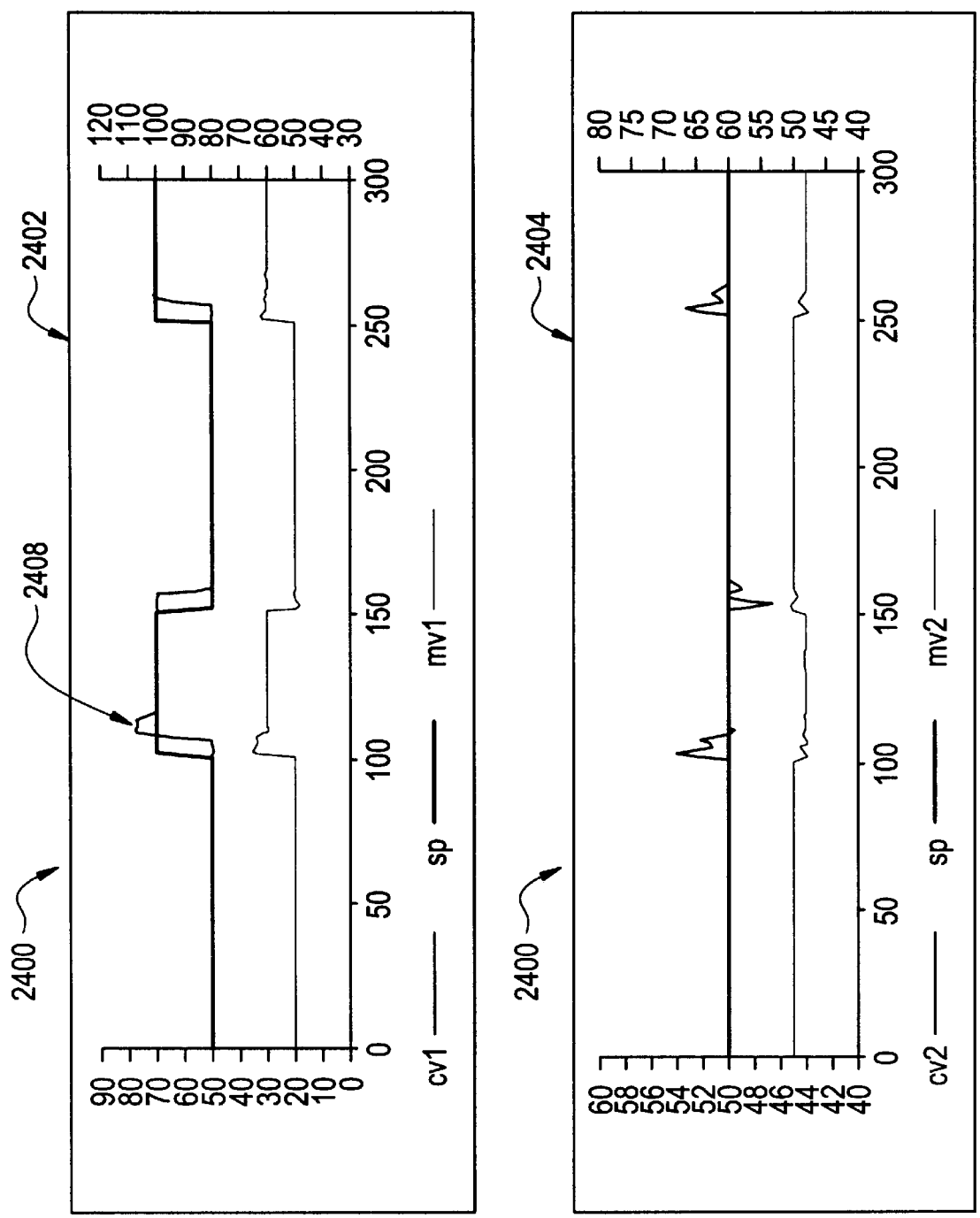
FIGS. 24A–24C presents output from a simulator for the robust controller of the preferred embodiments operating in the situation of model mismatch of FIG. 23.
Figure 24C:
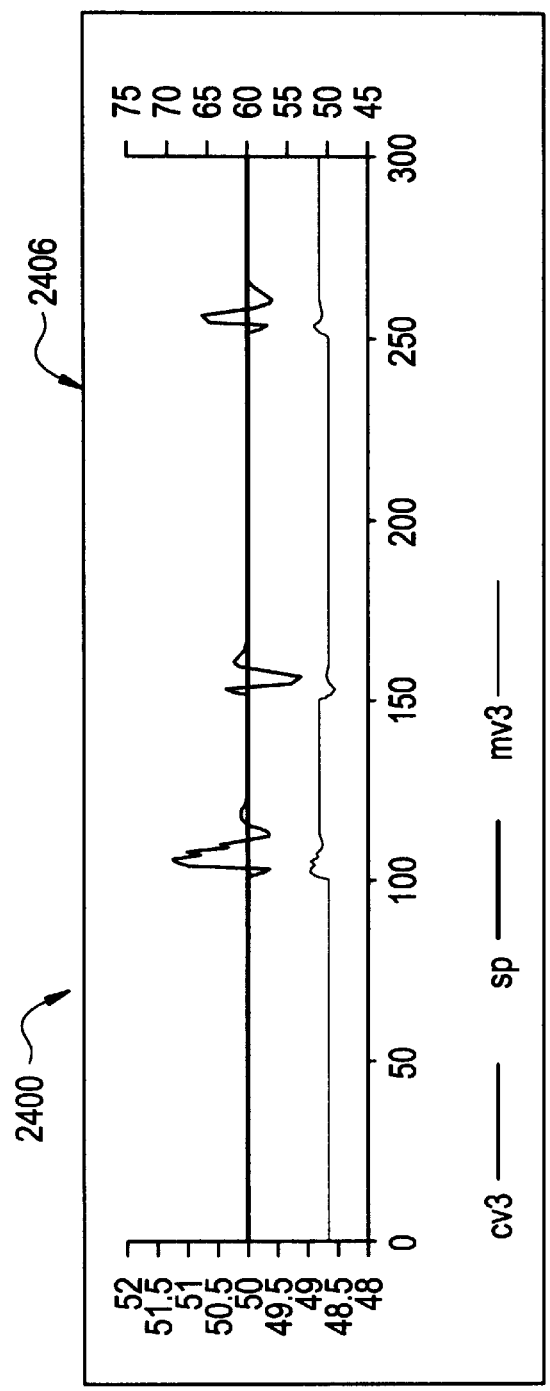
Figure 25A:
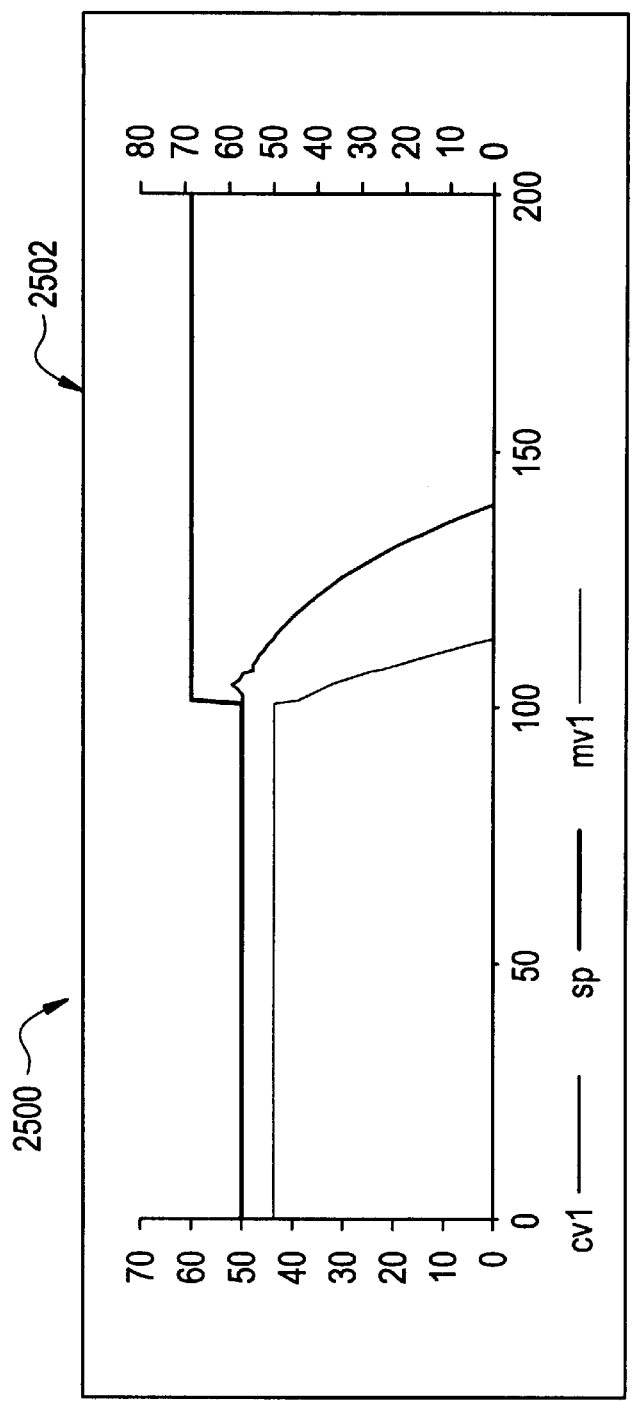
FIGS. 25A–25C presents output from a simulator for a regular DMC operating in a situation of controller model inversion.
Figure 25B:
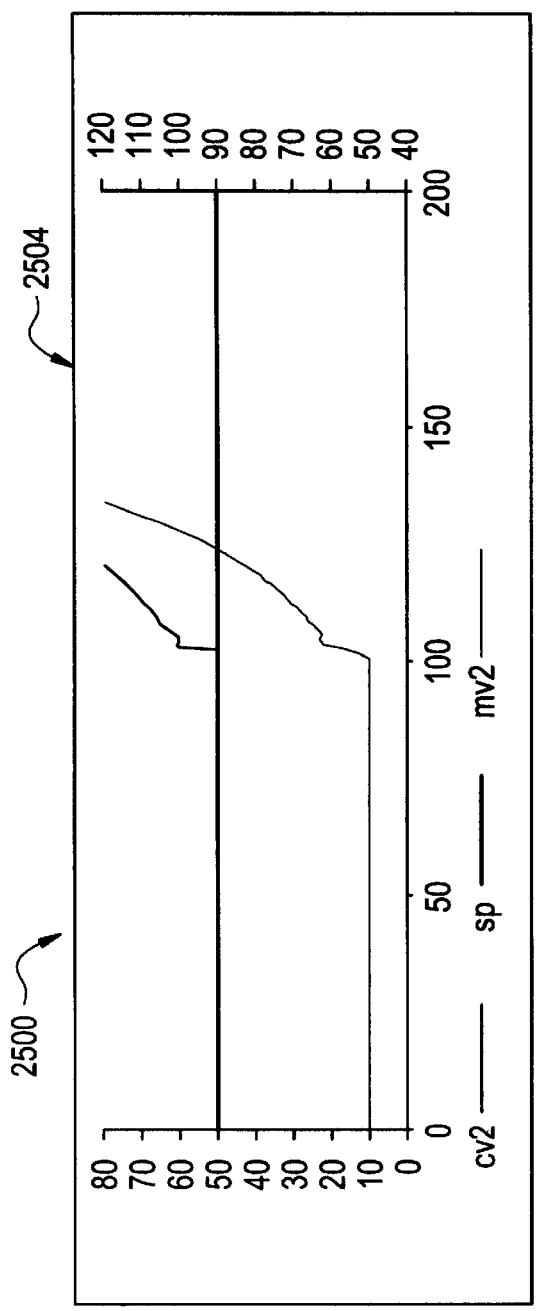
Figure 25C:
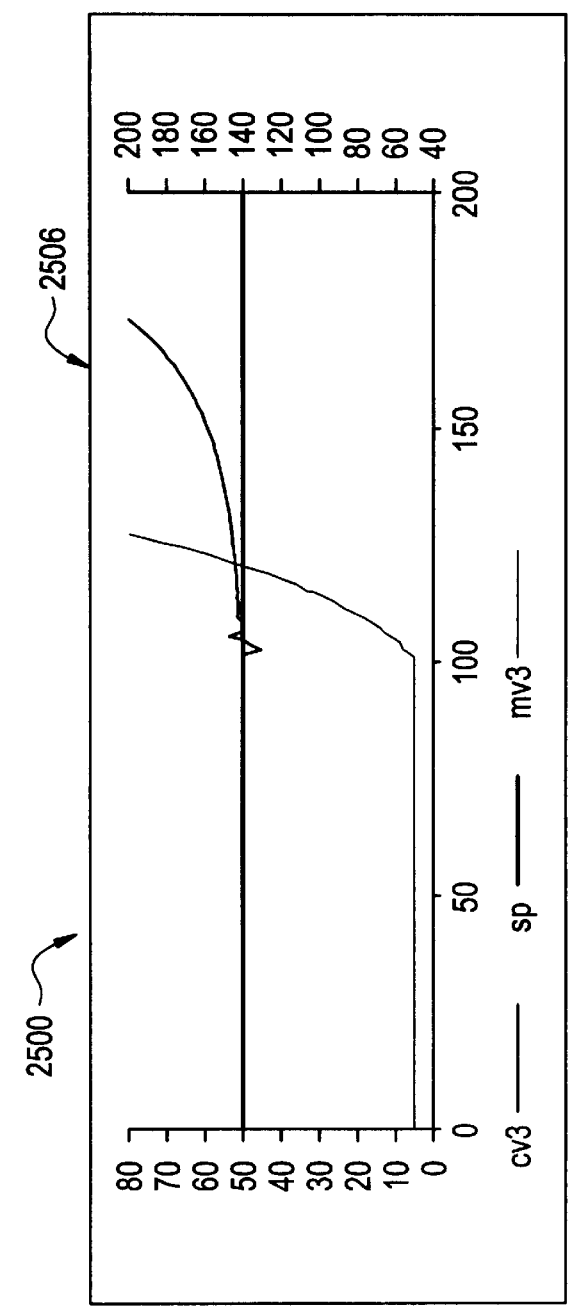
Figures 26A, 26B:
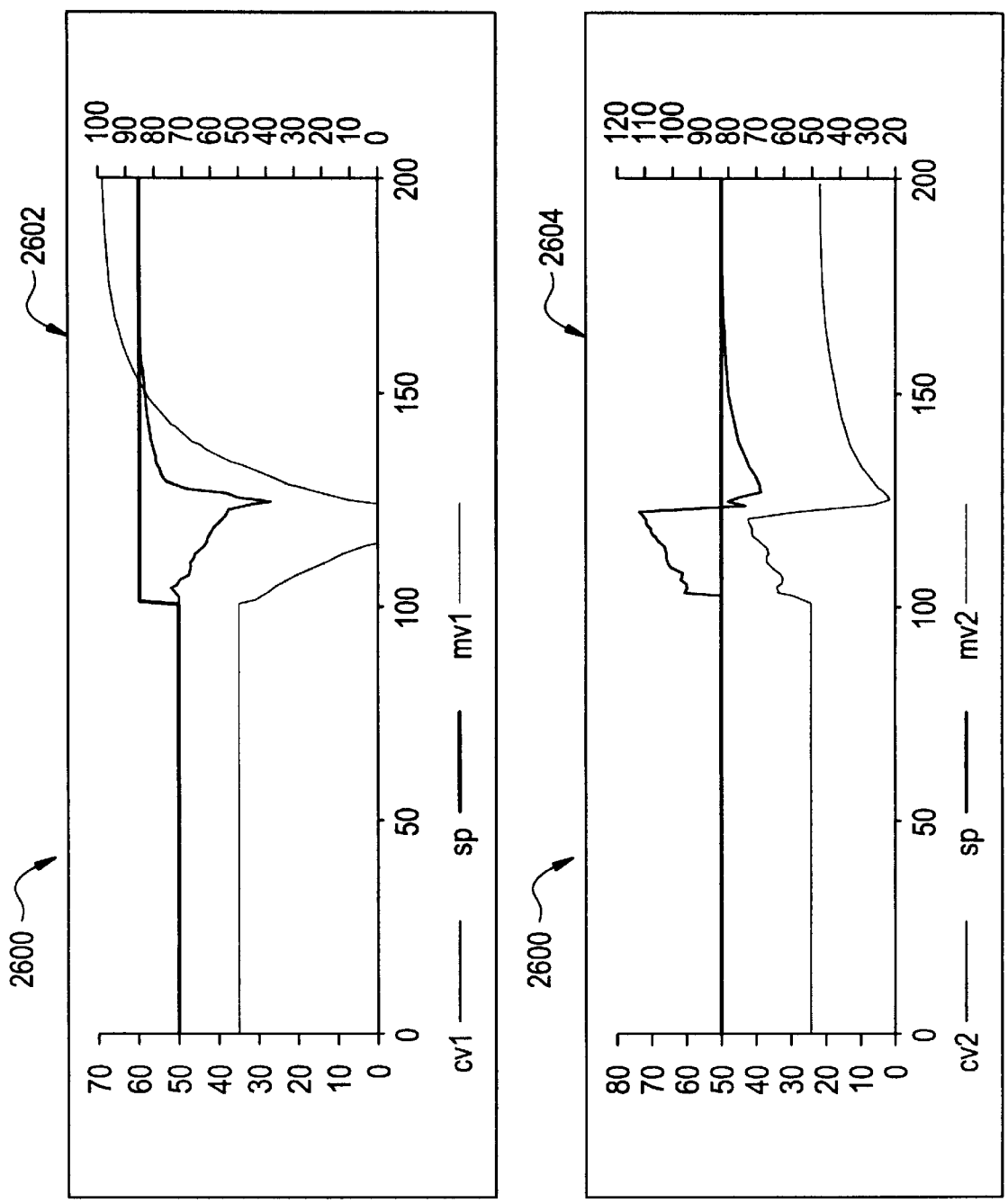
FIGS. 26A–26C presents output from a simulator for the robust controller of the preferred embodiments operating in the situation of model inversion of FIG. 25.
Figure 26C:
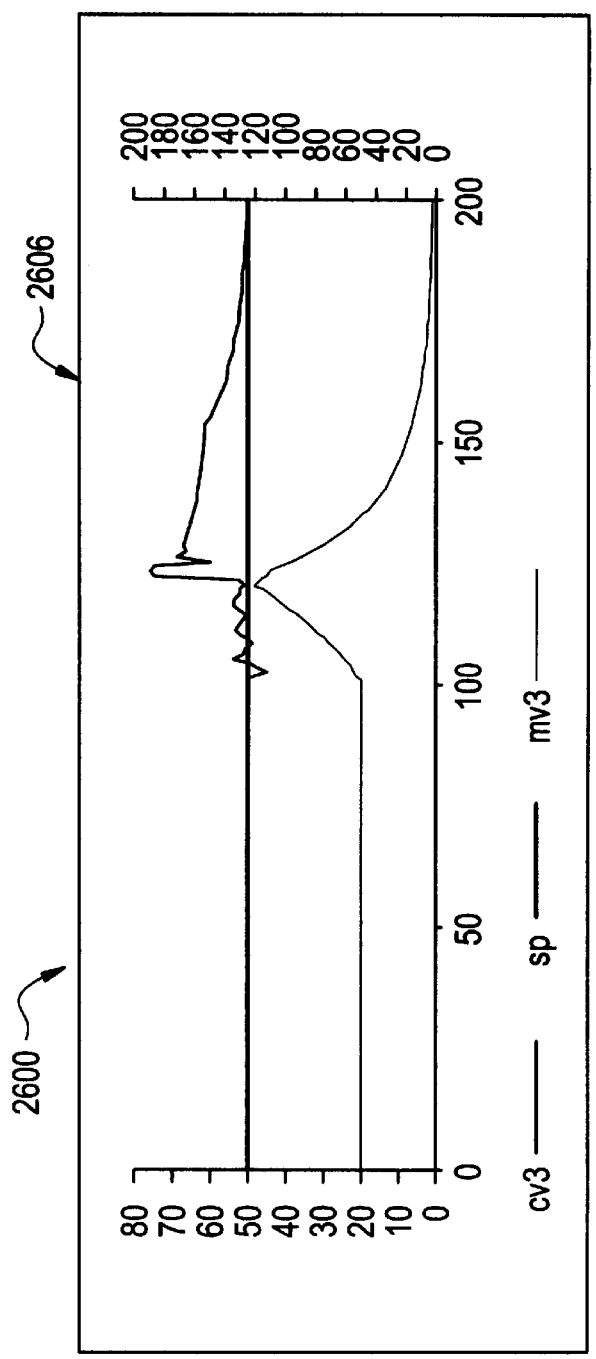

In the example, a simulation of an operating apparatus is controlled in FIGS. 21, 23, and 25 with a classic DMC. In respectively comparative FIGS. 22, 24, and 26, the same simulation of the operating apparatus is controlled using the robust multi-variable controller of the preferred embodiments. In the FIGS. 21–22 comparison, the model is "affected" with an identical shift in a model parameter between the simulation of the plant and the model used in the controller. In the FIGS. 23–24 comparison, the model is "affected" with an identical shift in a gain parameter between the simulation of the plant and the model used in the controller. In the FIGS. 25–26 comparison, the model is "affected" with an identical controller model (characteristic value) inversion. In reading the simulation output time charts, note that the right hand scale of the time charts defines the quantitative value of the MV variable, whereas the left hand scale defines the SP and CV quantitative values.

FIG. 21 presents output 2100 from a simulator for a regular DMC operating in a situation of model mismatch in modeling parameters. Output 2100 contains time chart 2102 for the actions of $CV_1$ and $MV_1$, time chart 2104 for the actions of $CV_2$ and $MV_2$, and time chart 2106 for the actions of $CV_3$ and $MV_3$. FIG. 21 shows the regular DMC in the situation of model mismatch between the simulation of the operating apparatus and the model used in the controller (the case is a 3×3 with model mismatch in only the first model; in this regard, the dead time is incorrectly modeled). The move suppression factor is set to unity. Equal concern errors are also all unity. The simulation is normalized internally so that all values of CV and MV begin at 50.0. The process gains are usually in the 0 to 3.0 range. The figure shows the instability induced in the DMC by a single small error in the dead time model in only one model out of 9 (i.e. 3×3). Each other model parameter is strictly equal between the apparatus simulation and the model of the controller. The dead time error in the first model is about 20%. This error makes the controller unstable in all the 3 CV's; the traditional cure is to increase move suppression but at the expense of controller reaction time to external disturbance and to set point changes.

FIG. 22 presents output 2200 from a simulator for the robust controller of the preferred embodiments operating in the situation of model mismatch of FIG. 21. Output 2200 contains time chart 2202 for the actions of $CV_1$ and $MV_1$, time chart 2204 for the actions of $CV_2$ and $MV_2$, and time chart 2206 for the actions of $CV_3$ and $MV_3$. FIG. 22 shows the robust controller in face of the same model mismatch as FIG. 21 (the case is the same 3×3 with model mismatch in only the first model; the dead time is again incorrectly modelized). The move suppression factor is set to unity. Equal concern errors are also all unity. The simulation is normalized internally so that all values of CV and MV start at 50.0. The figure shows the resulting stability of the robust multivariable controller. The controller is not gaining stability at the expense of the reaction time, and, therefore, disturbances and set point changes can be handled faster than the regular DMC. The robustness is so substantial that move suppression can be zero (i.e. turned off) if there is any reason to do so.

FIG. 23 presents output 2300 from a simulator for a regular DMC operating in a situation of model mismatch in gains. Output 2300 contains time chart 2302 for the actions of $CV_1$ and $MV_1$, time chart 2304 for the actions of $CV_2$ and $MV_2$, and time chart 2306 for the actions of $CV_3$ and $MV_3$. FIG. 23 shows the regular DMC without adaptation. The case is a 3×3 with model mismatch in only the gains of all models. The move suppression factor is set to unity. Equal concern errors are also all unity. The simulation is normalized internally so that all values of CV and MV start at 50.0. The process gains are usually in the 0 to 3.0 range with errors in the range 0 to 50%. The figure shows the instability induced in the DMC by the gain errors. The DMC controller is unstable in all the 3 CV's.

FIG. 24 presents output 2400 from a simulator for the robust controller of the preferred embodiments operating in the situation of model mismatch of FIG. 23. Output 2400 contains time chart 2402 for the actions of $CV_1$ and $MV_1$, time chart 2404 for the actions of $CV_2$ and $MV_2$, and time chart 2406 for the actions of $CV_3$ and $MV_3$. FIG. 24 shows the robust controller with adaptation. The case is the same 3×3 as used in FIG. 23 with model mismatch in only the gains of all models. The move suppression factor is set to unity. Equal concern errors are also all unity. The simulation is normalized internally so that all values of CV and MV start at 50.0. The process gains are usually in the 0 to 3.0 range with errors in the range 0 to 50%. The figure shows some initial instability in the robust controller (area of 2408); this is a learning period. After this learning period, the controller exhibits nearly perfect response to set point changes since it derives, from past data, the correct model gains that match the actual process to the control model. Note also, in comparing the peak in the area of 2408 of FIG. 24 with the comparable peak area of 2308 of FIG. 23, that the controller of FIG. 24 shows less overshoot above the setpoint SP; this demonstrates the efficiency with which the described embodiment of the multi-model controller reacts to the operating system.

FIG. 25 presents output 2500 from a simulator for a regular DMC operating in a situation of controller model (characteristic value) inversion. Output 2500 contains time chart 2502 for the actions of $CV_1$ and $MV_1$, time chart 2504 for the actions of $CV_2$ and $MV_2$, and time chart 2506 for the actions of $CV_3$ and $MV_3$. Note that (a) the set point change at time t=100 triggers the inverted response and (b) the controller diverges very rapidly since the move suppression is set to unity.

FIG. 26 presents output 2600 from a simulator for the robust controller of the preferred embodiments operating in the situation of model (characteristic value) inversion of FIG. 25. Output 2600 contains time chart 2602 for the actions of $CV_1$ and $MV_1$, time chart 2604 for the actions of $CV_2$ and $MV_2$, and time chart 2606 for the actions of $CV_3$ and $MV_3$. Again, the set point change at time t=100 triggers the inverted response, and the controller initially diverges— but not as rapidly as the regular DMC of FIG. 25. Inversion detection then triggers inversion of the characteristic value in all models; this process effectively occurs at time t=120. As should be apparent, the inversion is initiated at an earlier relative moment when a different choice of controller parameters are used. The move suppression factor is set to unity. A comparison of FIGS. 25 and 26 shows the value in the described embodiments of (a) determining divergent response behavior in the controlling process and then (b) counteracting the identified divergent response behavior to stabilize the controller.

The described embodiments are achievable within a number of computer system architectural alternatives. In one alternative, an embodiment is facilitated within the context of a multi-process environment wherein different databases, data sections, and logical engines (logical sub-sections which read data, write data, calculate data, and make decisions in data computational processes) within the computer-implemented logic are simultaneously installed and activated with dynamically active data transfer linkages, facilitated either directly or indirectly via the use of a data common and/or an application program interface (APIs). In another alternative, the different databases, data sections, and logical engines are facilitated within the context of a single process environment wherein different components are sequentially activated by an operating technician with linkages facilitated either directly or indirectly via the use of data commons or data schema dedicated to interim storage. In yet another alternative, the different databases, data sections, and logical engines are deployed within the context of a single process environment wherein (a) some components of the different databases, data sections, and logical engines are accessed and activated by an operating technician with linkages facilitated either directly or indirectly via the use of data commons or data schema dedicated to interim storage, and (b) the other components within the different databases, data sections, and logical engines are accessed and activated by calls from previously activated with linkages facilitated either directly or indirectly via the use of data commons or data schema dedicated to interim storage. In one alternative, the multi-variable controller is implemented and executed on one physical computer. In another alternative, the controller is facilitated on different platforms where the results generated by one engine are transferred by an operating technician to a second or other plurality of the different databases, data sections, and logical engines executing on different computer platforms, although a separate operating system is needed on each platform. In yet another alternative, controller is facilitated on a plurality of computer platforms interconnected by a computer network, although a separate operating system is needed on each platform and the operating system further incorporates any networking logic that is needed to facilitate necessary communications via such a computer implemented communication network. A relatively small controller according to the described embodiments is deployed on a computer having an Intel 80486 CPU with a 33 MHz clock, 10 Megabytes of RAM Memory, and a 100 Megabyte Hard Disk using a Windows '95 operating system from Microsoft Corporation. A larger controller according to the described embodiments is deployed on a Vaxstation 4000m90 having 128 Megabytes of RAM and a (at least) 500 Megabyte Hard Disk from Compaq Computer Corporation. Many of the different gradations of architectural deployment within the context of the above overview are considered by the applicants to be generally apparent, and the illustration of present invention can be conveniently modified by those of skill, given the benefit of this disclosure, to achieve the utility of the present invention within the context of the above computer system architectural alternatives without departing from the spirit of the present invention once given the benefit of the disclosure.

I claim:

1. A computer-implemented system for controlling a processing apparatus having at least one independently controlled manipulated variable and at least one controlled variable responsive to said manipulated variable, comprising:
   a set of at least two models for defining an expected variation in magnitude for each controlled variable as a respective function of each manipulated variable, said model set having a dynamic response inertial characteristic; and
   means for implementing a change defined from said model set to modify said manipulated variable in said processing apparatus.

2. The system of claim 1 further characterized by means for adapting said models during real-time use.

3. The system of claim 1 further comprising means for determining divergent response behavior in said controlling.

4. A computer-implemented system for controlling a processing apparatus having at least one independently controlled manipulated variable and at least one controlled variable responsive to at least one said manipulated variable and further responsive to process disturbances originating independently of said manipulated variable, comprising:
   means for measuring the magnitude of each controlled variable;
   a set of at least two models for defining an expected variation in magnitude for each controlled variable as a respective function of a manipulated variable disturbance instance in each manipulated variable;
   means for determining, from said set of models, an estimated modeling error value in interaction of one said controlled variable with all said manipulated variables in achieving a manipulated variable modification;
   means for determining an estimated process disturbance value from said controlled variable magnitude and said estimated modeling error value;
   means for defining a first portion of desired change in the present value of at least one manipulated variable from said estimated modeling error value;
   means for defining a second portion of desired change in the present value of at least one manipulated variable from said estimated process disturbance value; and
   means for implementing said first and second desired change portions to modify said manipulated variable.

5. The system of claim 4 wherein said model set incorporates a dynamic response inertial characteristic, said system further characterized by means for acquiring an inertial characteristic value so that said dynamic response inertial characteristic can be achieved in said model set.

6. The system of claim 5 further compromising means for adapting said model set during real-time use.

7. The system of claim 4 further compromising means for determining divergent response behavior in said controlling.

8. A computer-implemented system for of an apparatus having at least one independently controlled manipulated variable and at least one controlled variable responsive to at least one said independently controlled manipulated variable, comprising:
   means for defining a set of consecutive discrete intervals of time in a time-dependent function;
   means for introducing, in each independently controlled manipulated variable, a manipulated variable disturbance instance of predefined magnitude, said disturbance instance prompting a response in each controlled variable;
   means for measuring the magnitude of each controlled variable;
   a controller;
   means for defining, respective to each response, at least one time-dependent functional characterization of said controlled variable magnitude over said set of consecutive discrete intervals of time on a time-axis, said functional characterization having a zero-time time-axis attribute, a maximum-time time-axis attribute, a dead-time time-axis attribute, a response gain attribute, a ramp-rate attribute, a steady-state time-axis attribute, a curvilinear portion disposed between the time-axis position of said dead-time time-axis attribute and the time-axis position of said steady-state time-axis attribute, a ramped portion disposed between the time-axis position of said dead-time time-axis attribute and the time-axis position of said maximum-time time-axis attribute, and a homaloidal portion disposed between the time-axis position of said steady-state attribute and the time-axis position of said maximum-time time-axis attribute, each discrete time interval for one said response having the same time duration, said homaloidal portion having a zero value for an integrating controlled variable response, said ramped portion having a zero value for a non-integrating controlled variable response, and each functional characterization for one said response having identically valued zero-time time-axis attributes, response gain attributes, ramp-rate attributes, and maximum-time time-axis attributes;
   means for acquiring a first said time-dependent functional characterization respective to the response from measuring an effected change in said magnitude of a controlled variable after introducing said disturbance instance, said first functional characterization having a first said dead-time time-axis attribute, a first said steady-state time-axis attribute, a first said curvilinear portion, a first said homaloidal portion, and a first said ramped portion having its functional derivative equivalent to said ramp-rate attribute at said maximum-time time-axis attribute;
   means for inverting said first time-dependent functional characterization into said controller;
   means for deriving a second said time-dependent functional characterization from said first time-dependent functional characterization, said second functional characterization having a second dead-time attribute in first predefined diminishing offset from said first dead-time attribute, a second steady-state attribute in second predefined diminishing offset from said first steady-state attribute, a second curvilinear portion in first predefined functional offset from said first curvilinear portion, a second homaloidal portion in extrapolation of said first homaloidal portion, and a second ramped portion in extrapolation of said first ramped portion;

means for deriving a third said time-dependent functional characterization from said first time-dependent functional characterization, said third functional characterization having a third dead-time attribute in first predefined superadditive offset from said first dead-time attribute, a third steady-state attribute in second predefined superadditive offset from said first steady-state attribute, a third curvilinear portion in second predefined functional offset from said first curvilinear portion, and a third homaloidal portion in truncation of said first homaloidal portion, and a third ramped portion in truncation of said first ramped portion;

means for determining a desired change in the value of a manipulated variable in real-time from said second time-dependent functional characterization, said third time-dependent functional characterization, the magnitude of at least one controlled variable, and said controller; and means for implementing said desired change to modify said manipulated variable.

9. The computer-implemented system of claim 8, said means for determining a desired change in the value of a manipulated variable in real-time determining said desired change from said first time-dependent functional characterization, said second time-dependent functional characterization, said third time-dependent functional characterization, the magnitude of at least one controlled variable, and said controller.

10. The computer-implemented system of claim 9 wherein said first, second, and third time-dependent functional characterizations define three models in a model set, said model set incorporating a first dynamic response inertial characteristic between said first and second time-dependent functional characterizations and a second dynamic response inertial characteristic between said first and third time-dependent functional characterizations, said system further characterized by means for acquiring a first inertial characteristic value and a second inertial characteristic value so that said first and second dynamic response inertial characteristics can be respectively achieved in said model set.

11. The system of claim 10 further characterized by means for adapting said model set during real-time use.

12. A computer-implemented system for controlling a processing apparatus having at least one independently controlled manipulated variable and at least one controlled variable responsive to at least one said manipulated variable and further responsive to process disturbances originating independently of said manipulated variable, comprising:

means for measuring the magnitude of each controlled variable;

a model set for defining an expected variation in magnitude for each controlled variable as a respective function of a manipulated variable disturbance instance in each manipulated variable;

means for determining, from said model set an error value in interaction of one said controlled variable with all said manipulated variables in achieving a manipulated variable modification;

means for defining a desired change in the present value of at least one manipulated variable from said error value;

means for implementing said desired change to modify said manipulated variable; and means for determining divergent response behavior in said controlling.

13. The computer-implemented system of claim 12 further characterized by means for counteracting said divergent response behavior.

14. A method for computer-implemented controlling of a processing apparatus having at least one independently controlled manipulated variable and at least one controlled variable responsive to said manipulated variable, comprising the steps of:

defining an expected variation in magnitude for each controlled variable as a respective function of each manipulated variable from a set of at least two models, said model set having a dynamic response inertial characteristic; and implementing a change defined from said model set to modify said manipulated variable in said processing apparatus.

15. The method of claim 14 further comprising the step of adapting said models during real-time use.

16. The method of claim 14 further comprising the step of determining divergent response behavior in said controlling.

17. A method for computer-implemented controlling of a processing apparatus having at least one independently controlled manipulated variable and at least one controlled variable responsive to at least one said manipulated variable and further responsive to process disturbances originating independently of said manipulated variable, comprising the steps of:

measuring the magnitude of each controlled variable;

defining an expected variation in magnitude for each controlled variable as a respective function of a manipulated variable disturbance instance in each manipulated variable from a set of at least two models;

determining, from said set of models, an estimated modeling error value in interaction of one said controlled variable with all said manipulated variables in achieving a manipulated variable modification;

determining an estimated process disturbance value from said controlled variable magnitude and said estimated modeling error value;

defining a first portion of desired change in the present value of at least one manipulated variable from said estimated modeling error value;

defining a second portion of desired change in the present value of at least one manipulated variable from said estimated process disturbance value; and implementing said first and second desired change portions to modify said manipulated variable.

18. The method of claim 17 wherein said model set incorporates a dynamic response inertial characteristic, said method further characterized by the step of acquiring an inertial characteristic value so that said dynamic response inertial characteristic can be achieved in said model set.

19. The method of claim 18 further characterized by the step of adapting said model set during real-time use.

20. The method of claim 17 further characterized by the step of determining divergent response behavior in said controlling.

21. A method for computer-implemented controlling of an apparatus having at least one independently controlled manipulated variable and at least one controlled variable responsive to at least one said independently controlled manipulated variable, comprising the steps of:

defining a set of consecutive discrete intervals of time in a time-dependent function;

introducing, in each independently controlled manipulated variable, a manipulated variable disturbance instance of predefined magnitude, said disturbance instance prompting a response in each controlled variable;

measuring the magnitude of each controlled variable;

providing a controller;

defining, respective to each response, at least one time-dependent functional characterization of said controlled variable magnitude over said set of consecutive discrete intervals of time on a time-axis, said functional characterization having a zero-time time-axis attribute, a maximum-time time-axis attribute, a dead-time time-axis attribute, a response gain attribute, a ramp-rate attribute, a steady-state time-axis attribute, a curvilinear portion disposed between the time-axis position of said dead-time time-axis attribute and the time-axis position of said steady-state time-axis attribute, a ramped portion disposed between the time-axis position of said dead-time time-axis attribute and the time-axis position of said maximum-time time-axis attribute, and a homaloidal portion disposed between the time-axis position of said steady-state attribute and the time-axis position of said maximum-time time-axis attribute, each discrete time interval for one said response having the same time duration, said homaloidal portion having a zero value for an integrating controlled variable response, said ramped portion having a zero value for a non-integrating controlled variable response, and each functional characterization for one said response having identically valued zero-time time-axis attributes, response gain attributes, ramp-rate attributes, and maximum-time time-axis attributes;

acquiring a first said time-dependent functional characterization respective to the response from measuring an effected change in said magnitude of a controlled variable after introducing said disturbance instance, said first functional characterization having a first said dead-time time-axis attribute, a first said steady-state time-axis attribute, a first said curvilinear portion, a first said homaloidal portion, and a first said ramped portion having its functional derivative equivalent to said ramp-rate attribute at said maximum-time time-axis attribute;

inverting said first time-dependent functional characterization into said controller;

deriving a second said time-dependent functional characterization from said first time-dependent functional characterization, said second functional characterization having a second dead-time attribute in first predefined diminishing offset from said first dead-time attribute, a second steady-state attribute in second predefined diminishing offset from said first steady-state attribute, a second curvilinear portion in first predefined functional offset from said first curvilinear portion, a second homaloidal portion in extrapolation of said first homaloidal portion, and a second ramped portion in extrapolation of said first ramped portion;

deriving a third said time-dependent functional characterization from said first time-dependent functional characterization, said third functional characterization having a third dead-time attribute in first predefined superadditive offset from said first dead-time attribute, a third steady-state attribute in second predefined superadditive offset from said first steady-state attribute, a third curvilinear portion in second predefined functional offset from said first curvilinear portion, and a third homaloidal portion in truncation of said first homaloidal portion, and a third ramped portion in truncation of said first ramped portion;

determining a desired change in the value of a manipulated variable in real-time from said second time-dependent functional characterization, said third time-dependent functional characterization, the magnitude of at least one controlled variable, and said controller; and implementing said desired change to modify said manipulated variable.

22. The method of claim 21, said step of determining a desired change in the value of a manipulated variable in real-time determining said desired change from said first time-dependent functional characterization, said second time-dependent functional characterization, said third time-dependent functional characterization, the magnitude of at least one controlled variable, and said controller.

23. The method of claim 22 wherein said first, second, and third time-dependent functional characterizations define three models in a model set, said model set incorporating a first dynamic response inertial characteristic between said first and second time-dependent functional characterizations and a second dynamic response inertial characteristic between said first and third time-dependent functional characterizations, said method further characterized by the step of acquiring a first inertial characteristic value and a second inertial characteristic value so that said first and second dynamic response inertial characteristics can be respectively achieved in said model set.

24. The method of claim 23 further characterized by the step of adapting said model set during real-time use.

25. A method for computer-implemented controlling of a processing apparatus having at least one independently controlled manipulated variable and at least one controlled variable responsive to at least one said manipulated variable and further responsive to process disturbances originating independently of said manipulated variable, comprising the steps of:

measuring the magnitude of each controlled variable;

a model set for defining an expected variation in magnitude for each controlled variable as a respective function of a manipulated variable disturbance instance in each manipulated variable;

determining, from said model set, an error value in interaction of one said controlled variable with all said manipulated variables in achieving a manipulated variable modification;

defining a desired change in the present value of at least one manipulated variable from said error value;

implementing said desired change to modify said manipulated variable; and determining divergent response behavior in said controlling.

26. The method of claim 25 further characterized by the step of counteracting said divergent response behavior.

* * * * *